(12) United States Patent
Yoshida et al.

(10) Patent No.: US 7,556,197 B2
(45) Date of Patent: *Jul. 7, 2009

(54) CARD STACK READER, CARD THEREOF, CARD CASE, METHOD FOR MANUFACTURING CARD, GAME MACHINE USING THE SAME, COMPUTER-READABLE STORAGE MEDIUM ON WHICH GAME PROGRAM IS RECORDED

(75) Inventors: Toshikazu Yoshida, Yamato (JP); Hidenori Shiba, Tokyo (JP); Toshiyuki Kaji, Tokyo (JP); Takao Yamauchi, Tokyo (JP); Fumihiro Kato, Yokohama (JP); Akira Nishino, Tokyo (JP); Toru Ohara, Tokyo (JP); Takaharu Terada, Tokyo (JP)

(73) Assignee: Sega Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/071,789

(22) Filed: Feb. 26, 2008

(65) Prior Publication Data
US 2008/0182636 A1    Jul. 31, 2008

Related U.S. Application Data

(63) Continuation of application No. 11/166,980, filed on Jun. 27, 2005, now Pat. No. 7,357,321, which is a continuation of application No. 09/890,663, filed on Apr. 4, 2002, now abandoned.

(51) Int. Cl.
*G06K 7/10* (2006.01)
*G06K 7/14* (2006.01)
*G06K 7/00* (2006.01)
*A63F 1/14* (2006.01)
*A63F 1/12* (2006.01)
*A63F 13/00* (2006.01)
*A63F 9/24* (2006.01)
*G06F 19/00* (2006.01)
*G06F 17/00* (2006.01)

(52) U.S. Cl. .................. 235/454; 235/462.01; 235/436; 463/36; 463/11; 273/149 R

(58) Field of Classification Search ................. 235/454, 235/462.01, 462.1; 463/25, 13, 11, 29, 47; 273/149 R, 273, 292, 304
See application file for complete search history.

(56) References Cited

U.S. PATENT DOCUMENTS 3,034,643 A    5/1962   Keller et al.

(Continued)

FOREIGN PATENT DOCUMENTS

DE    44 39 502 C1    9/1995

(Continued)

OTHER PUBLICATIONS

International Search Report dated Aug. 3, 2001.

*Primary Examiner*—Thien Minh Le
*Assistant Examiner*—Thien T Mai
(74) *Attorney, Agent, or Firm*—Dickstein Shapiro LLP

(57) ABSTRACT

Embodiments describe a card stack reader having an imaging unit which reads an image from a peripheral side portion of a stack of cards, each card having a read code along a peripheral side edge thereof, the read code indentifying the card, and a code recognizing unit which recognizes the read code of each from the image read by the imaging unit.

2 Claims, 51 Drawing Sheets

U.S. PATENT DOCUMENTS

| | | |
|---|---|---|
| 3,679,876 A | 7/1972 | Faith et al. |
| 3,684,865 A | 8/1972 | Sakamoto |
| 3,735,094 A * | 5/1973 | Dunn .......................... 235/454 |
| 3,760,162 A * | 9/1973 | Holter ......................... 235/454 |
| 3,818,189 A * | 6/1974 | Stone et al. ................. 235/454 |
| 4,534,562 A | 8/1985 | Cuff et al. |
| 4,945,218 A * | 7/1990 | Talbott ........................ 235/488 |
| 5,169,155 A | 12/1992 | Soules et al. |
| 5,362,053 A | 11/1994 | Miller |
| 5,382,779 A * | 1/1995 | Gupta .................... 235/462.15 |
| 5,396,624 A * | 3/1995 | Campbell, Jr. ............... 235/380 |
| 5,397,133 A * | 3/1995 | Penzias .................. 273/148 R |
| 5,422,470 A | 6/1995 | Kubo |
| 5,557,086 A | 9/1996 | Schulze et al. |
| 5,698,839 A | 12/1997 | Jagielinski et al. |
| 5,765,983 A | 6/1998 | Caveney et al. |
| 5,770,533 A | 6/1998 | Franchi et al. |
| 5,898,163 A | 4/1999 | Sato et al. |
| 6,034,643 A | 3/2000 | Nishikawa et al. |
| 6,039,650 A * | 3/2000 | Hill ........................ 273/149 R |
| 6,126,166 A | 10/2000 | Lorson et al. |
| 6,217,447 B1 | 4/2001 | Lofink et al. |
| 6,348,773 B1 | 2/2002 | Dvorkis et al. |
| 6,460,848 B1 | 10/2002 | Soltys et al. |
| 6,575,364 B1 | 6/2003 | Feygin |
| 6,585,163 B1 | 7/2003 | Meunier et al. |
| 7,357,321 B2 * | 4/2008 | Yoshida et al. .............. 235/454 |

FOREIGN PATENT DOCUMENTS

| | | |
|---|---|---|
| DE | 196 31 887 C1 | 2/1998 |
| EP | 0 752 678 A2 | 1/1997 |
| GB | 2252916 A | 8/1992 |
| JP | 63-5487 | 1/1988 |
| JP | 63314660 | 6/1990 |
| JP | 6-80686 | 11/1994 |
| JP | 7-130081 | 5/1995 |
| JP | 7-75918 | 8/1995 |
| JP | 7-239959 | 9/1995 |
| JP | 9-212575 | 8/1997 |
| JP | 09215812 | 8/1997 |
| JP | 10058871 A | 3/1998 |

* cited by examiner (B)

FIG. 18A
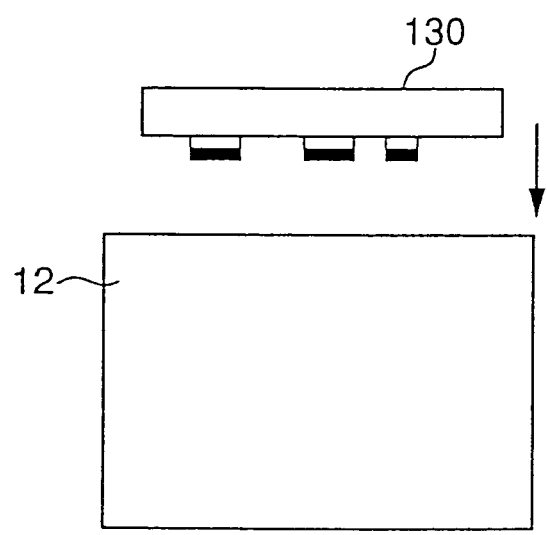
FIG. 18B
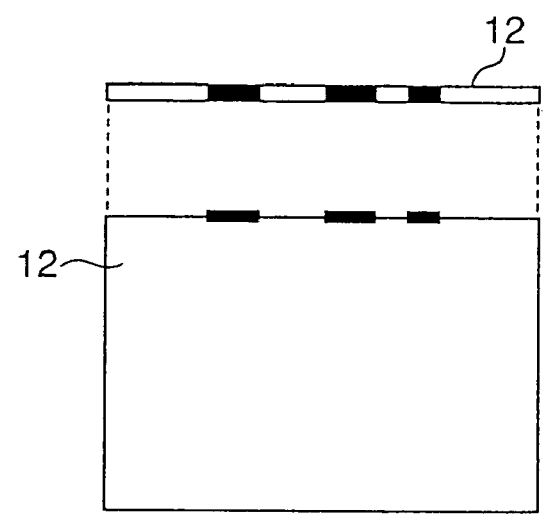
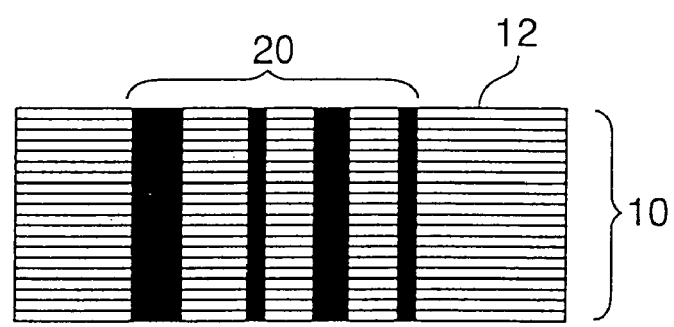
FIG. 18C (A)

| 21 | 200 | 18 |

FIG.44

| 21 | 21 | 18 |

FIG.45 (A) (B)

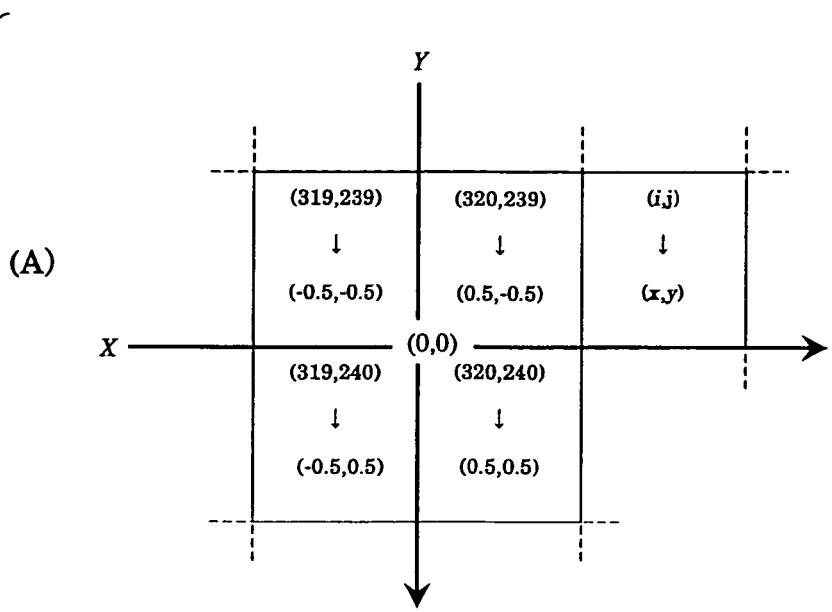
(A)
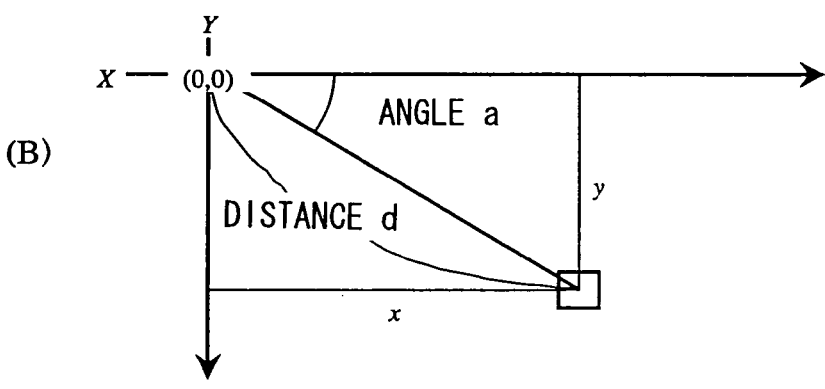
(B)
FIG.46

(A) 0    (B) 1

CARD STACK READER, CARD THEREOF, CARD CASE, METHOD FOR MANUFACTURING CARD, GAME MACHINE USING THE SAME, COMPUTER-READABLE STORAGE MEDIUM ON WHICH GAME PROGRAM IS RECORDED

This application is a continuation of application Ser. No. 11/166,980, filed on Jun. 27, 2005 now U.S. Pat. No. 7,357,321, which is a continuation of application Ser. No. 09/890,663, filed on Apr. 4, 2002 now abandoned, the entireties of which are incorporated herein by reference.

FIELD OF THE INVENTION

The present invention relates to a card stack reader, a card thereof, a card case, a method for manufacturing a card, a game machine using the same, and a computer-readable storage medium on which a game program is recorded. The present invention relates to a card stack reader which reads an image from a stack of cards, a card used in the card stack reader, a card case containing the stack of cards, a method for manufacturing the card, a game machine using the same, and a computer-readable storage medium on which a game program is recorded.

BACKGROUND OF THE INVENTION

For example, a card game machine that can play a card game, such as poker, blackjack or a fortune telling game, is known. In the card game machine, a displayed image of plural cards appears on the CRT (cathode ray tube) monitor. When the card game starts, some of the cards on the CRT monitor are changed or inverted (or turned upside down to show the backside graphic patterns of the cards) in response to operations of a player.

However, in the conventional card game machine, the card image merely appears on the CRT monitor, which is inadequate for the player to really enjoy the card game or duplicate "live" feelings of the card game. It does not sufficiently bring the realism of the card game into the player.

Moreover, in the conventional card game machine, the changing or turning of the cards is arbitrarily controlled by the computer. The players cannot check the computer-controlled card game for accuracy, and are liable to doubt the fairness of the card game.

To eliminate the problems, it is desirable to provide a card game which allows the player to actually touch the cards during the game. For this purpose, it is necessary to optically read an image from the cards and input the image to the computer.

In order to perform the reading of a stack of normal cards, it is necessary to perform the following steps, which includes: the step of transporting, one by one, the normal card taken out of the stack of normal cards to a reading unit; the step of reading, one by one, each transported card at the reading unit; the step of stacking the normal cards after the reading onto a card stacking portion. The above method of reading the stack of normal cards requires a mechanism for transporting the normal card to the reading unit. When such a mechanism is provided in a card stack reader system, the resulting system becomes large in size, and the normal cards may be damaged or stained. Furthermore, the period of reading all the normal cards becomes relatively long.

SUMMARY OF THE INVENTION

An object of the present invention is to provide an improved card stack reader in which the above-described problems are eliminated.

Another object of the present invention is to provide a card stack reader that reads an image directly from a stack of cards with a short period of reading and does not require a transporting mechanism which causes the cards to be damaged or stained.

Another object of the present invention is to provide a card that is used by a card stack reader which reads an image directly from a stack of cards with a short period of reading and does not require a transporting mechanism which causes the cards to be damaged or stained.

Another object of the present invention is to provide a card case that contains a stack of cards for use with a card stack reader which reads an image directly from the stack of cards with a short period of reading and does not require a transporting mechanism which causes the cards to be damaged or stained.

Another object of the present invention is to provide a method for manufacturing a card for use with a card stack reader which reads an image directly from a stack of cards with a short period of reading and does not require a transporting mechanism which causes the cards to be damaged or stained.

Another object of the present invention is to provide a game machine that includes a card stack reader which reads an image directly from a stack of cards with a short period of reading and does not require a transporting mechanism which causes the cards to be damaged or stained.

Another object of the present invention is to provide a computer-readable storage medium for use with a card stack reader which reads an image directly from a stack of cards with a short period of reading and does not require a transporting mechanism which causes the cards to be damaged or stained.

In order to achieve the above-mentioned objects, one preferred embodiment of the invention provides a card stack reader comprising: an imaging unit which reads an image from a peripheral side portion of a stack of cards, each card having a read code along a peripheral side edge thereof, the read code identifying the card; and a code recognizing unit which recognizes the read code of each card from the image read by the imaging unit. According to the preferred embodiment of the invention, it is possible to read the code on the card stack as it is. The cards are free from damages and stain, and the reading time is short.

In order to achieve the above-mentioned objects, one preferred embodiment of the invention provides a card that is used by a card stack reader, the read code is recorded to the card with a fluorescent material that is colorless under a visible light. According to the preferred embodiment of the invention, the read code is recorded with a fluorescent material that is colorless under a visible light, and it is possible to prevent the illegal duplication of the read code.

In order to achieve the above-mentioned objects, one preferred embodiment of the present invention provides a card case that contains a stack of cards for use with a card stack reader and includes a grooved portion so as to inhibit the read code of each card in the stack from touching the card case. According to the preferred embodiment of the invention, the read code of each card in the stack from does not touch the card case, and the read code is free from damages or stain.

In order to achieve the above-mentioned objects, one preferred embodiment of the present invention provides a method for manufacturing a card for use with a card stack reader, the method comprising the steps of: printing the read code to a portion of the card adjacent to a peripheral side edge of the card; and cutting the card along a straight line passing through the code-printed portion to form the peripheral side edge of the card where the read code is printed. According to the preferred embodiment of the invention, it is possible to produce the card having the read code along the peripheral side edge thereof.

In order to achieve the above-mentioned objects, one preferred embodiment of the present invention provides a game machine that uses a card stack reader wherein a character or a function corresponding to a read code of a card read by the card stack reader is allocated to a card game. According to the preferred embodiment of the invention, it is possible to increase the variety of the card game.

In order to achieve the above-mentioned objects, one preferred embodiment of the present invention provides a computer-readable storage medium on which a game program is recorded, the game program causing a computer to execute a card game, the computer-readable storage medium comprising: an advertisement indication detecting unit which detects whether the read code at the peripheral side edge of each card read by the card stack reader of claim 1 includes an advertisement indication; and an advertisement displaying unit which displays an advertisement in a game screen when the presence of the advertisement indication is detected. According to the preferred embodiment of the invention, it is possible to increase the advertisement effects of the card game.

BRIEF DESCRIPTION OF THE DRAWINGS

Other objects, features and advantages of the present invention will become apparent from the following detailed description when read in conjunction with the accompanying drawings.

FIG. 18A is a top view of the card before printing for explaining a third embodiment of the card manufacturing method of the present invention.

FIG. 18B is a top view of the card after the printing for explaining the third embodiment of the card manufacturing method of the present invention.

FIG. 18C is a side view of the card after the printing for explaining the third embodiment of the card manufacturing method of the present invention.

FIG. 43 is a diagram showing an example of 3 dots selected by a noise-cut filter in the card stack reader of the invention.

FIG. 44 is a diagram showing an example of 3 dots renewed by the noise-cut filter in the card stack reader of the invention.

FIG. 46 is a diagram for explaining operation of a spherical aberration correcting filter in the card stack reader of the invention.

DETAILED DESCRIPTION OF PREFERRED EMBODIMENTS

Figure 1:
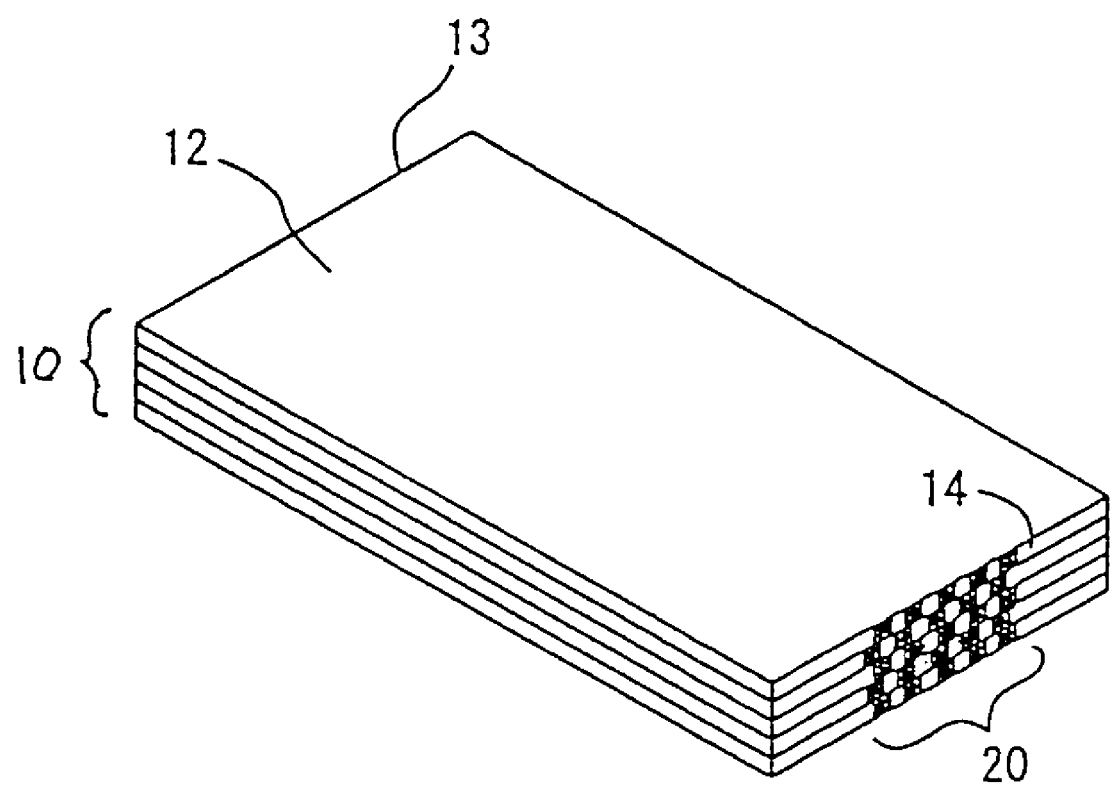
FIG. 1 is a perspective view of a stack of cards read by the card stack reader of the present invention.

FIG. 1 is a perspective view of a stack of cards read by the card stack reader of the present invention. Each card 12, which is one in the stack 10 of cards, has a read code 20 along each of peripheral side edges 13 and 14 of the card 12, which are short sides of the rectangle of the card. The read code 20 is provided to identify the card 12, and the read code 20 is recorded to the card by printing or the like. Alternatively, the read code 20 may be provided at each of peripheral side edges which are long sides of the rectangle of the card, instead of the short sides thereof.

Figure 2:
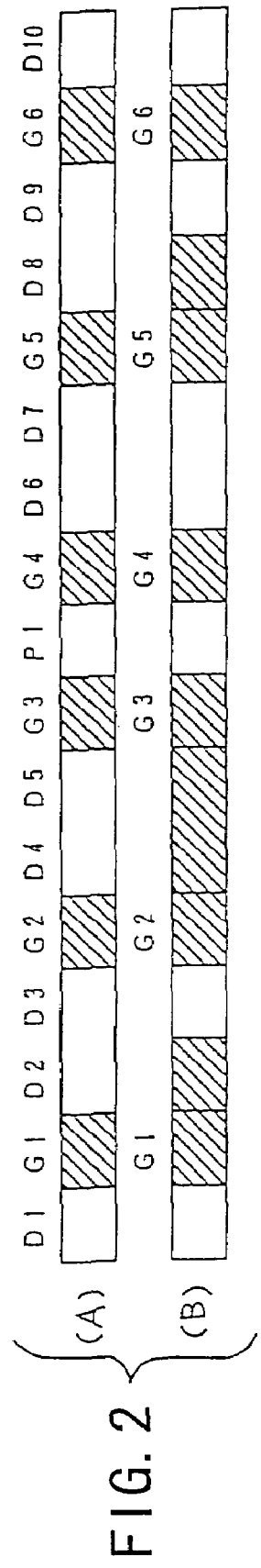
FIG. 2 is a diagram for explaining the format of a first embodiment of a read code 20.

FIG. 2 shows the format of a first embodiment of a read code 20. As shown in FIGS. 2 (A) and (B), the read code 20 includes guide bits G1 to G6 (which are indicated by the shaded lines) provided at given positions on the peripheral side edge of the card, data bits D1 to D10 each provided adjacent to one of the guide bits G1 to G6, and a parity bit P1 provided between two of the guide bits G1 to G6. In the present embodiment, the distances of the guide bits G1 to G6 from each of the extreme ends of the peripheral side edge of the card are fixed. Among the data bits D1 to D10 in the read code 20, when a portion of a certain data bit is printed with ink, the corresponding data bit represents the value one, and when a portion of a certain data bit is not printed with ink, the corresponding data bit represents the value zero.

In the present embodiment, a total value that is indicated by the set of the data bits D1 to D10 of the read code 20 of each card 12 correspond to a graphic pattern on the front surface of the card, such as the ace of spades or the ace of hearts. In the stack 10 of cards, a plurality of cards that have an identical total value indicated by the set of the data bits D1 to D10 of the corresponding read code may be included.

In the example of the read code indicated by FIG. 2 (A), all the data bits D1 to D10 represent the value zero. In the example of the read code indicated by FIG. 2 (B), the data bits D2, D4, D5 and D8 represent the value one and the data bits D1, D3, D6, D7, D9 and D10 represent the value zero. In the present embodiment, the read code is printed to each card with a fluorescent material (e.g., ink used to print the guide bits and the value-one data bits to the card) that generates a light ray, having a wavelength longer than a wavelength of a blue light, by irradiation of an excited UV (ultraviolet) light, and is colorless under a visible light. Hence, the reading of the code from the card can be easily performed by increasing the intensity of the irradiation light. On the other hand, the read code on the card is not perceptible to the user, and the illegal reproduction of the read code is prevented. As the read code on each card includes the guide bits provided at the given positions, the position of the read code in an image signal read from the card can be easily determined by using the guide bits for each card.

Figure 3:
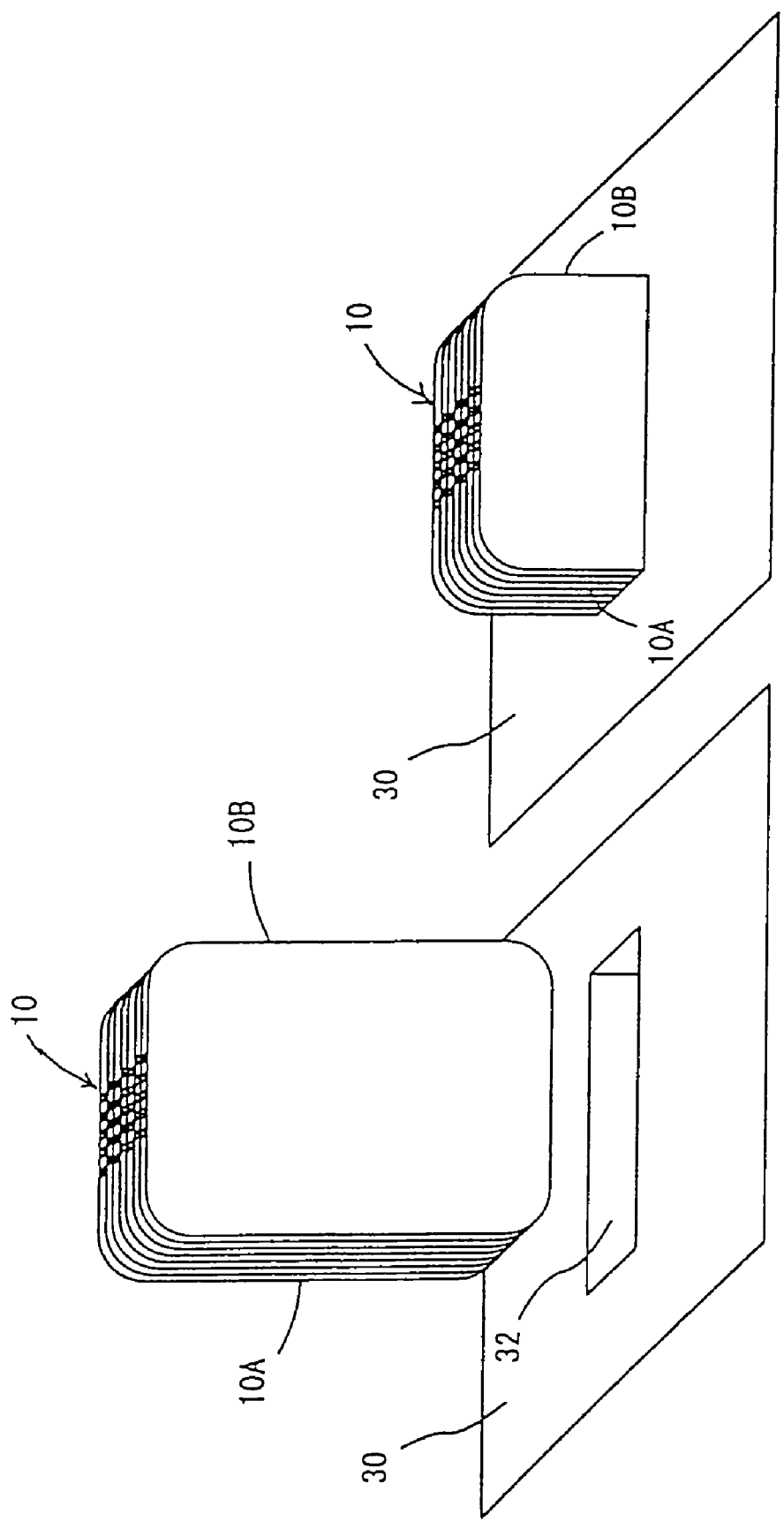
FIG. 3A is a diagram for explaining insertion of a stack of cards into the card stack reader of the present invention.
FIG. 3B is a diagram for explaining the insertion of the stack of cards into the card stack reader of the present invention.

FIG. 3A and FIG. 3B show insertion of the stack 10 of cards into the card stack reader 30 of the present invention. As shown in FIG. 3A, the card stack 10 is inserted from a card stack insertion inlet 32 into the card stack reader 30. The sides 10A and 10B of the stack 10 are snugly fitted to the edges of the insertion inlet 32 and are restricted by the insertion inlet 32 before the insertion. As shown in FIG. 3B, the sides 10A and 10B of the card stack 10 are arranged in an aligned condition, and the read code 20 is read from each card by the card stack reader 30.

Figure 4:
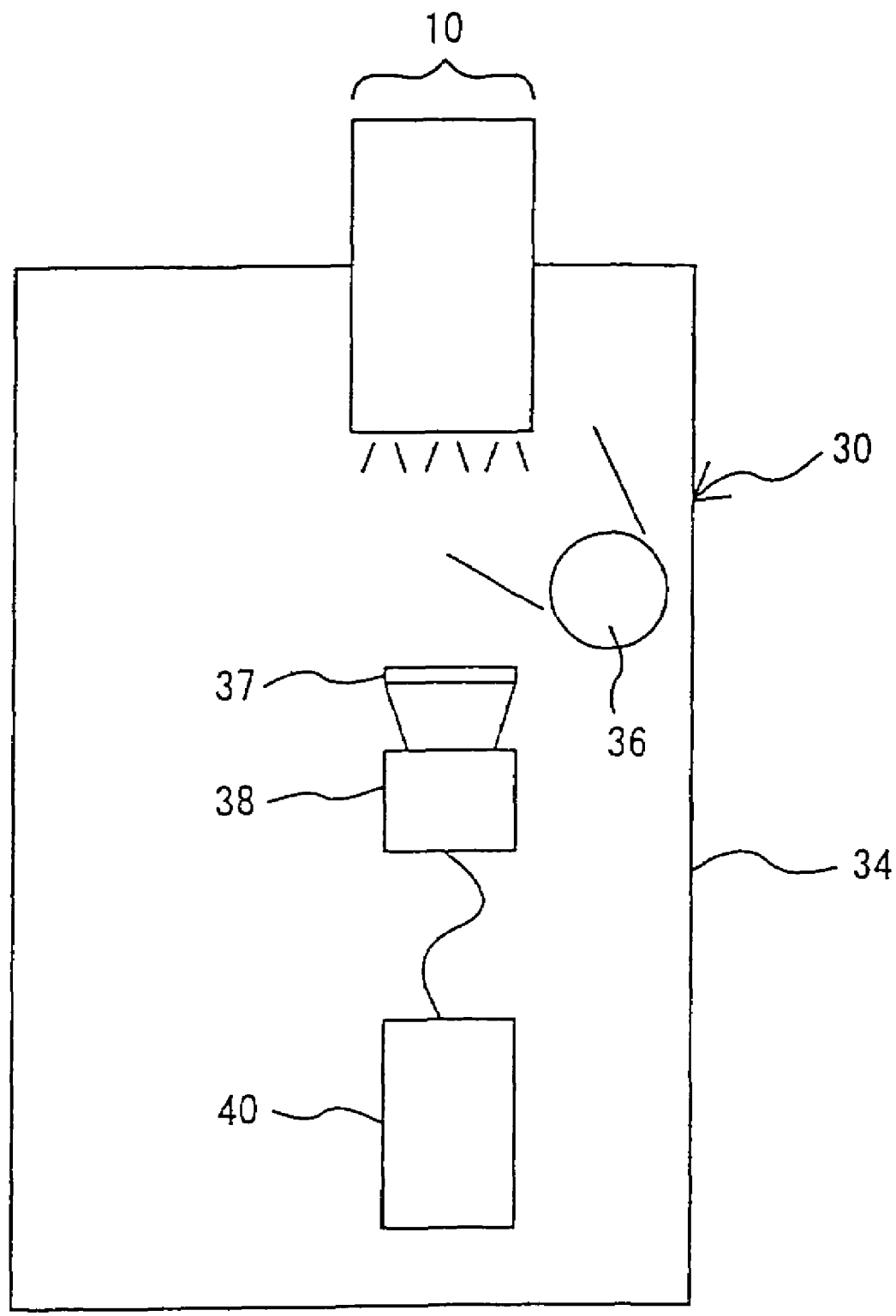
FIG. 4 is a cross-sectional view of a first embodiment of the card stack reader of the present invention.

FIG. 4 is a cross-sectional view of a first embodiment of the card stack reader of the present invention. As shown in FIG. 4, in the card stack reader 30 of the present embodiment, the card stack 10 is inserted and held in the insertion inlet 32. A housing 34 of the card stack reader 30 contains a UV lamp 36 provided therein. The UV lamp 36 is turned ON by the insertion of the card stack 10, and it irradiates the peripheral side portion of the card stack 10, where the read codes 20 are recorded to the respective cards, with an excited UV light. By the irradiation with the excited UV light, reflection light rays are generated from the guide bits and the value-one data bits or the parity bit of each card 12 in the stack 10.

In the card stack reader 30 of FIG. 4, an image sensor 38 is provided so as to face the peripheral side edges of the cards 12 in the card stack 10. An optical filter 37 is provided at a front portion of the image sensor 38. The optical filter 37 is in a laminated structure including a first filter and a second filter. The first filter cuts off a UV light, and the second filter cuts off a blue light. The reflection light in which the UV light and the blue light are removed by the optical filter 37 is incident to the image sensor 38. The image sensor 38 generates an image signal from the received light, and this image signal is supplied from the image sensor 38 to an image recognition device 40.

The image sensor 38 is sensitive to an incident UV light. The first filter of the optical filter 37 is provided to prevent the attenuation of an intensity difference detected from the reflection light when the UV light is incident to the image sensor 38. The card 12 is usually made of paper. If the paper as the source material of the card 12 contains a fluorescent substance, a blue light may be generated from the card 12 when it is irradiated with a UV light. The second filter of the optical filter 37 is provided to prevent the attenuation of an intensity difference detected from the reflection light when the blue light is incident to the image sensor 38. The fluorescent material of the read code 20 generates, upon the irradiation, a light ray having a wavelength longer than the wavelength of the blue light. The reflection light from the read code 20 passes through the optical filter 37 and is incident to the image sensor 38.

Suppose that the x direction of an image signal that is generates by the image sensor 38 corresponds to the direction of the short side of each card 12, and the y direction of the image signal corresponds to the card stacking direction of the stack 10.

Figure 5:
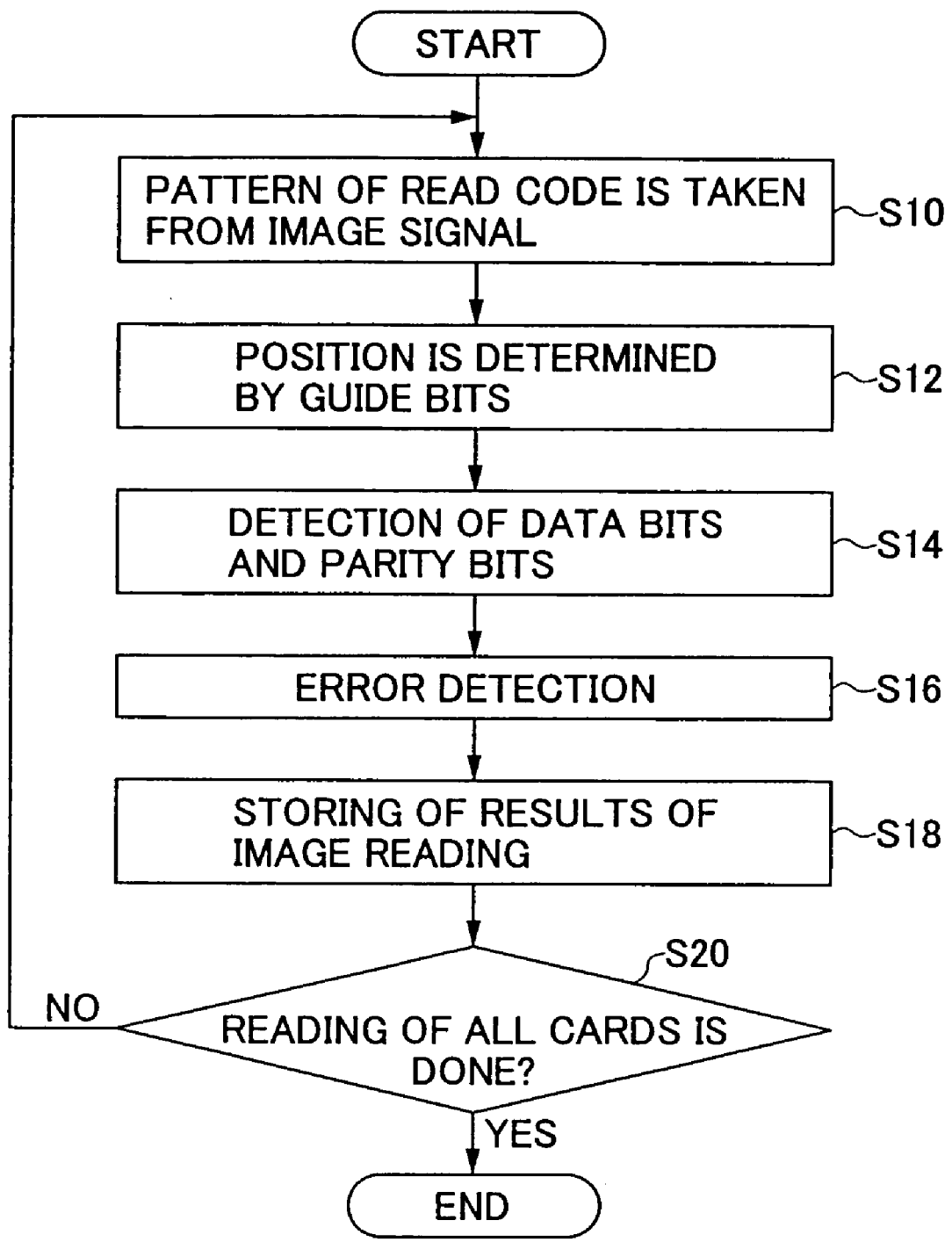
FIG. 5 is a flowchart for explaining a code recognizing process performed by an image recognition device 40 in the card stack reader of the present embodiment.

FIG. 5 is a flowchart for explaining a code recognizing process performed by the image recognition device 40 in the card stack reader of the present embodiment.

In the flowchart of FIG. 5, step S10 takes a pattern of the read code for each card from the image signal, received from the image sensor 38, by checking the sequence of the image signal in the y direction. The thickness of each card 12 is known. Step S12 determines the position of each bit of the pattern of the read code by comparing the pattern of the read code with a template corresponding to the guide bits G1 to G6. Step S14 detects whether each of the data bits D1 to D10 and the parity bit P1 (adjacent to the guide bits G1 to G6) in the pattern of the read code indicates the value one or the value zero.

After the step S14 is performed, step S16 performs an error detection based on the data bits D1 to D10 and the parity bit P1 in the pattern of the read code. Step S18 stores the results of the image reading, together with the results of the error detection, into a memory of the image recognition device 40. Alternatively, when an error is detected, the control may be transferred to the above step S10. After the step S16 is performed, step S20 determines whether the image reading of all the cards in the stack is done. After the image reading of all the cards in the stack is complete, the code recognizing process ends.

Figure 6:
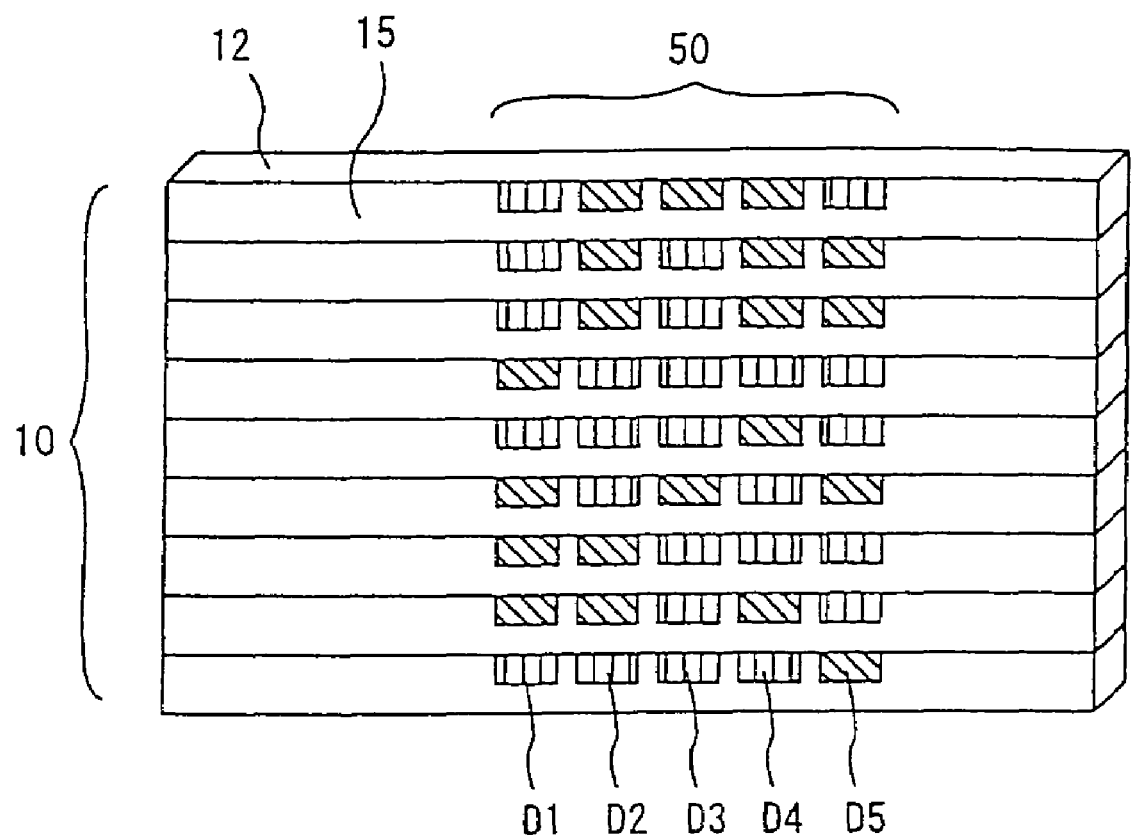
FIG. 6 is a perspective view of another embodiment of the stack of cards read by the card stack reader of the present invention.

FIG. 6 is a perspective view of another embodiment of the stack 10 of cards read by the card stack reader of the present invention. As shown in FIG. 6, each card 12, which is one in the stack 10 of cards, has a read code 50 along a peripheral side edge 15 of the card 12, which is a long side of the rectangle of the card. The read code 50 is recorded to each card 12 in order to identify the card 12. The read code 50 includes data bits D1 to D5. The distances of the data bits D1 to D5 from each of the extreme ends of the peripheral side edge of the card are fixed. In the present embodiment, the data bits are arrayed apart from each other by a predetermined distance along the peripheral side edge. However, the present invention is not limited to this embodiment.

In the present embodiment, the value-zero data bits of the read code (D1 to D5) are printed to the card with an ink that generates a red light ray by irradiation of an excited UV light, and is colorless under a visible light. The value-one data bits of the read code (D1 to D5) are printed to the card with another ink that generates a green light ray by irradiation of an excited UV light, and is colorless under a visible light. In FIG. 6, the value-zero data bits of the read code 50 are indicated by the vertical stripe lines, and the value-one data bits of the read code 50 are indicated by the shaded lines. The read code 50 on each card 12 is not perceptible to the user, and the method of the card code recognition is not easily found by the user.

In the card stack 10, the read code 50 is provided at the peripheral side edge of each card 12 on the back surface of the card. The respective read codes 50 of the cards 12 are arrayed apart from each other in the card stacking direction, and the image reading of the respective codes from the cards 12 in the stack 10 can be accurately and easily performed.

Figure 7:
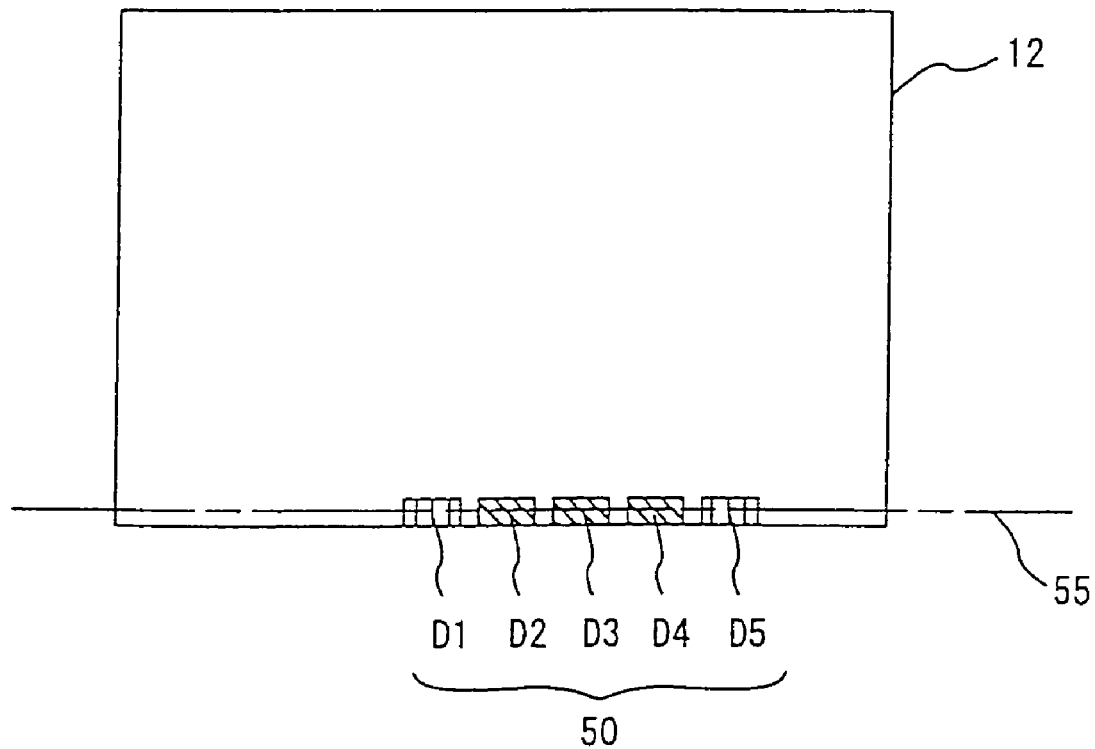
FIG. 7 is a diagram for explaining a first embodiment of the card manufacturing method of the present invention.

FIG. 7 shows a first embodiment of the card manufacturing method of the present invention. In a case in which the thickness of the card 12 is small, the following card manufacturing method is used. After the read code 50, including the data bits D1 to D5, is printed to a portion adjacent to the peripheral side edge of the card 12 on the back surface thereof, the card 12 is cut along a straight line 55 passing through the coded-printed portion to form the peripheral side edge of the card 12 where the read code 50 is printed. By this manufacturing method, it is possible to produce the card 12 of FIG. 6 in which the read code 50 is provided at the peripheral side edge 15 of the card on the back surface thereof.

The source material of the read code 20 is not limited to the fluorescent material. Alternatively, the read code 20 may be printed to the card using normal ink. Moreover, the read code 20 may be printed to the card with an ink that generates an infrared light ray or a visible light ray by irradiation of an excited UV light, and is colorless under a visible light. By such embodiment, the read code 20 on each card 12 is not perceptible to the user, the method of the card code recognition is not easily found by the user, and the illegal reproduction of the read code 20 or the card 12 is prevented.

Figure 8:
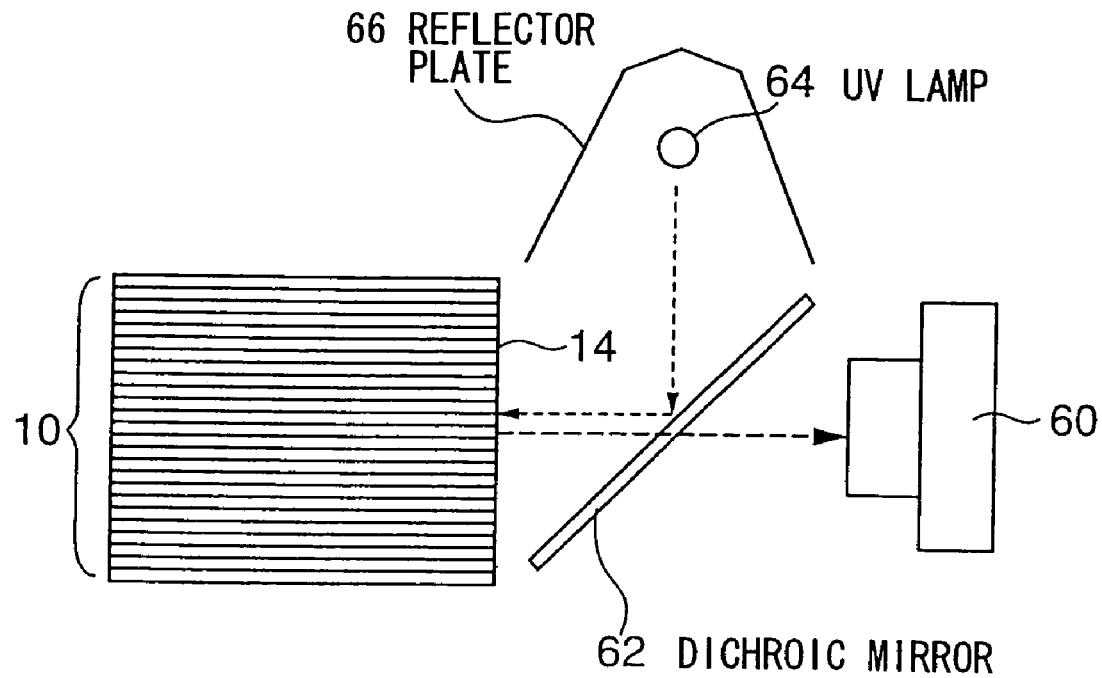
FIG. 8 is a diagram showing a second embodiment of the card stack reader of the present invention.

FIG. 8 shows a second embodiment of the card stack reader of the present invention. As shown in FIG. 8, in the card stack reader of the present embodiment, the card stack 10 is provided with the four sides of the cards being aligned. An image sensor 60 is provided to straightly confront the peripheral side portion 14 of the card stack 10 where the read code is printed to each card 12. A dichroic mirror 62 is provided between the card stack 10 and the image sensor 60, such that the surface of the dichroic mirror 62 is inclined at 45 degrees to the optical axis of the image sensor 60. A UV lamp 64 is provided so that the optical path of a UV light emitted by the UV lamp 64 crosses the optical axis of the image sensor 60 at right angles. A reflector plate 66 is attached to the UV lamp 64 in order to direct the UV light of the UV lamp 64 toward the dichroic mirror 62. The reflector plate 66 serves to prevent the scattering of the UV light in different directions than the direction toward the dichroic mirror 62.

In the present embodiment, the read code 20 is printed to each card 12 with an ink that generates an infrared or visible light ray by irradiation of an excited UV light, and is colorless under a visible light. The dichroic mirror 62 serves to reflect a UV light and transmit an infrared or visible light ray.

The UV light emitted by the UV lamp 60 is reflected at the dichroic mirror 62, and this reflected UV light is incident to the peripheral side portion 14 of the card stack 10 at right angles. The infrared or visible light ray is generated from the read code 20 of each card by the irradiation of the UV light, and this infrared or visible light ray passes through the dichroic mirror 62 and is incident to the image sensor 60. The image sensor 60 generates an image signal from the received light.

In the present embodiment, by using the dichroic mirror 62, the peripheral side portion 14 of the card stack 10 can be irradiated with the UV light that is incident to the peripheral side portion 14 at right angles, and the infrared or visible light ray, generated from the read code 12 of each card, can be incident to the image sensor 60. The image reading of the codes of the cards can be accurately performed. Even when the four sides of the card stack 10 are arranged with surface irregularities, the influences due to the surface irregularities can be eliminated. Furthermore, the dichroic mirror 62 serves to prevent the attenuation of an intensity difference detected from the reflection light when the undesired UV light enters the image sensor 60.

Alternatively, a line sensor that scans the peripheral side edge 14 of the card stack 10 may be used instead of the image sensor 60 in the card stack reader of the present embodiment. Furthermore, a dichroic mirror that serves to transmit a UV light ray and reflect an infrared or visible light ray may be used instead. According to such embodiment, the position of the image sensor 60 and the position of the UV lamp 64 in the card stack reader can be exchanged.

Figure 9:
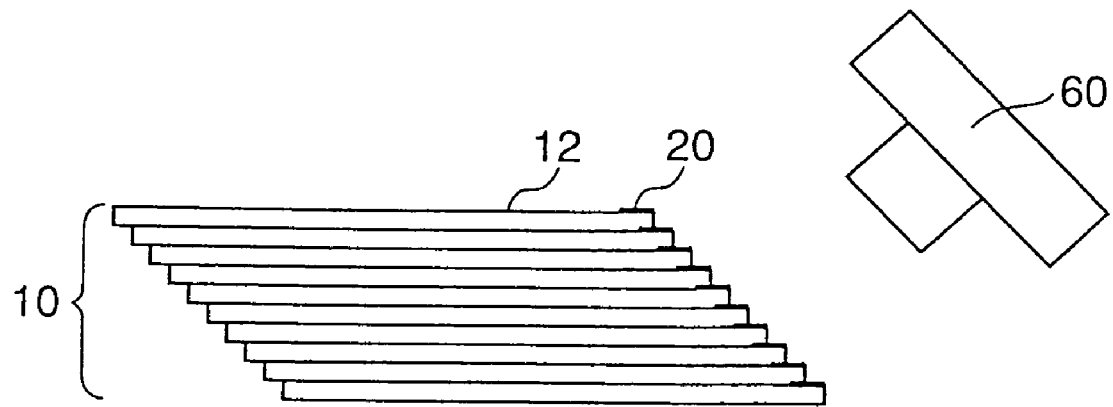
FIG. 9 is a diagram showing a third embodiment of the card stack reader of the present invention.
Figure 10:
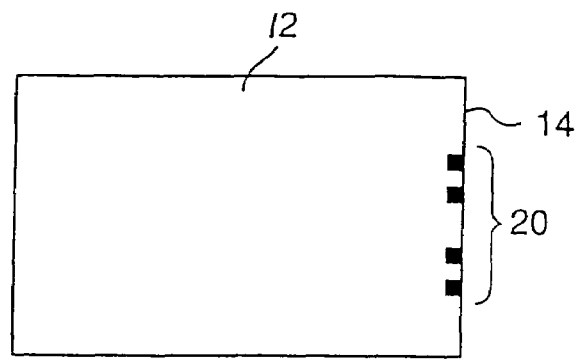
FIG. 10 is a top view of the card 12 of the present invention.

FIG. 9 shows a third embodiment of the card stack reader of the present invention. As shown in FIG. 9, in the card stack reader of the present embodiment, the card stack 10 is held with the two sides of the cards being aligned and the remaining two sides being inclined. As shown in FIG. 10, the card 12 has a read code 20 provided on a front surface of the car along the peripheral side edge 14 thereof. The read code 20 is similar to the embodiment of FIG. 7. After the read code 20 is printed to a portion adjacent to the peripheral side edge of the card 12 on the front surface thereof, the card 12 is cut along a straight line passing through the coded-printed portion to form the peripheral side edge of the card 12 where the read code 20 is printed.

In the card stack reader of the present embodiment, an image sensor 60 is provided to straightly confront the inclined side surface of the card stack 10 that are formed by the peripheral side edges of the cards 12 where the read code 20 is printed to each card. A UV light emitted by a UV lamp (not shown) is incident to the card stack 10 from the upper direction. An infrared or visible light ray is generated from the read code 20 of each card by the irradiation of the UV light, and this infrared or visible light ray is incident to the image sensor 60. The image sensor 60 generates an image signal from the received light.

Figure 11:
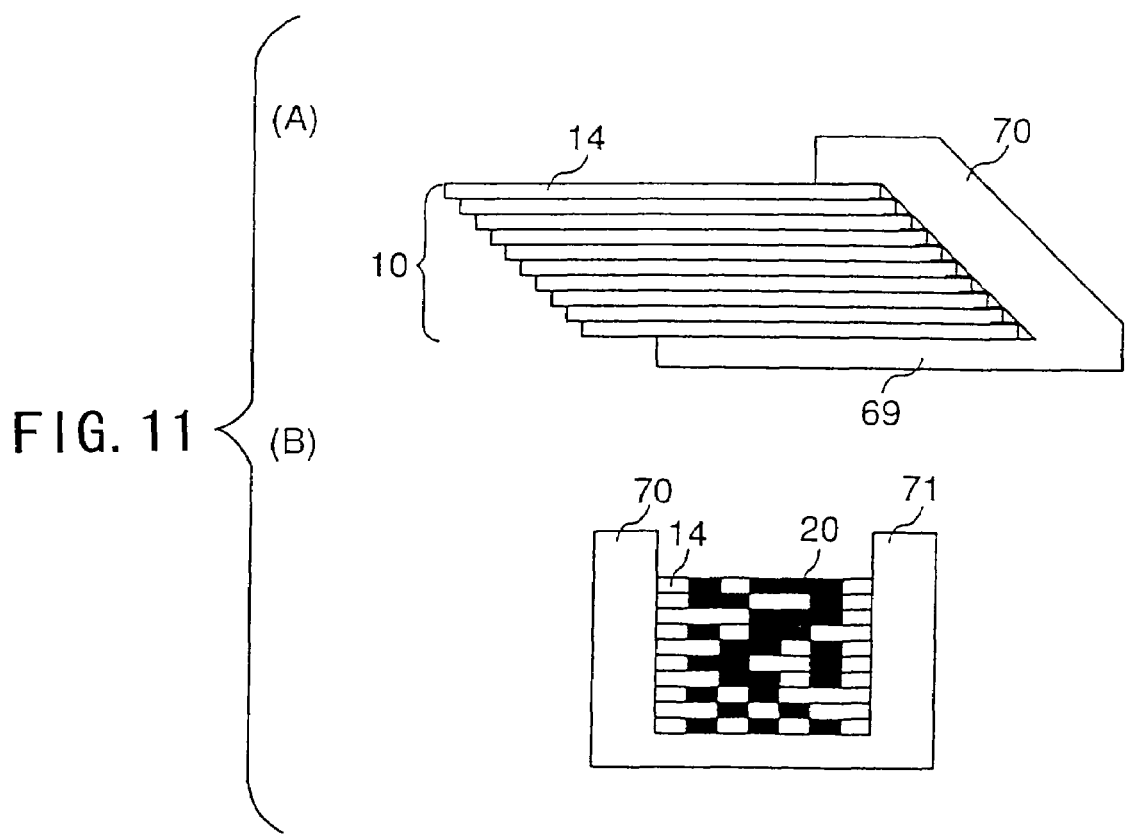
FIG. 11 is a diagram showing a first embodiment of a card holder.

In the above-mentioned embodiment, in order to hold the card stack 10 with the two sides thereof aligned and the remaining two sides thereof inclined, the card stack reader requires a card holder. FIG. 11 shows a first embodiment of the card holder. In FIG. 11, (A) indicates a front view of the card holder, and (B) indicates a side view of the card holder. The card holder of the present embodiment generally includes a base portion 69 and side portions 70 and 71. The side portions 70 and 71 are inclined relative to the base portion 69. The card holder of this embodiment holds the card stack 10 with the two sides being aligned and the remaining two sides inclined. As shown in FIG. 11 (A), the card stack 10 is brought into contact with the card holder from the left position. As shown in FIG. 11 (B), the read code 20 of each card is exposed in the position between the side portions 70 and 71 of the card holder, and it is imaged by the image sensor 60 of the card stack reader of the present embodiment.

In a case in which the thickness of the card 12 is small and the read code 20 is printed to the peripheral side edge of the card on the front surface, the image reading of the codes 20 from the card stack 10 can be performed with good efficiency.

Figure 12:
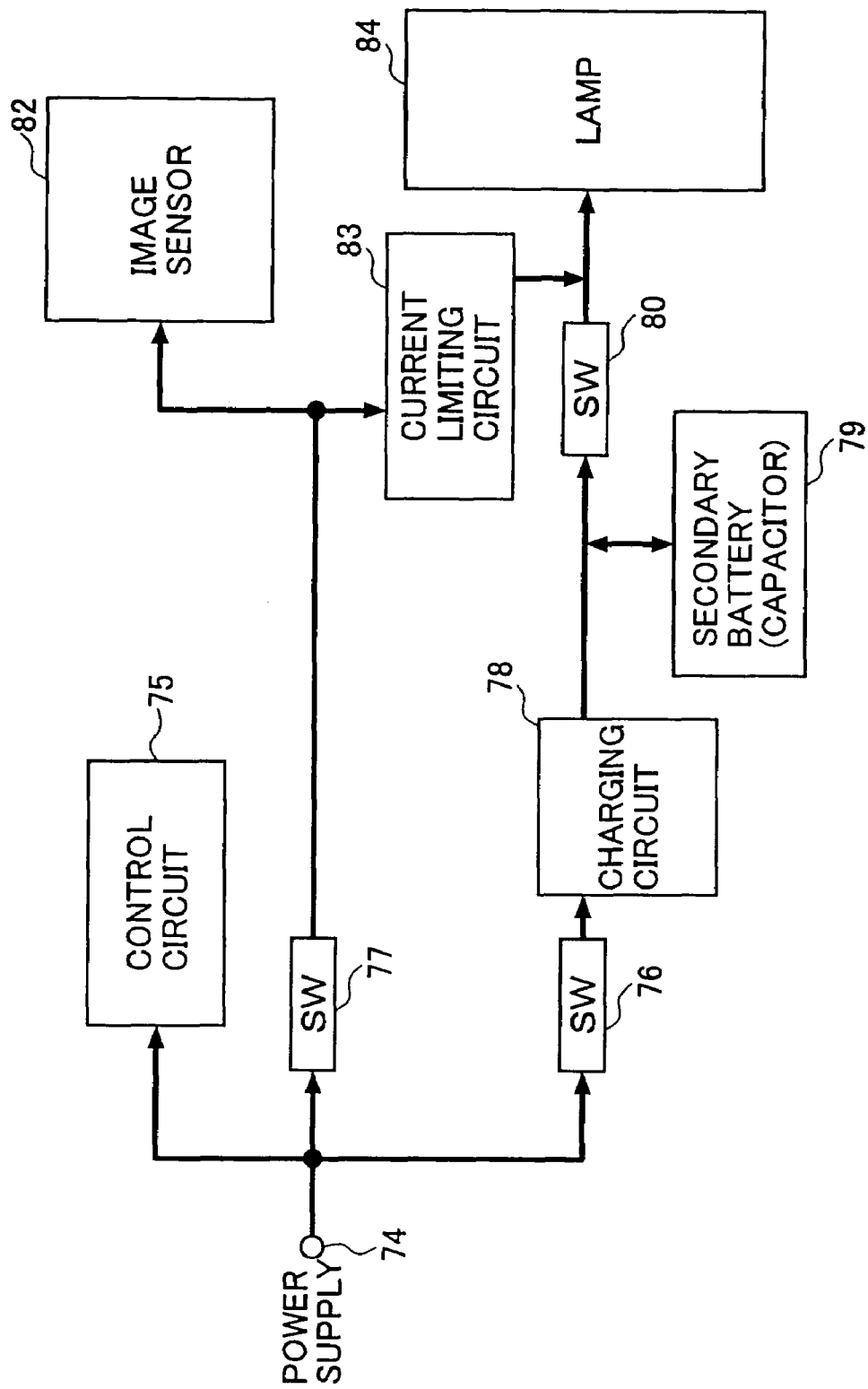
FIG. 12 is a block diagram of one embodiment of the card stack reader of the present invention.

FIG. 12 is a block diagram of one embodiment of the card stack reader of the present invention. As shown in FIG. 12, in the card stack reader of the present embodiment, power of a power supply is supplied from a terminal 74 to each of a control circuit 75, a switch 76 and a switch 77. The switch 76 is connected to an input of a charging circuit 78, and an output of the charging circuit 78 is connected to each of a switch 80 and a secondary battery (or a capacitor) 79. The switch 77 is connected to each of an input of an image sensor 82 and an input of a current limiting circuit 83. An output of the current limiting circuit 83 is connected to a lamp 84 which is, for example, a UV lamp. The switch 80 is connected to the lamp 84.

In the present embodiment, a power (5 V/800 mA at the maximum) from a power supply of a host system (either a game machine or a personal computer) is supplied to the card stack reader via a USB interface. Suppose that the consumption current of the lamp 84 is 600 mA and the consumption current of the image sensor 82 is 500 mA. In such a case, the consumption current of the entire card stack reader amounts to 1.1 A, and the card stack reader does not operate.

To eliminate the problem, when the image reading is not performed, the control circuit 75 sets the switch 76 in ON state and sets the switches 77 and 80 in OFF state. The power is supplied to the charging circuit 78, and the charging circuit 78 performs the charging of the secondary battery 79.

When the image reading is performed, a reading command from the host system is delivered to the control circuit 75. The control circuit 75 sets the switch 76 in OFF state and sets the switches 77 and 80 in ON state. The 500 mA current is supplied from the terminal 74 to the image sensor 82, and the remaining 500 mA current from the terminal 74 is supplied to the lamp 84 through the current limiting circuit 83. Further, the 300 mA current is supplied from the secondary battery 79 to the lamp 84. The card stack reader is operational in this condition, and can perform the image reading of the read code 20.

Figure 13A:
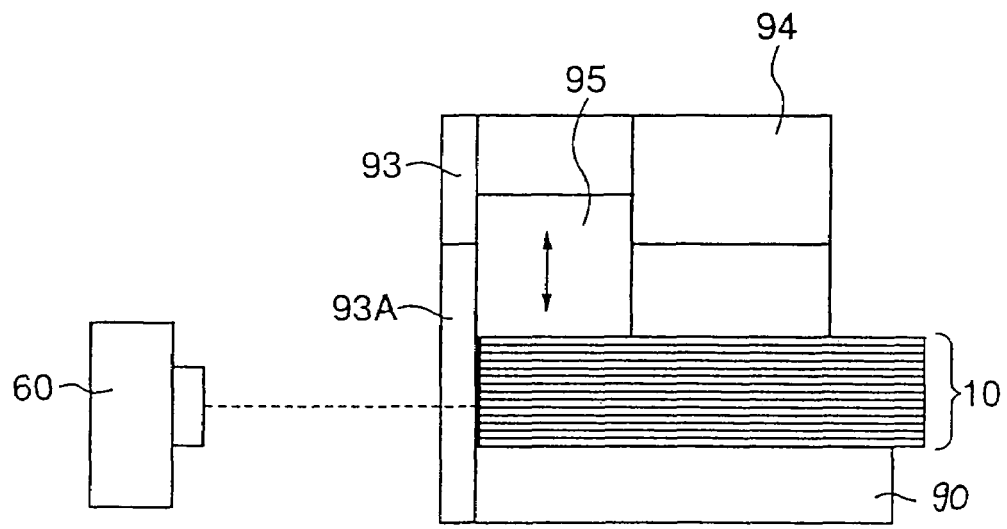
FIG. 13A is a front view of a second embodiment of the card holder in the card stack reader of the present invention.
Figure 13B:
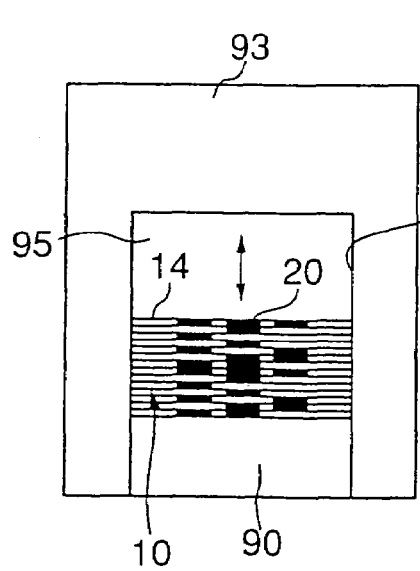
FIG. 13B is a side view of the second embodiment of the card holder in the card stack reader of the present invention.
Figure 13C:
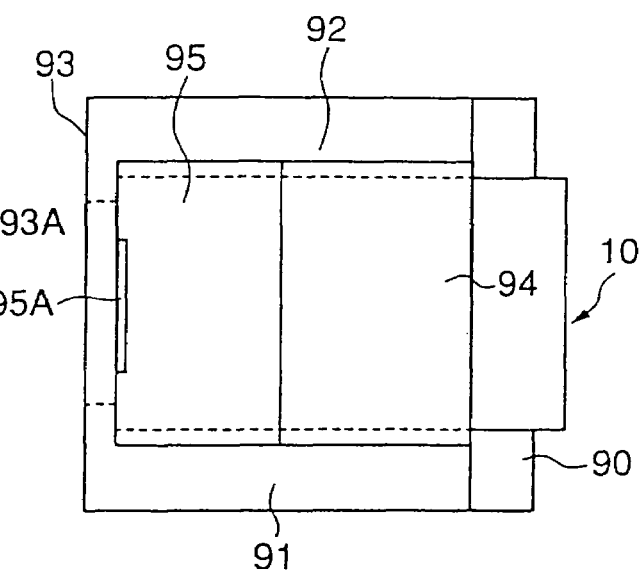
FIG. 13C is a top view of the second embodiment of the card holder in the card stack reader of the present invention.

FIG. 13A, FIG. 13B and FIG. 13C show a second embodiment of the card holder in the card stack reader of the invention. FIG. 13A is a front view of the card holder of the present embodiment, FIG. 13B is a side view of the card holder of the present embodiment, and FIG. 13C is a top view of the card holder of the present embodiment. As shown, the card holder of the present embodiment generally includes a base portion 90, side portions 91 and 92, a front plate 93, a top plate 94, and a pressure member 95.

The side portions 91 and 92 are provided on the base portion 90, and the side portions 91 and 92 confront each other to form a width between them that is slightly larger than the width of the card 12. The side portions 91 and 92 serve to arrange the two sides of the card stack 10 in an aligned condition. The front plate 93 is an inverted U-shaped member including a cut-out portion 93A. The front plate 93 is provided on the base portion 90. The side ends of the front plate 93 are bonded to the side portions 91 and 92. The width of the cut-out portion 93A is set to be smaller than the width of the card 12. The card stack 10 is inserted from the right side of FIG. 13A to the card holder, and brought into contact with the back surface of the front plate 93. The read code 20 of each card of the card stack 10 is exposed in the cut-out portion 93A of the front plate 93, and the read code 20 is read by the image sensor 60.

The top plate 94 is placed onto the side portions 91 and 92 and fixed thereto. As shown in FIG. 13C, the pressure member 95 is snugly inserted into the place surrounded by the side portions 91 and 92 and the front plate 93 and the top plate 94. The pressure member 95 is movable in vertical directions as indicated by the arrows in FIG. 13B. After the card stack 10 is inserted to the card holder, the pressure member 95 exerts pressure on the upper surface of the card stack 10 where the read code 20 is provided. In such a condition, the left ends of the base portion 90 and the pressure member 95 are slightly shifted in the right direction from the left end of the card stack 10 such that the shadows of the base portion 90 and the pressure member 95 do not affect the image reading of the read codes of the cards.

According to the above-described embodiment, even when each card of the card stack 10 has a curling, the upper surface of the card stack 10 is pressed by the pressure member 95, and the accuracy of the image reading by the card stack reader is increased.

Figure 14A:
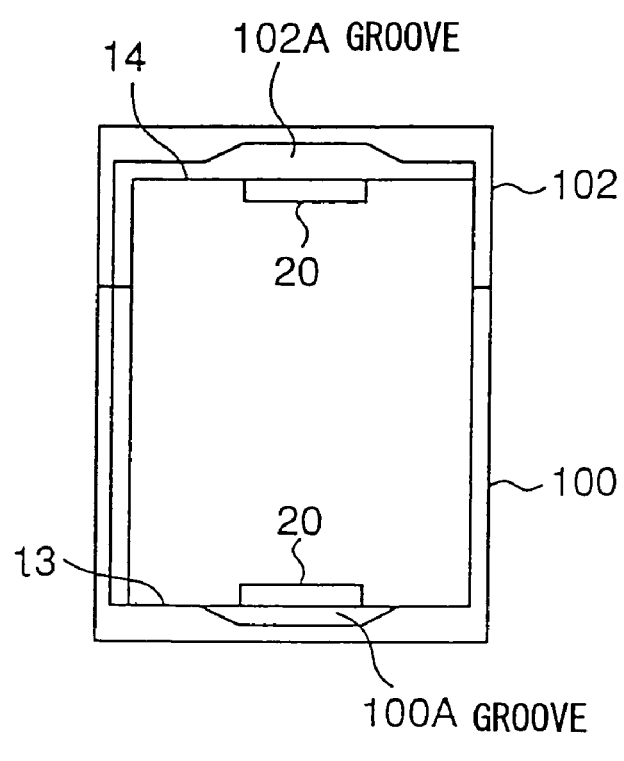
FIG. 14A is a front view of a first embodiment of a card case in the card stack reader of the present invention.
Figure 14B:
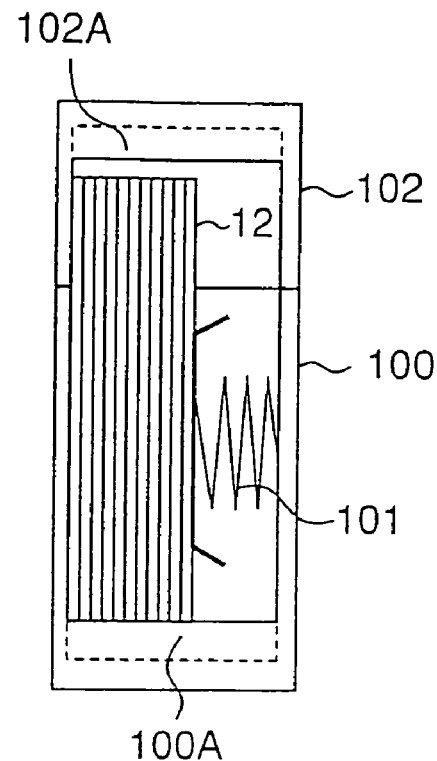
FIG. 14B is a side view of the first embodiment of the card case in the card stack reader of the present invention.

FIG. 14A is a front view of a first embodiment of a card case in the card stack reader of the present invention. FIG. 14B is a side view of the first embodiment of the card case. As shown, the card case of the present embodiment generally includes a main body 100 and a lid member 102. The main body 100 contains the card stack 10 inserted thereto. In the main body 100, a spring member 101 that exerts pressure on the cards of the stack 10 in a card stacking direction is provided. On the bottom surface of the main body 100, a grooved portion 100A is provided so as to inhibit the peripheral side edges of the cards where the read codes are provided from touching the card case. Furthermore, on the bottom surface of the lid member 102, a grooved portion 102A is provided so as to inhibit the peripheral side edges of the cards where the read codes are provided from touching the card case. The ends of the grooved portions 100A and 102A are curved so as to prevent the damaging of the card stack 10 when it contacts the card case.

Figure 15:
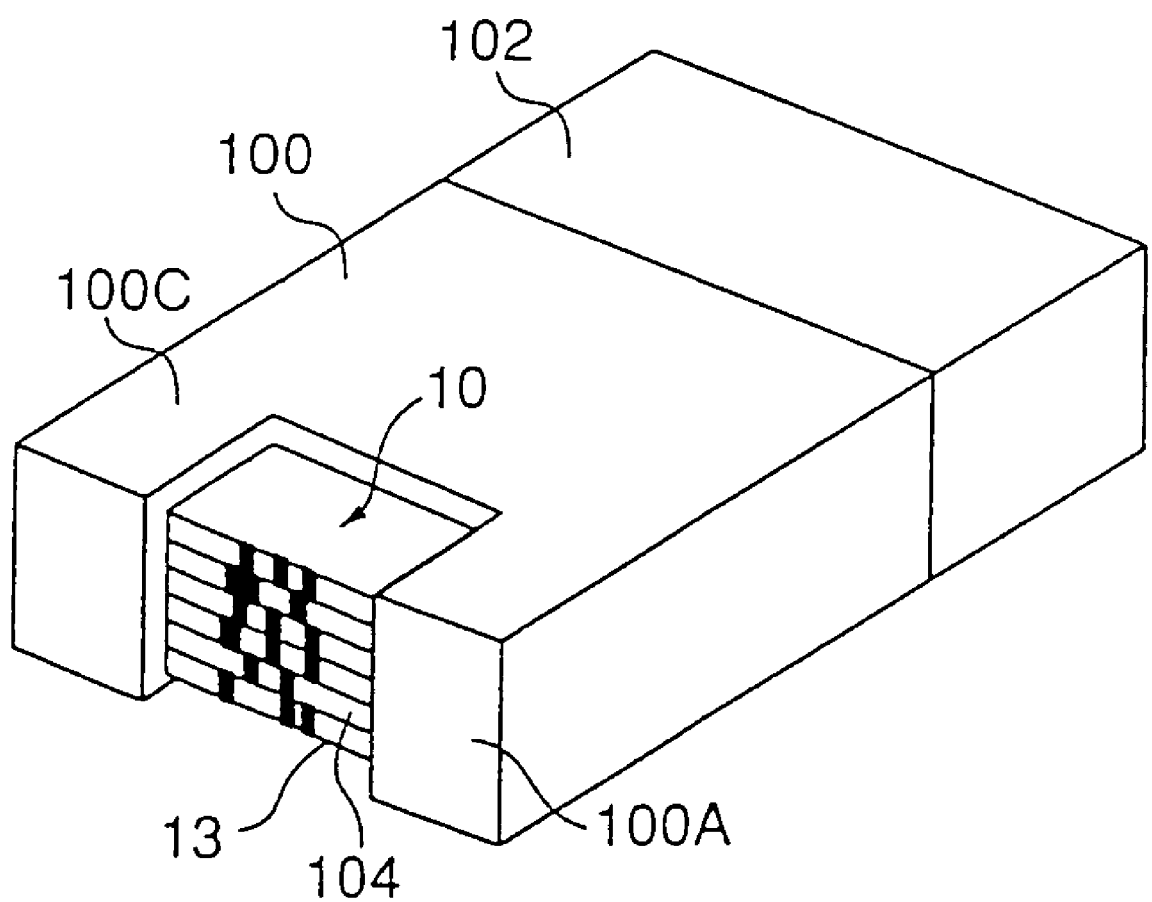
FIG. 15 is a perspective view of a second embodiment of the card case in the card stack reader of the present invention.

FIG. 15 is a perspective view of a second embodiment of the card case in the card stack reader of the present invention. As shown, the card case of the present embodiment generally includes a main body 100 and a lid member 102. The internal structure of this card case is the same as that of the card case of FIG. 14. Apart from the previous embodiment, the card case of the present embodiment includes an access window 104 provided at a position corresponding to the peripheral side portion of the card stack 10. The access window 104 extends from the bottom surface 100B to the side surface 100C of the main body 100. The grooved portion 100A as in the previous embodiment is not provided in the card case of the present embodiment.

The read code 20 provided at the peripheral side edge 13 of each card of the card stack 10 is exposed at the access window 104. According to the present embodiment, the card case containing the card stack 10 is inserted to the card holder of FIG. 13, so that the image reading of the read code 20 from the card stack 10 can be performed.

Figure 16A:
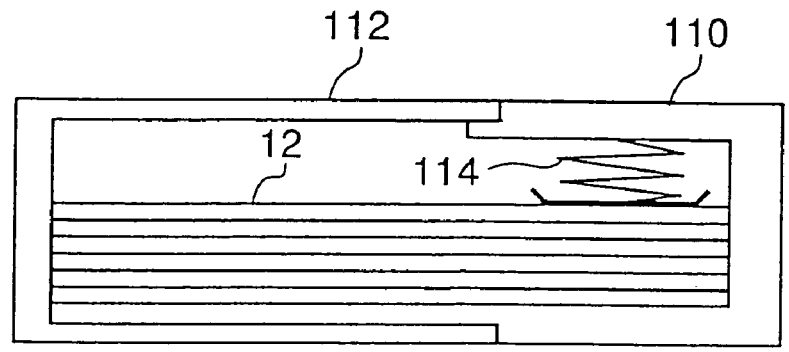
FIG. 16A is a front cross-sectional view of a third embodiment of the card case in the card stack reader of the present invention.
Figure 16B:
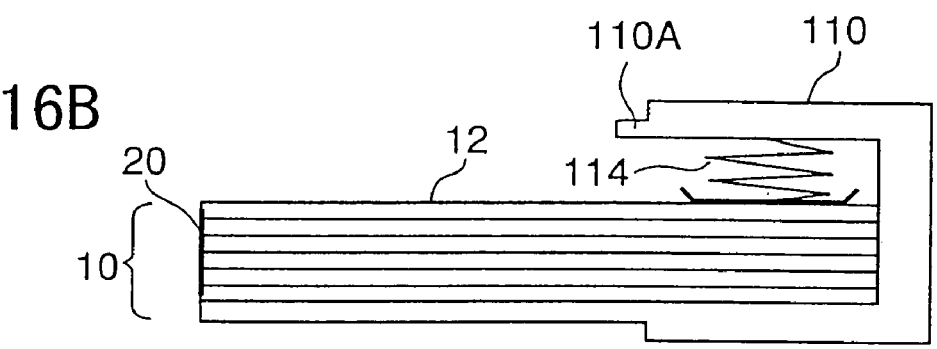
FIG. 16B is a front cross-sectional view of a main body 110 of the third embodiment of the card case in the card stack reader of the present invention.
Figure 16C:
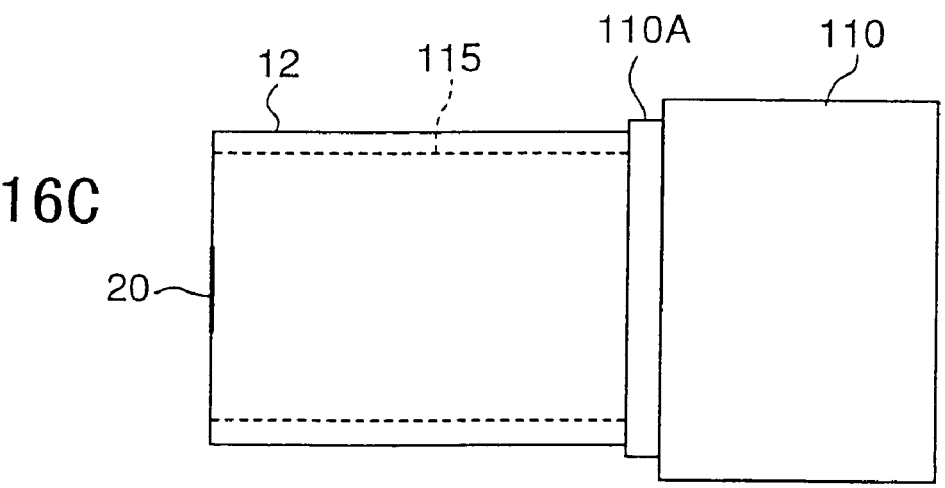
FIG. 16C is a top view of the third embodiment of the card case in the card stack reader of the present invention.

FIG. 16A, FIG. 16B and FIG. 16C shows a third embodiment of the card case in the card stack reader of the invention. FIG. 16A is a front cross-sectional view of the card case of the present embodiment. FIG. 16B is a front cross-sectional view of a main body 110 of the card case of the present embodiment. FIG. 16C is a top view of the card case of the present embodiment. The card case of the present embodiment generally includes a main body 110 and a lid member 112. The main body 110 contains the card stack 10 inserted thereto. In the main body 110, a spring member 114 that exerts pressure on the cards of the stack 10 in a card stacking direction is provided. The lid member 112 is integrally connected to the main body 100, and the lid member 112 covers an exposed portion of the card stack that is not contained in the main body 100. According to the present embodiment, with the lid member 112 being removed, the card case containing the card stack 10 is inserted to the card holder of FIG. 13, so that the image reading of the read code 20 from the card stack 10 can be performed.

Figure 17A:
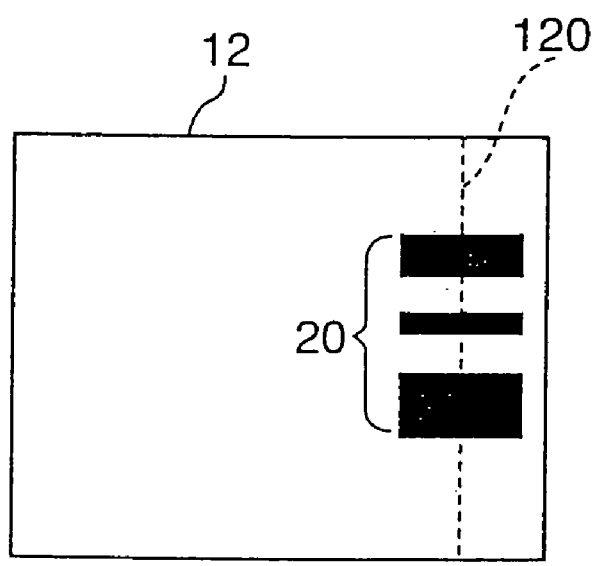
FIG. 17A is a top view of the card for explaining a second embodiment of the card manufacturing method of the present invention.
Figure 17B:
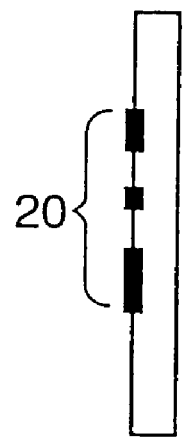
FIG. 17B is a cross-sectional view of the card for explaining the second embodiment of the card manufacturing method of the present invention.
Figure 17C:
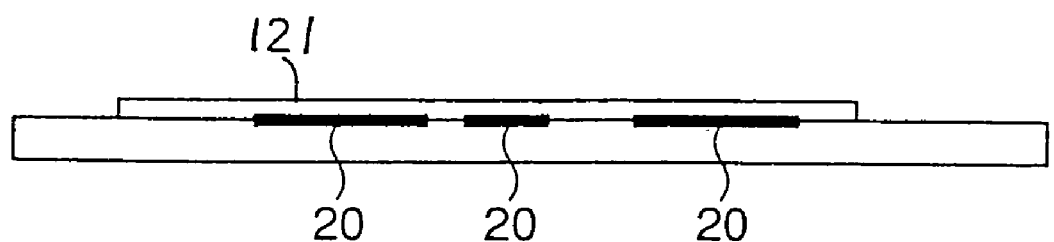
FIG. 17C is an enlarged cross-sectional view of the card for explaining the second embodiment of the card manufacturing method of the present invention.

FIG. 17A, FIG. 17B and FIG. 17C show a second embodiment of the card manufacturing method of the invention. FIG. 17A is a top view of the card for explaining the card manufacturing method of the present embodiment. FIG. 17B is a cross-sectional view of the card for explaining the card manufacturing method of the present embodiment. FIG. 17C is an enlarged cross-sectional view of the card for explaining the card manufacturing method of the present embodiment.

By using a screen printing method or an offset printing method, the read code 20 including a set of bars is printed to the surface of the card 12 shown in FIG. 17A such that the read code 20 crosses a cut-off line 120. The printing of the read code 20 is performed such that the ink deeply penetrates the card 12. After the card 12 is cut along the cut-off line 120 as shown in FIG. 17B, the area of the read code 20 that remains in the card 12 can be increased. In the present embodiment, a fluorescent ink is used to print the read code 20 to the card 12. According to the present embodiment, if the area of the read code 20 is small, the image reading of the read code 20 from the card can be performed.

As shown in FIG. 17C, a normal printing surface 121 is formed on the read code 20 printed to the card. The read code 20 on the card 12 is concealed by the printing surface 121. The illegal duplication of the read code 20 of the card is prevented. The read code 20 is printed to the card 12 with a fluorescent ink that generates an infrared or visible light ray by irradiation of an excited UV light, and a graphic pattern is printed to the card with an ink that is transparent under an infrared or visible light. According to the present embodiment, if the printed read code 20 and the printed graphic pattern coexist on the card 12 at the same position, the image reading of the read code 20 is not significantly affected by the printed graphic pattern.

FIG. 18A, FIG. 18B and FIG. 18C show a third embodiment of the card manufacturing method of the invention. FIG. 18A is a top view of the card before printing. FIG. 18B is a top view of the card after the printing. FIG. 18C is a side view of the card after the printing for explaining the third embodiment of the card manufacturing method of the present invention. As shown in FIG. 18A and FIG. 18B, by using a convex printing board 130, the read code 20 is printed to the peripheral side edge 12 of the card 12. A graphic pattern is already printed to the surface of the card 12.

As shown in FIG. 18C, the card stack 10 is formed with a plurality of the cards 12, and the four sides of the card stack 10 are arranged in an aligned condition. The same read code 20 is printed to the peripheral side edges of the cards 12 in the stack 10 simultaneously. The efficiency of the card manufacturing is increased. If the printing of the read code 20 is performed such that the ink deeply penetrates the card 12, the wear resistance of the read code 20 is increased. If a transparent varnish is applied to the peripheral side edge of the card after the printing of the read code 20 is performed, the wear resistance and water resistance of the read code 20 is increased.

Figure 19A:
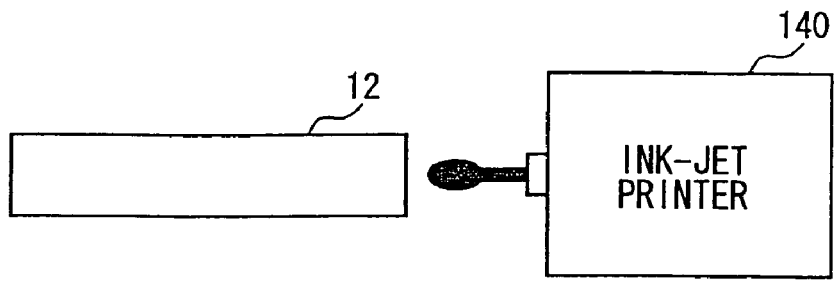
FIG. 19A is a side view of the card for explaining a fourth embodiment of the card manufacturing method of the present invention.
Figure 19B:
FIG. 19B is a cross-sectional side view of the card for explaining the fourth embodiment of the card manufacturing method of the present invention.

FIG. 19A is a side view of the card for explaining a fourth embodiment of the card manufacturing method of the invention. FIG. 19B is a cross-sectional side view of the card for explaining the fourth embodiment of the card manufacturing method of the invention. As shown in FIG. 19A, by using an ink-jet printer 140, the read code 20 is printed to the peripheral side edge of the card 12. A graphic pattern is already printed to the surface of the card 12.

Using the ink-jet printer 140 for the printing of the read code 20 is advantageous in that an ink having a viscosity lower than the viscosity of a normal printing ink can be used. As shown in FIG. 19B, the ink can deeply penetrate the side of the card 12. If the amount of pigment in the ink is increased, the read code 20 is protected against surface flaws or wearing.

The use of the ink-jet printer 140 is advantageous in that the ink is printed directly to the side of the card, which increases the stability of the printed read code even if the surface irregularities remain on the cut surface of the card 12.

Although it is necessary to print the read code 20 of different code data to the cards 12 of different kinds in the normal printing, the use of the ink-jet printer 140 is advantageous in that the code data by which the ink-jet printer 140 prints the read code 20 can be managed by a computer and modifications of the code data may be made.

Figure 20:
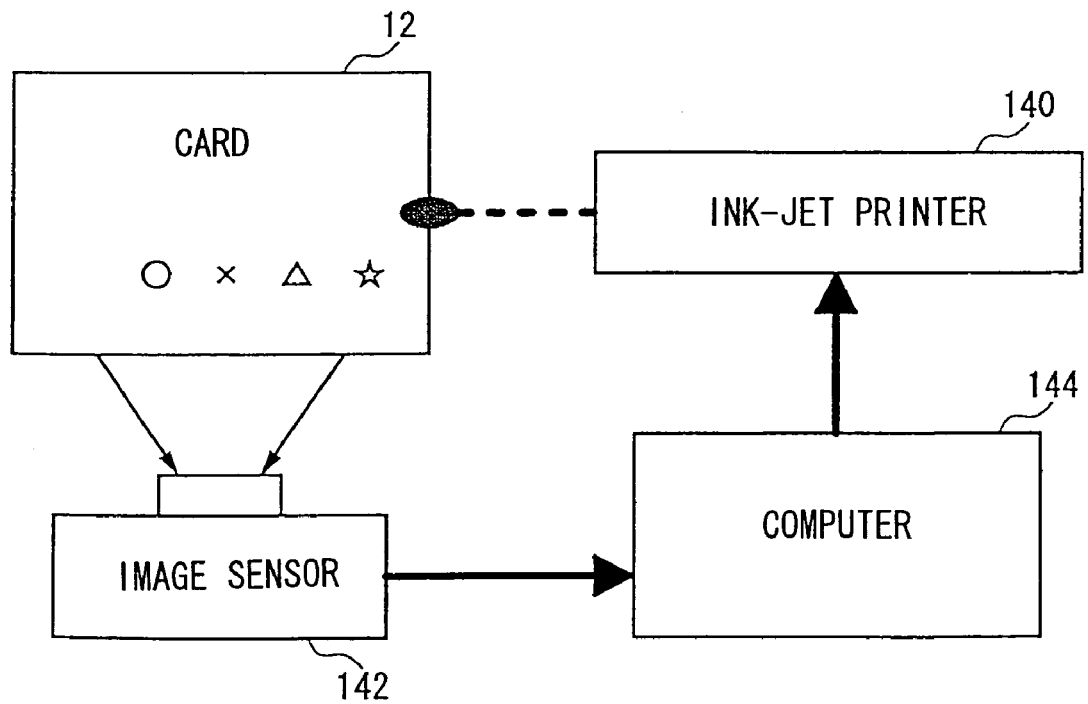
FIG. 20 is a diagram for explaining a variation of the fourth embodiment of the card manufacturing method of the present invention.

FIG. 20 shows a variation of the fourth embodiment of the card manufacturing method of the invention. In the present embodiment, an image sensor 142 generates an image signal from the graphic pattern of the surface of the card 12, and the image signal is sent to a computer 144. The computer 144 recognizes an image of the graphic pattern of the card 12 from the received image signal, and generates code data based on the recognized image. The computer 144 transmits a print command to the ink-jet printer 140 so that the ink-jet printer 140 prints the read code 20 to the peripheral side edge of the card 12 in accordance with the code data. The printing of the read code 20 in accordance with the graphic pattern of the card 12 can be performed accurately.

Figure 21:
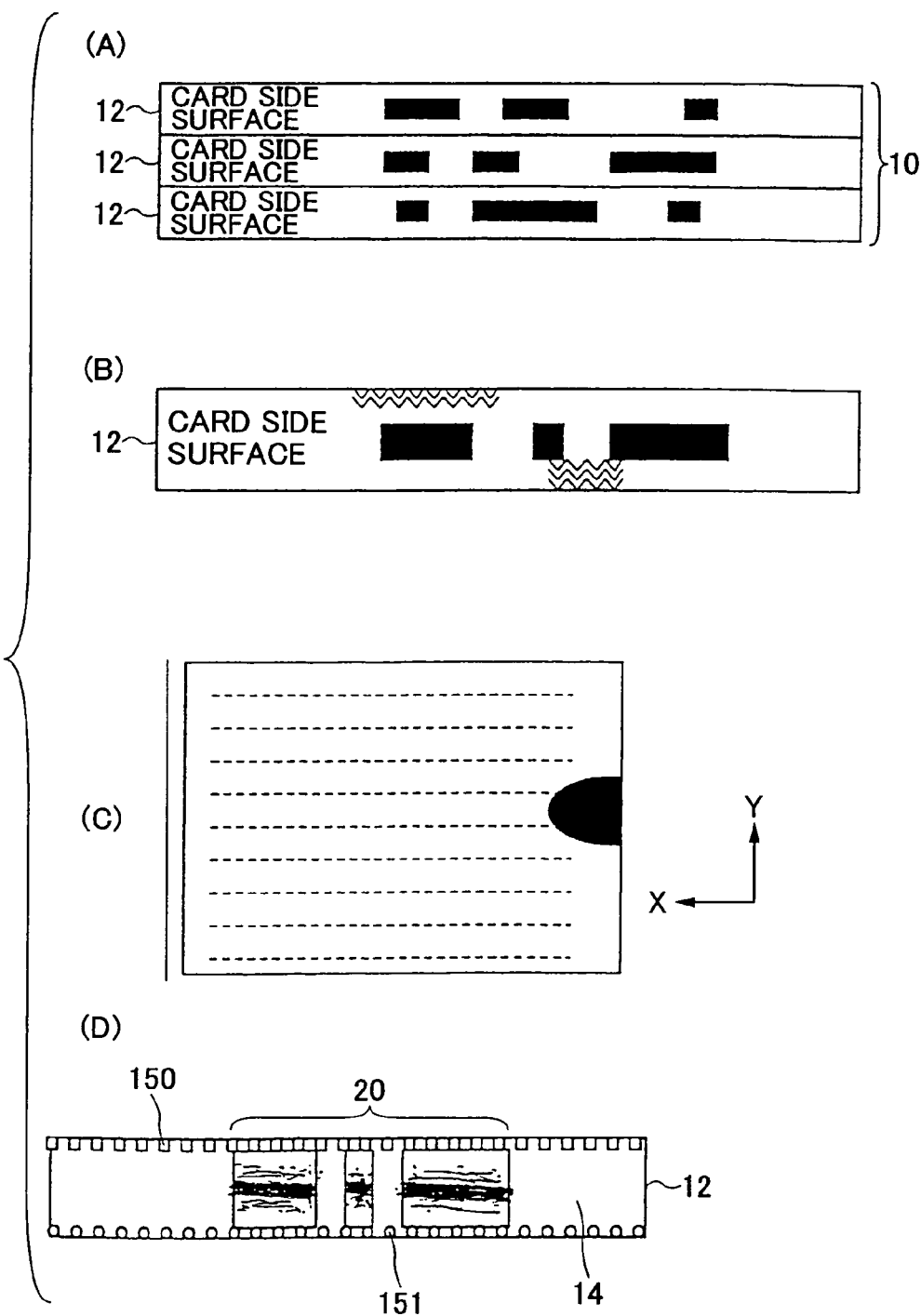
FIG. 21 is a diagram for explaining a fourth embodiment of the card manufacturing method of the present invention.

FIG. 21 shows a fourth embodiment of the card manufacturing method of the present invention. By making use of the resolution (about 0.1 mm or less) of an ink-jet printer, the read code is printed to a central position of the peripheral side edge of the card 12 in the direction of the thickness (e.g., 0.3 mm) thereof. As indicated in FIG. 21 (A), the read codes of the cards 12 in the stack 10 are arrayed apart from each other in the card stacking direction, and the image reading of the codes of the cards 12 can be accurately performed with no read error.

As indicated in FIG. 21 (B), the portions (indicated by the wiggly lines) of the peripheral side edge of the card 12 are likely to be damaged or stained. In the present embodiment, the read code is not printed to these portions. Hence, the read code, which is printed to the central position of the peripheral side edge of the card 12, is free from damages or stain.

As indicated in FIG. 21 (C), the directions of the fabrics extending on the paper of the card are indicated by the dotted lines. If the ink deeply penetrates the card, the degree of penetration of the ink in the direction Y is smaller than the degree of penetration of the ink in the direction X. The accuracy of the printing of the read code is increased, and the wear resistance of the read code is increased.

As indicated in FIG. 21 (D), black dots 150 and 151 (carbon) that absorb or cut off a reflection light generated from the read code 20 (the fluorescent ink) of the card are printed to the upper and lower peripheral edges of the peripheral side edge 14 of the card 12 simultaneously with the printing of a graphic pattern to the card 12. The read code 20 is printed to the peripheral side edge 14 of the card 12 between the black dots 150 and 151. The accuracy of the image reading of the code 20 from the card 12 is increased.

Next, a description will be given of a fifth embodiment of the card manufacturing method of the invention. In the present embodiment, paper containing a fluorescent pigment is used as the material of the card, and the read code 20 is printed to the card with an ink (the pigment is carbon) that cuts off a fluorescent light. The pigment is electrically charged, and the ink is spayed to the paper by an electromagnetic force. The ink is fixed to the paper by applying a fixing liquid. In an alternative manufacturing method, the printing portions of the peripheral side edge of the card are covered with a mask, and the ink is sprayed through the mask to the card by using an air brush. Further, in an alternative manufacturing method, a normal paper is used, and the portions other than the printing portions of the peripheral side edge of the card are masked with a transparent resin material. The fluorescent ink is applied to the entire peripheral side edge of the card, and the fluorescent ink at the masking portions is removed later.

Figure 22:
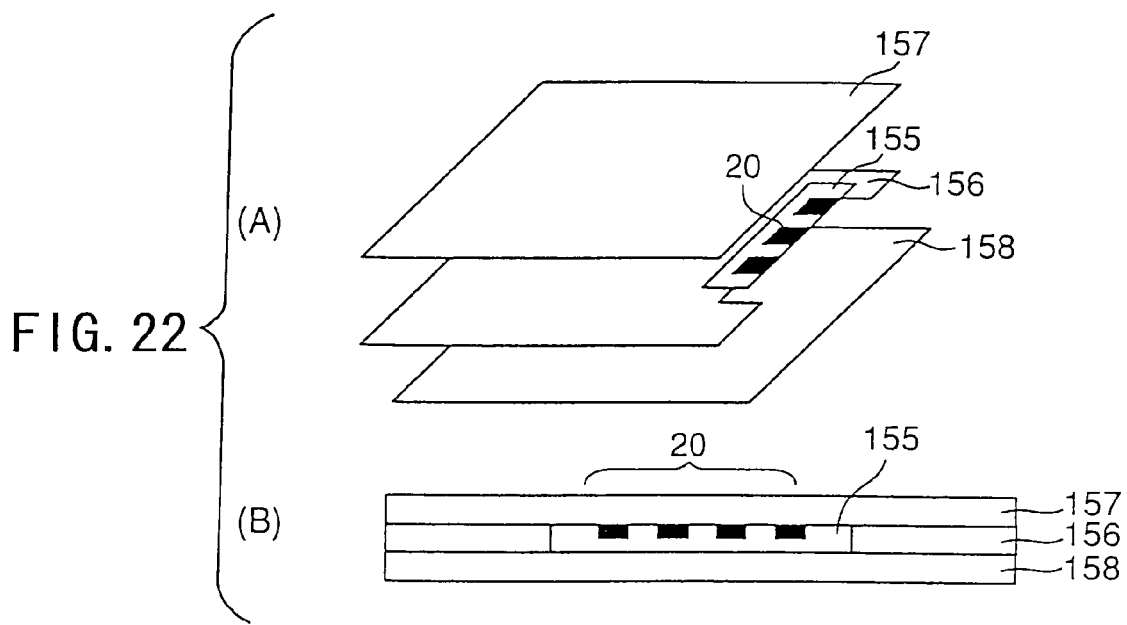
FIG. 22 is a diagram for explaining a sixth embodiment of the card manufacturing method of the present invention.

FIG. 22 (A) and FIG. 22 (B) show a sixth embodiment of the card manufacturing method of the present invention. As shown in FIG. 22 (A), the read code 20 is printed to the peripheral side edge of the paper piece 155 with the ink by a silk-screen printing such that the thickness of the ink is made as large as possible. The paper piece 155 is attached to the base paper 156. The coating sheets 157 and 158 are attached to the upper and lower surfaces of the base paper 156 such that the upper and lower surfaces of the read code 20 are concealed by the coating sheets 157 and 158.

As shown in FIG. 22 (B), according to the above card manufacturing method, the area of the read code 20 in the paper piece 155 can be increased, and the image reading of the read code 20 can be more easily performed.

Figure 23:
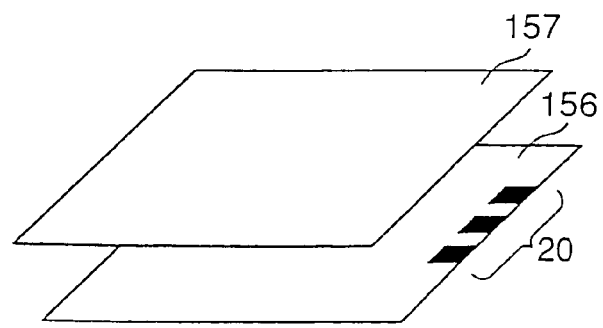
FIG. 23 is a perspective view of the card for explaining a variation of the sixth embodiment of the card manufacturing method of the present invention.

FIG. 23 is a perspective view of the card for explaining a variation of the sixth embodiment of the card manufacturing method of the present invention. As shown in FIG. 23, the read code 20 may be printed to the peripheral side edge of the base paper 156 with the ink by a silk-screen printing such that the thickness of the ink on the base paper 156 is made as large as possible. The coating sheet 157 is attached to the upper surface of the base paper 156 such that the upper surface of the read code 20 is concealed by the coating sheet 157.

Examples of the materials of the ink that is used to print the read code 20 include not only a fluorescent ink but also a light storage material. The light storage material is a light storage substance that stores the light energy when it is irradiated with light for a certain period, and emits, after the irradiation of light, the stored light. According to the present invention, the read code 20 may be recorded to the peripheral side edge of the card with the light storage ink.

Figure 24:
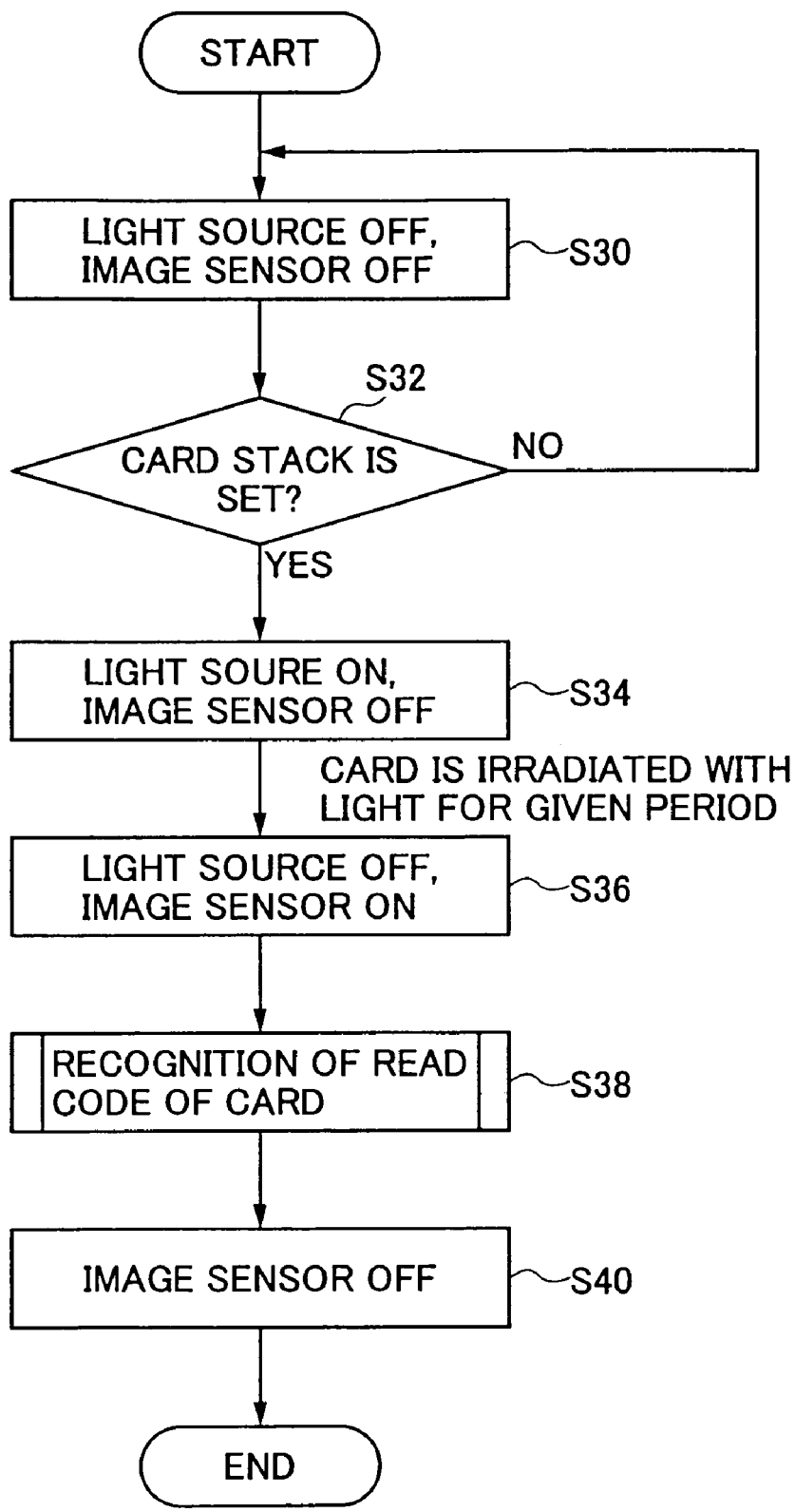
FIG. 24 is a flowchart for explaining a code recognition process performed by the card stack reader when reading a read code 20 printed to the card with a light storage ink.

FIG. 24 is a flowchart for explaining a code recognition process performed by the card stack reader when reading the read code 20 printed to the card with the light storage ink.

As shown in FIG. 24, at a start of the code recognition process, step S30 turns the UV lamp 64 (the light source) OFF and turns the image sensor 60 (the imaging unit) OFF. Step S32 determines whether the card stack 10 is set in the card stack reader. When the card stack 10 is set, step S34 turns the light source ON so that each card of the card stack 10 is irradiated with the UV light for a certain period. In the step S34, the image sensor 60 remains in the OFF state. Step S36 turns the light source OFF and turns the image sensor 60 ON. Step S38 performs the recognition of the read code 20 of each card of the card stack 10. The code recognition that is essentially the same as that of FIG. 5 is performed in the step S38. After the step S38 is performed, step S40 turns the image sensor 60 OFF. The code recognition process of this embodiment ends.

In the present embodiment, the period in which the light source is turned ON does not overlap the period in which the image sensor 60 is turned ON Suppose that the consumption current of the light source is 600 mA and the consumption current of the image sensor is 500 mA. It is adequate that the consumption current of the entire card stack reader of the present embodiment amounts to 600 mA.

Figure 25:
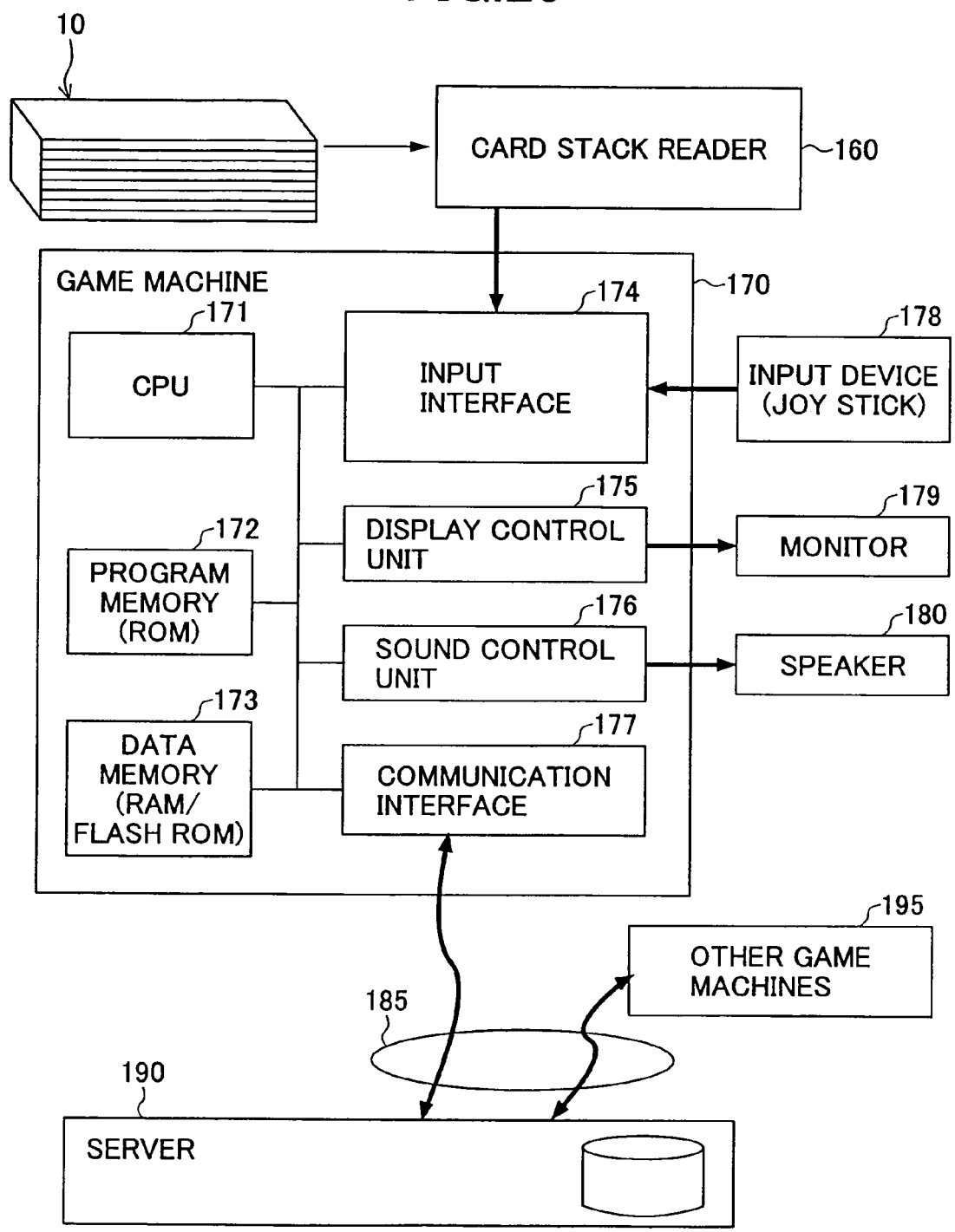
FIG. 25 is a block diagram of a network system to which the card stack reader of the present invention is applied.

FIG. 25 is a block diagram of a network system to which the card stack reader of the present invention is applied. As shown in FIG. 25, the card stack reader 160 reads the code from each card of the card stack 10 that is set in the card stack reader, and supplies the code information to an input interface 174 of a game machine 170. The game machine 170 generally includes a CPU 171, a program memory (ROM) 172, a data memory (RAM/flash ROM) 173, the input interface 174, a display control unit 175, a sound control unit 176, and a communication interface 177.

In addition to the card stack reader 160, an input device 178 is connected to the input interface 174 of the game machine 170. The input device 178 is, for example, a joy stick or others. The display control unit 175 outputs an image signal to a monitor 179 so that the image is displayed on the monitor 179 in accordance with the image signal. The sound control unit 176 outputs a sound signal to a speaker 180 so that the sound is generated by the speaker 180 in accordance with the sound signal. The communication interface 177 of the game machine 170 is connected to a server 190 (server computer) through a network 185. In addition to the game machine 170, other game machines 195 are connected to the server 190 through the network 185.

The game machine 170 uses the card stack reader 160 to receive the read code 20 of each card of the card stack 10. The game machine 170 checks that the received code matches with one of read codes of the cards stored in the game program of the program memory 172, and performs the image/sound control and function control in accordance with the received code of the card by controlling the monitor 179 and the speaker 180. As described above, the game machine 160 and the other game machines 195 are connected to the server 190 through the network 185, and the players at remote locations can enjoy playing the card game at the same time.

Figure 26:
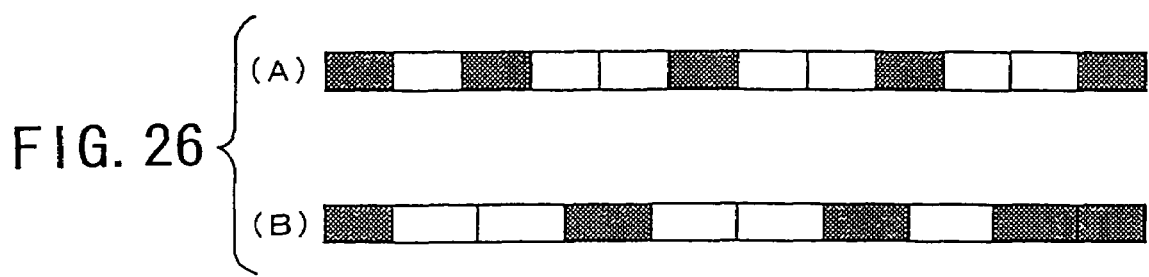
FIG. 26 is a diagram for explaining a pitch of the read code 20.

FIG. 26 is a diagram for explaining a pitch of the read code 20. As shown in FIGS. 26 (A) and (B), the pitch of the read code 10 of a premium card is different from the pitch of the read code 20 of a normal card. By performing the image reading of the read code at the card stack reader 160, the difference between the premium card and the normal card can be detected depending on the different pitches of these cards. The illegal reproduction of the premium card is prevented.

Figure 27A:
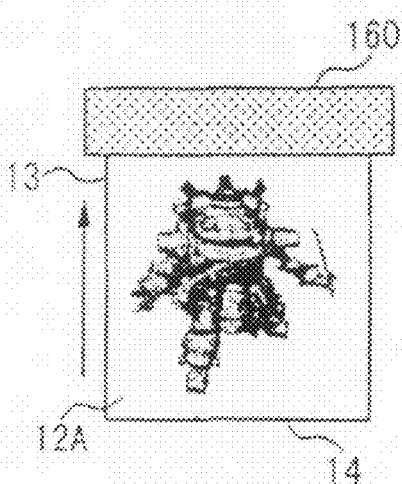
FIG. 27A is a diagram for explaining a relationship the reading of the read code 20 of the card 12 and the monitor indication.
Figure 27B:
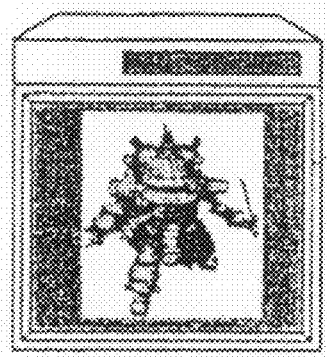
FIG. 27B is a diagram for explaining a relationship the reading of the read code 20 of the card 12 and the monitor indication.

According to the present invention, by differentiating the upper and lower peripheral edges of the card 12 and the front and back surfaces of the card 12, the meaning and function of the card 12 are changed. FIG. 27A and FIG. 27B show a relationship the reading of the read code 20 of the card 12A and the monitor indication. For example, the card 12A has a read code 20 at the upper peripheral side edge 13 of the card, and has a graphic pattern of a robot character corresponding to the code 20. The card stack reader 160 reads the code 20 at the upper peripheral side edge 13 of the card 12A. An image of the robot character is displayed on the monitor 179 when the code is read by the card stack reader 160.

Figure 27C:
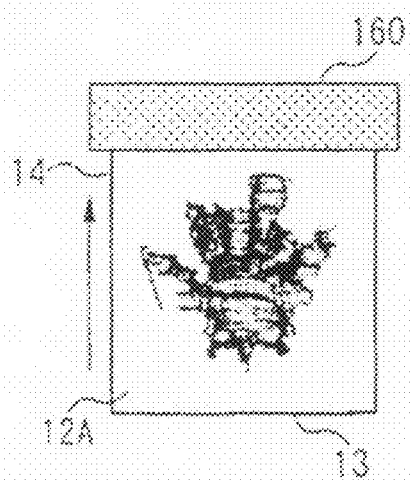
FIG. 27C is a diagram for explaining a relationship the reading of the read code 20 of the card 12 and the monitor indication.
Figure 27D:
FIG. 27D is a diagram for explaining a relationship the reading of the read code 20 of the card 12 and the monitor indication.

FIG. 27C and FIG. 27D show a relationship the reading of the read code 20 of the card 12 and the monitor indication. The card 12A has a different read code 20 at the lower peripheral side edge 14 of the card, and has a graphic pattern of a girl character corresponding to the code 20. The card stack reader 160 reads the code 20 at the lower peripheral side edge 14 of the card 12A. An image of the girl character is displayed on the monitor 179 when the code 20 is read by the card stack reader 160.

Figure 28A:
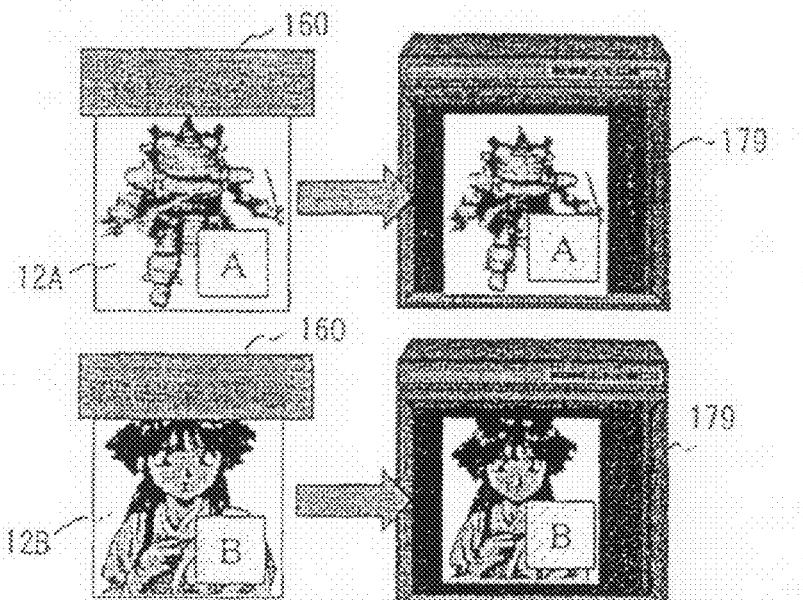
FIG. 28A is a diagram for explaining a relationship the reading of the read code 20 of the card 12 and the monitor indication.
Figure 28B:
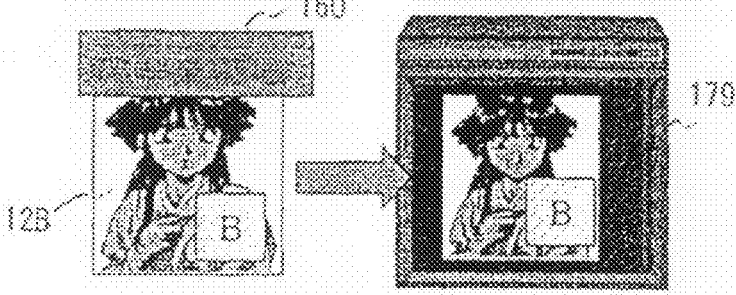
FIG. 28B is a diagram for explaining a relationship the reading of the read code 20 of the card 12 and the monitor indication.

According to the present invention, by differentiating the combinations or sequences of a plurality of cards, the meaning and function of the card 12 are changed. FIG. 28A shows a relationship the reading of the read code 20 of the card 12A and the monitor indication. In the example of FIG. 28A, the card 12A has the graphic pattern of a robot character, and the image of the robot character is displayed on the monitor 179. FIG. 28B shows a relationship the reading of the read code 20 of the card 12B and the monitor indication. In the example of FIG. 28B, the card 12B has the graphic pattern of a girl character, and the image of the girl character is displayed on the monitor 179.

Figure 28C:
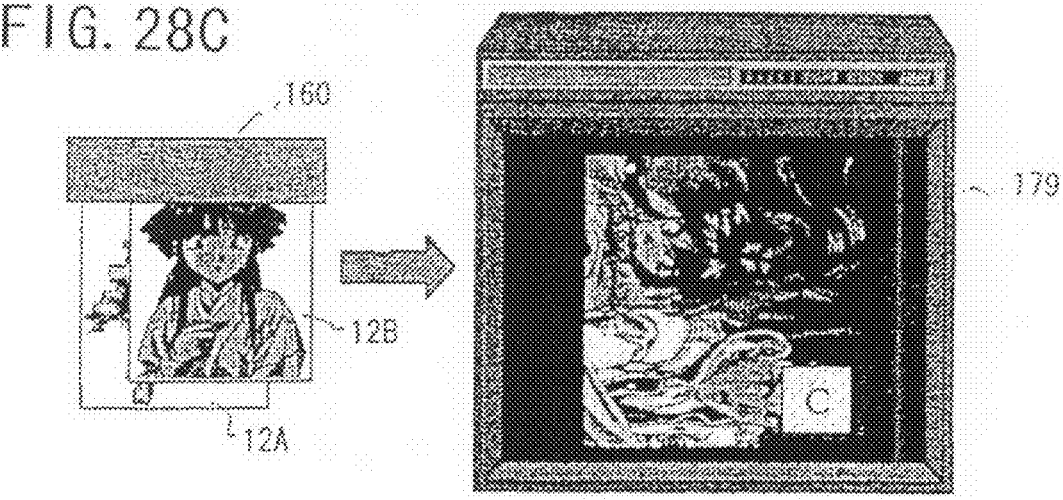
FIG. 28C is a diagram for explaining a relationship the reading of the read code 20 of the card 12 and the monitor indication.
Figure 29:
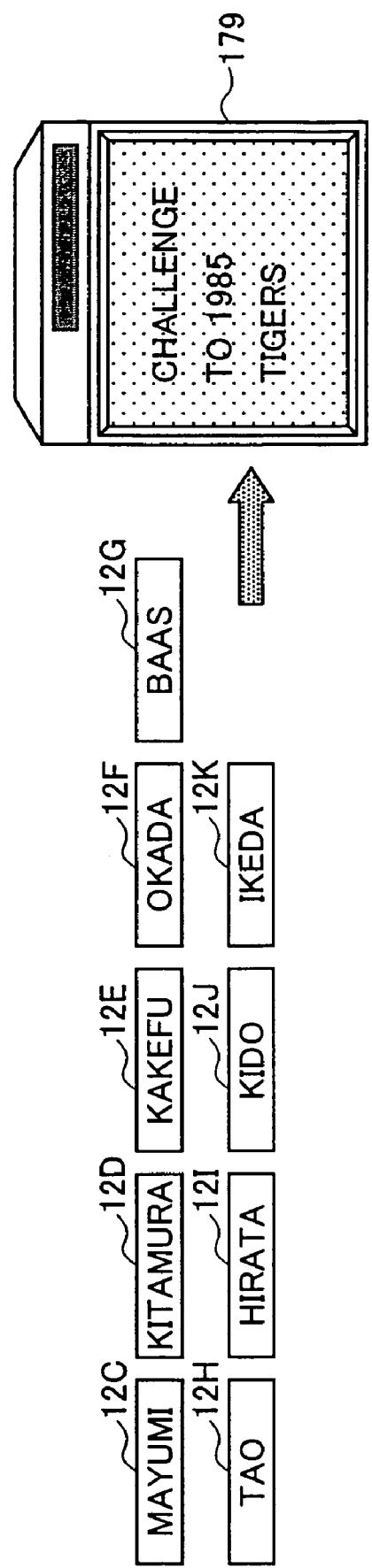
FIG. 29 is a diagram for explaining a relationship the reading of the read code 20 of the card 12 and the monitor indication.

As shown in FIG. 28C, when the cards 12A and 12B in combination are read by the card stack reader 160, the image of a different character is displayed on the monitor 179. Further, as shown in FIG. 29, when a plurality of cards 12C through 12K, which carry the names of special baseball athletes, are read by the card stack reader 160, the image corresponding to the baseball team is displayed on the monitor 179.

According to the present invention, the read code 20 can be configured to include an advertisement indication. When the advertisement indication is included in the read code 20, an advertisement program for actions of a character image suited to the advertisement is selected for the execution of an advertisement displaying process.

Figure 30:
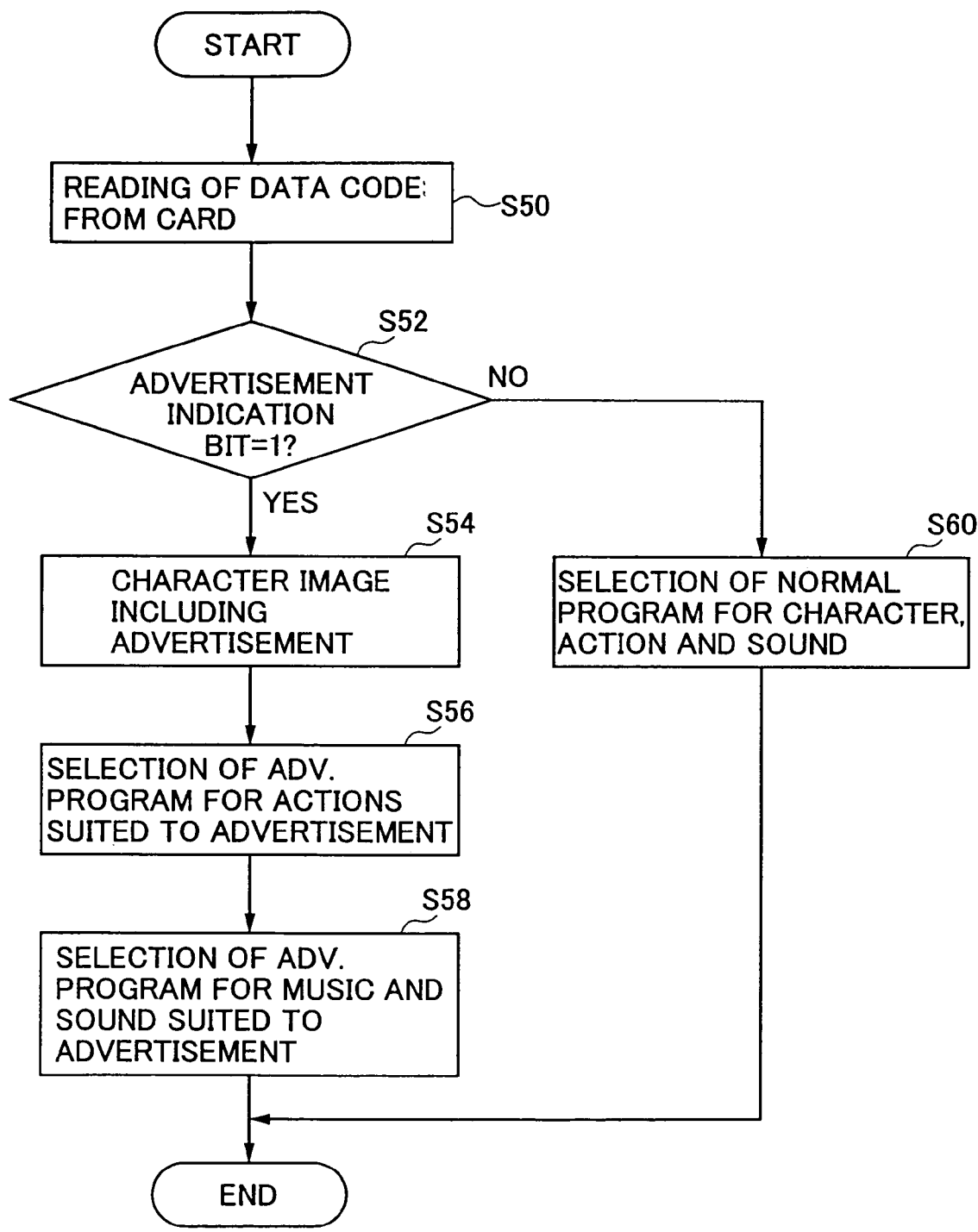
FIG. 30 is a flowchart for explaining an advertisement displaying process performed by a CPU 171 of a game machine 170.

FIG. 30 shows an advertisement displaying process performed by the CPU 171 of the game machine 170. As shown in FIG. 30, at a start of the advertisement displaying process, the CPU 171 at step S50 reads the data code of the card read by the card stack reader 160. Step S52 determines whether the read code of the card includes the advertisement indication bit that is sets to 1. When the result at the step S52 is affirmative, step S54 creates a character image including the advertisement. Step S56 selects the advertisement program for the actions of the character image suited to the advertisement. Step S58 selects the advertisement program for the music and sound suited to the advertisement. After the step S58 is performed, the process of FIG. 30 ends. On the other hand, when the result at the step S52 is negative, step S60 selects the normal program for the character, the action and the sound including no advertisement. After the step S60 is performed, the process of FIG. 30 ends.

According to the advertisement displaying process of the above-described embodiment, the advertisement effects of the card game can be increased.

Further, according to the present invention, the game machine may includes a storage unit which stores a value of a parameter acquired in a progress of a card game by a character corresponding to the read code of the card recognized by the card stack reader and a player identification number.

Figure 31:
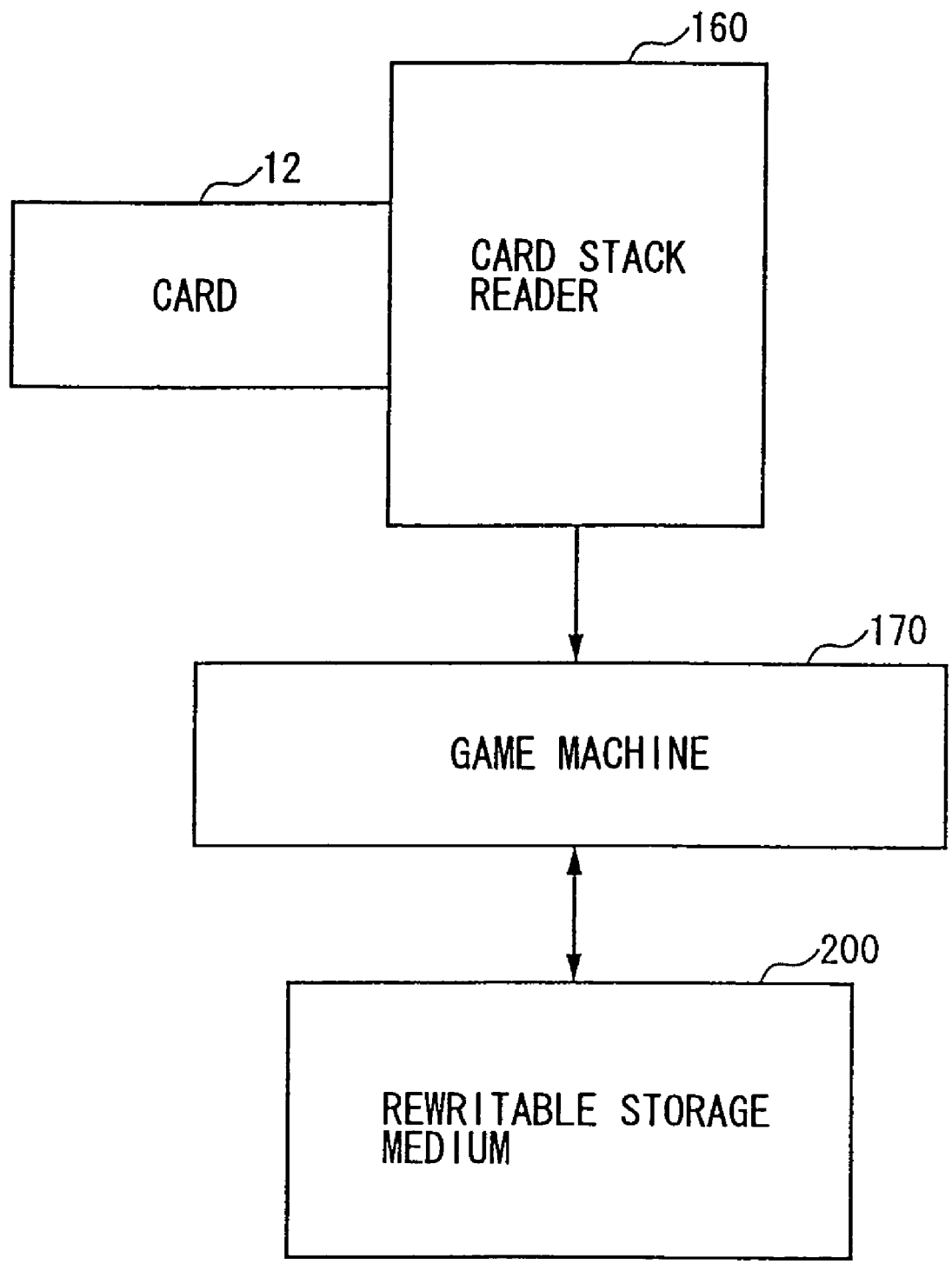
FIG. 31 is a block diagram of one embodiment of the game machine of the invention including a rewritable storage medium 200.

FIG. 31 shows one embodiment of the game machine of the invention including a rewritable storage medium 200. As shown in FIG. 31, the game machine 170 of the present embodiment is provided with the storage medium 200 which stores the value of the parameter acquired in the progress of the card game by the corresponding character. The value of the parameter will be also called the experience data. Examples of the storage medium 200 include an IC memory, an IC card, a magnetic card or the like. In the storage medium 200, the read code 20 of the card 12 and the experience data are recorded in a region that is managed by using the player identification number.

According to the above-described embodiment of the game machine, the illegal reproduction or renewal of the experience data can be prevented. In the above-described embodiment of FIG. 31, the rewritable storage medium 200 is connected to the game machine 170. Alternatively, the game machine 170 may be connected to the server 190 through the network 185, the server 190 including the storage medium, instead of the storage medium 200 connected to the game machine 170.

Figure 32:
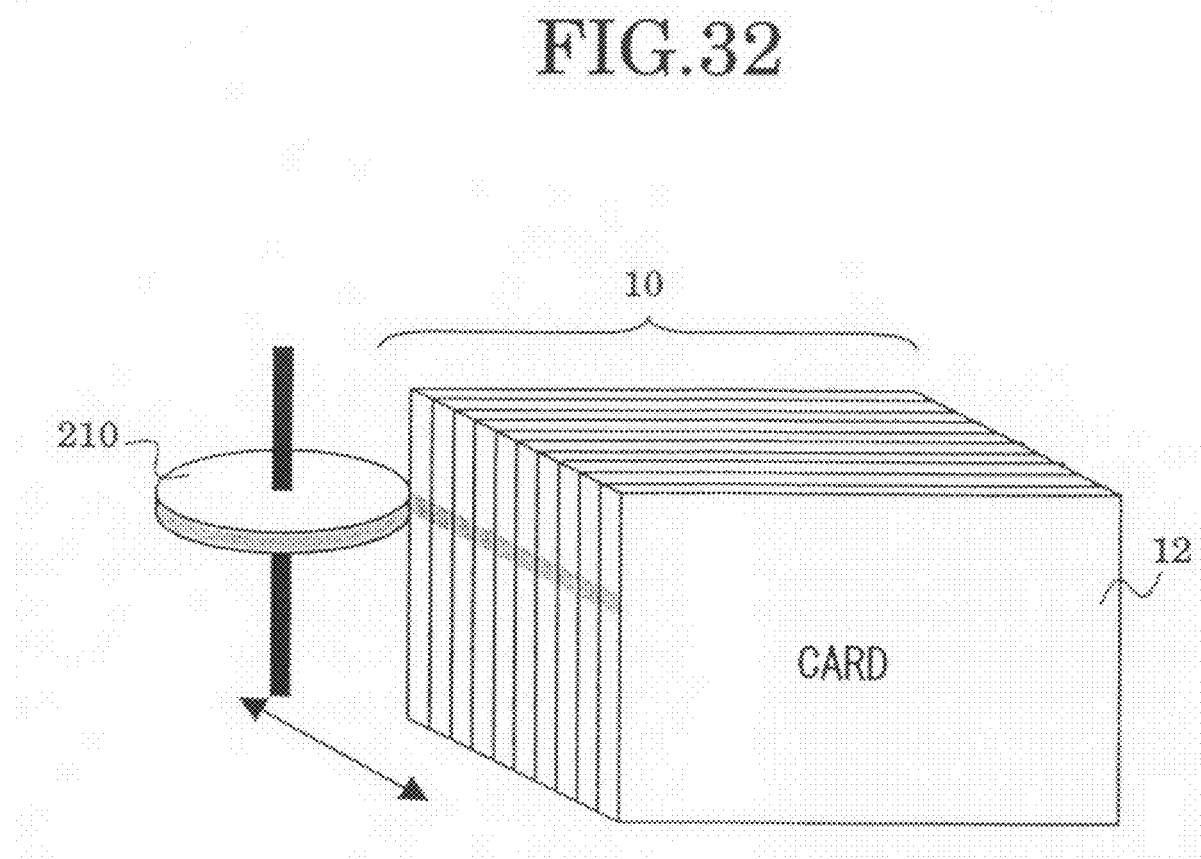
FIG. 32 is a perspective view of the card for explaining a seventh embodiment of the card manufacturing method of the present invention.

FIG. 32 is a perspective view of the card for explaining a seventh embodiment of the card manufacturing method of the present invention. As shown in FIG. 32, a disc-like roller 210 carries the ink which is used to print the read code (corresponding to one bit) to the peripheral side edge of the cards 12 in the card stack 10. By moving the roller 120 in the direction indicated by the arrow in FIG. 32, the read code is recorded to the peripheral side edge of each card of the card stack 10. By performing the printing of the read code using the roller 210, it is possible to make the width of the read codes of the cards in the card stack 10 uniform.

Figure 33A:
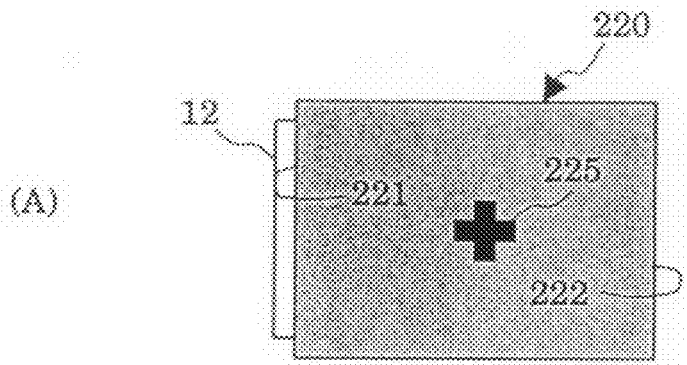
FIG. 33A is a top view of a fourth embodiment of the card case of the invention when the printing is performed with a roller.
Figure 33B:
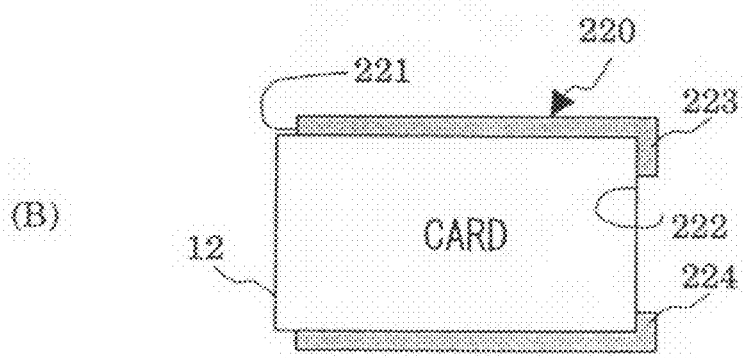
FIG. 33B is a cross-sectional view of the fourth embodiment of the card case of the invention when the printing is performed with the roller.
Figure 33C:
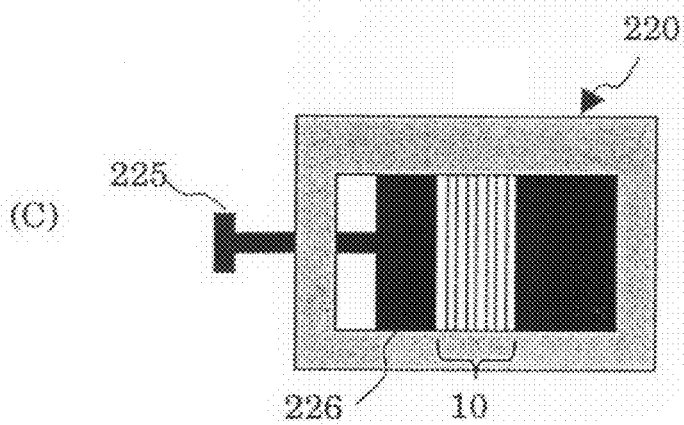
FIG. 33C is a side view of the fourth embodiment of the card case of the invention when the printing is performed with the roller.

FIG. 33A is a top view of a fourth embodiment of the card case of the present invention when the printing is performed with the roller. FIG. 33B is a cross-sectional view of the fourth embodiment of the card case when the printing is performed with the roller. FIG. 33C is a side view of the fourth embodiment of the card case when the printing is performed with the roller. As shown, the card case 220 of the present embodiment is a cylindrical member having a rectangular cross-section. A rear-surface opening 221 is provided at the rear surface of the card case 220, and the card stack 10 is inserted from the opening 221 to the card case 220. A front-surface opening 222 is provided at the front surface of the card case 220, and stoppers 223 and 224 are provided at the ends of the front-surface opening 222. One of the four sides of each card of the card stack 10 is brought into contact with the stoppers 223 and 224. The peripheral side edges of the cards 12 are arranged in an aligned condition, and the peripheral side edges of the cards 12 are exposed from the opening 222. A screw 225 is fastened to a pressure member 226, and when the screw 225 is fastened to push the pressure member 226 so that the pressure member 220 exerts pressure on the cards 12 of the card stack 10 in the card stacking direction. The misalignment of the cards can be prevented.

Figure 34:
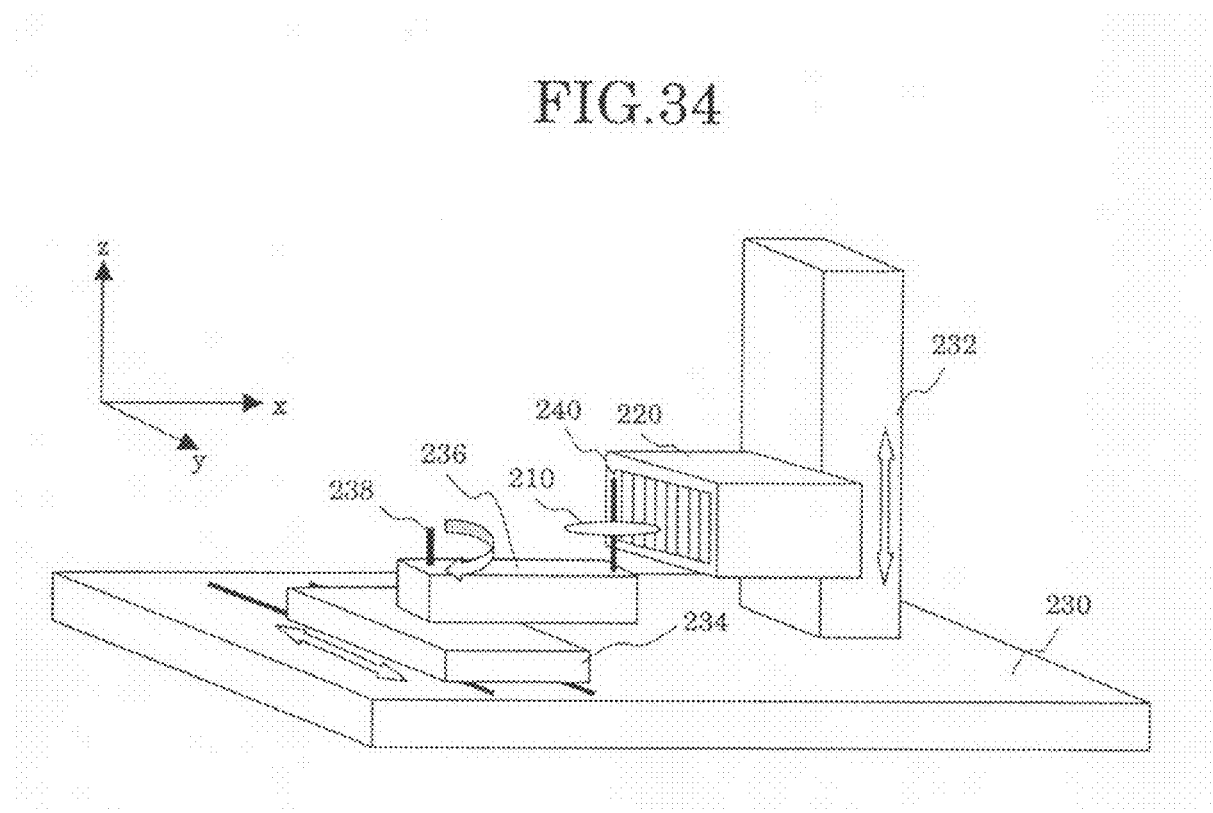
FIG. 34 is a diagram for explaining a seventh embodiment of the card manufacturing method of the present invention.

FIG. 34 shows a seventh embodiment of the card manufacturing method of the present invention. As shown in FIG. 34, a z-stage 232 is fixed to a base member 230. The z-stage 232 is provided to hold the card case 220 that contains the card stack 10. When the read code is printed to each card of the card stack 10, the card case 220 is moved relative to the roller 210 in the z axis direction by the z-stage 232. Further, the y-stage 234 is provided on the base member 230. When the read code is printed to each card of the card stack 10, the card case 220 is moved relative to the roller 210 in the y axis direction by the y-stage 234. Further, a rotary stage 236 is provided on the y-stage 234, and the rotary stage 236 is rotated around the shaft 238 fixed to the y-stage 234. The shaft 240 is fixed to the opposite end of the y-stage 234, and the roller 210 is rotatably supported on the shaft 240.

Figure 35:
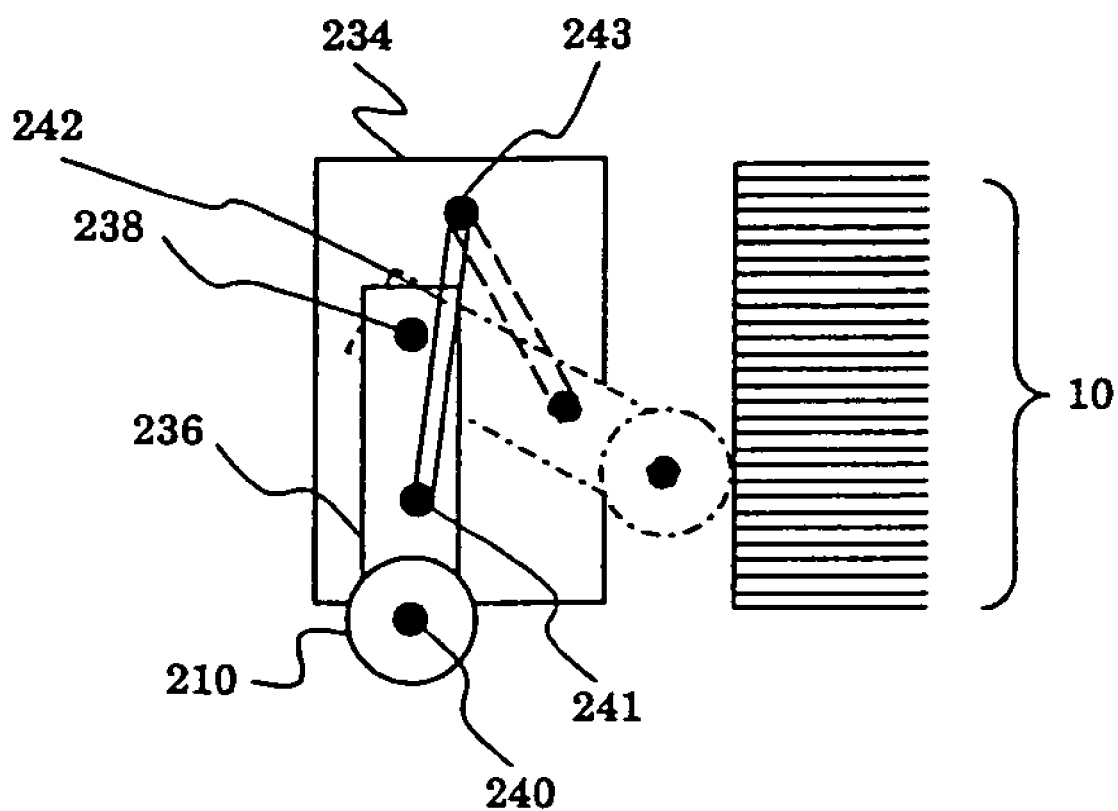
FIG. 35 is a diagram for explaining operation of a rotary stage 236 in the seventh embodiment.

FIG. 35 shows operation of the rotary stage 236 in the seventh embodiment. As shown in FIG. 35, the shaft 241 is provided at a position apart from the shaft 236 of the rotary stage 236, and one end of a spring 242 is fixed to the shaft 241. The other end of the spring 242 is fixed to shaft 243 which is provided on the y-stage 234. When the rotary stage 236 is rotated to the position (indicated by the solid line in FIG. 35) apart from the card stack 10, the rotary stage 236 pulls the spring 242 and applies the ink to the roller 210. When the rotary stage 236 is rotated by the force of the spring 242 to the position (indicated by the dotted line in FIG. 35) contacting the card stack 10, the roller 210 is brought into contact with the peripheral side edge of each card of the card stack 10 so that the read code is printed to the card with the ink.

In the present embodiment, the card case 220 which contains the card stack 10 is attached to the z-stage 232, and the z-stage 232 is moved in the z-axis direction so that the z-stage 232 is set to the printing position. After this, the rotary stage 236 is rotated so that the roller 210 is brought into contact with the peripheral side edge of each card of the card stack 10 that is open from the front-surface opening 222 of the card case 220. After this, the y-stage 234 is moved in the y-axis direction so that the read code is printed to the card with the ink supplied by the roller 210 while the roller 210 is rotated.

Figure 36:
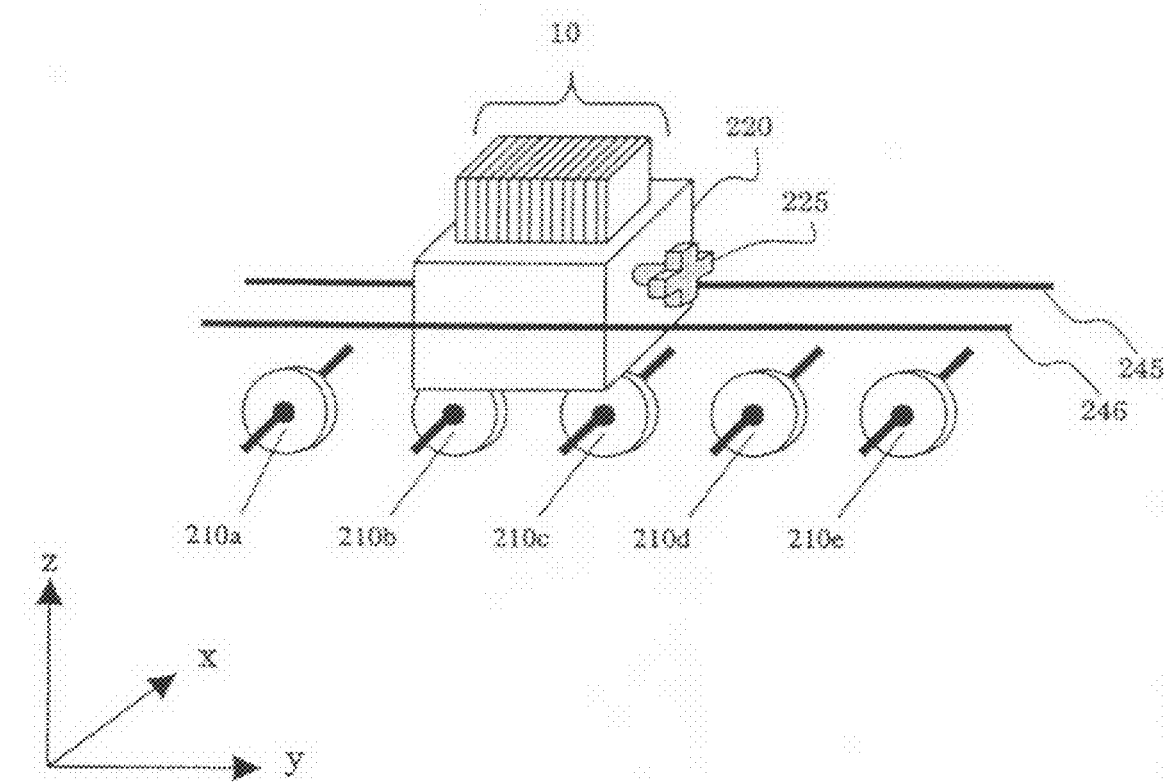
FIG. 36 is a diagram for explaining a variation of the seventh embodiment of the card manufacturing method of the invention.

FIG. 36 shows a variation of the seventh embodiment of the card manufacturing method of the invention. As shown in FIG. 36, a plurality of disc-like rollers 210a through 210e are provided and each roller has the rotation shaft arranged in the x-axis direction. The rollers 210a through 210e are arranged at intervals of a given distance in the y-axis direction. The respective positions of the rollers 210a through 210e, shifted in the x-axis direction, correspond to the respective bits of the read code recorded to the card.

Two rails 245 and 246 are provided above the rollers 210a through 210e and they are extending in the y-axis direction. The card case 220 that contains the card stack 10 is interposed between the rails 245 and 246 and provided on the rollers 210a through 210e. In this condition, the card case 220 is moved in the y-axis direction, and the respective bits of the read code are printed to the card with the ink by using the rollers 210a through 210e.

The cards of the card stack 10 are placed in the vertical position, and the peripheral side edges of the cards are arranged in the aligned condition by the gravity of the cards. The efficiency of the read code printing is increased by the use of the plurality of the rollers.

Figure 37:
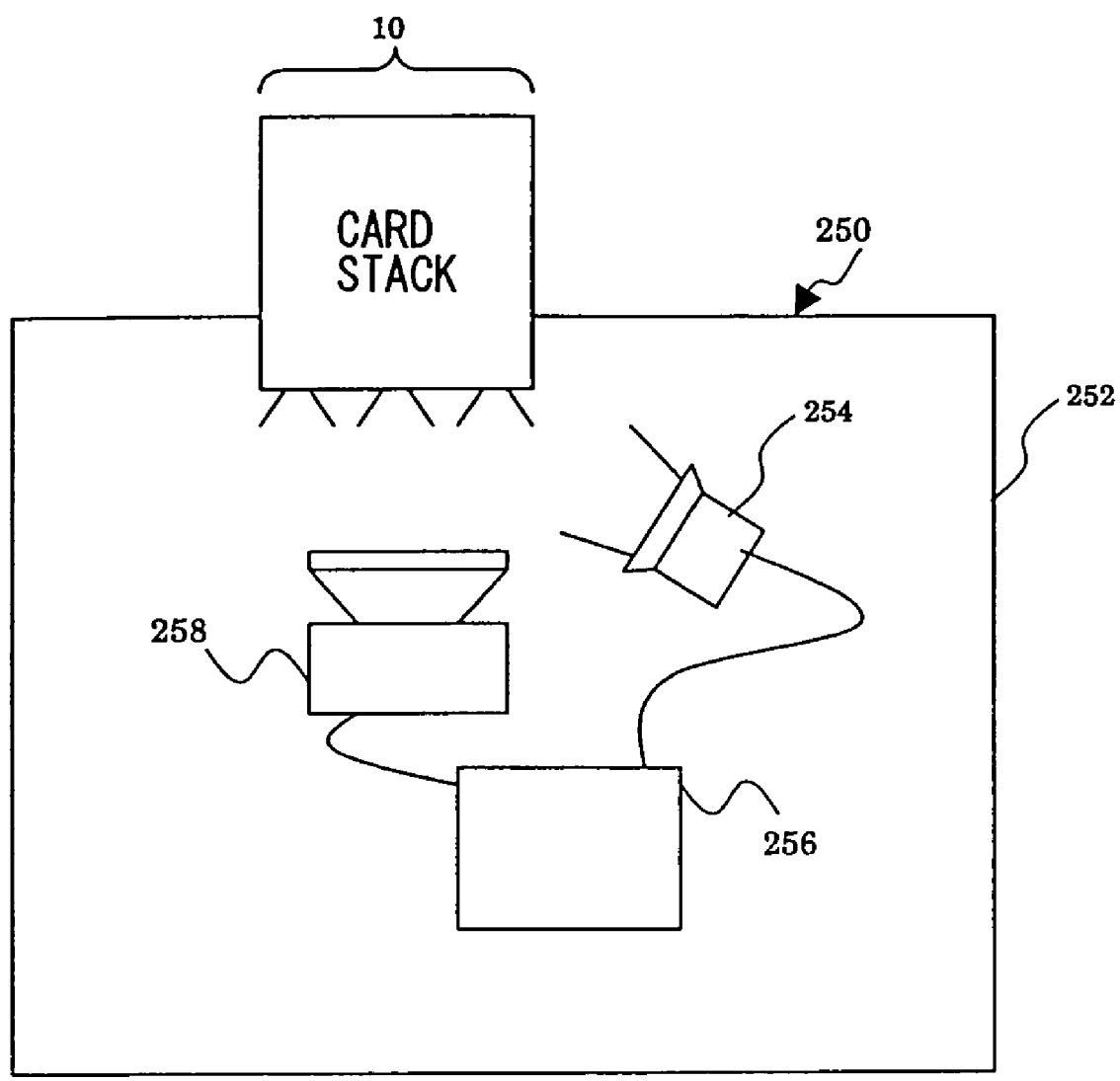
FIG. 37 is a diagram of a fourth embodiment of the card stack reader of the invention.

FIG. 37 shows a fourth embodiment of the card stack reader of the invention. As shown, the card stack 10 is inserted into the card stack insertion inlet of the card stack reader 250. In the housing 252 of the card stack reader 250, a flash lamp 254 is provided. After the card stack 10 is attached to the card stack reader 250, the flash lamp 254 is controlled by the image recognition device 256 so that the peripheral side portion of the card stack 10, where the read code of each card is provided, is irradiated with the flash light generated by the flash lamp 254. In the present embodiment, the ink which is used for printing the read code to each card is the light storage ink. The flash light, generated by the flash lamp 254, is stored into the read code 20 of each card of the card stack 10.

The image sensor 258 is provided so as to confront the peripheral side portion of the card stack 10. The light ray that is generated by the read code as the result of the light storage is incident to the image sensor 258. Under the control of the image recognition device 256, the image sensor 258 generates an image signal based on the received light ray from the code of each card of the card stack 10. The image signal indicates the pattern of the code of each card of the card stack 10, and the image signal is supplied from the image sensor 258 to the image recognition device 256. Instead of the flash lamp 254, a strobe bulb may be provided to generate the flash light.

Figure 38:
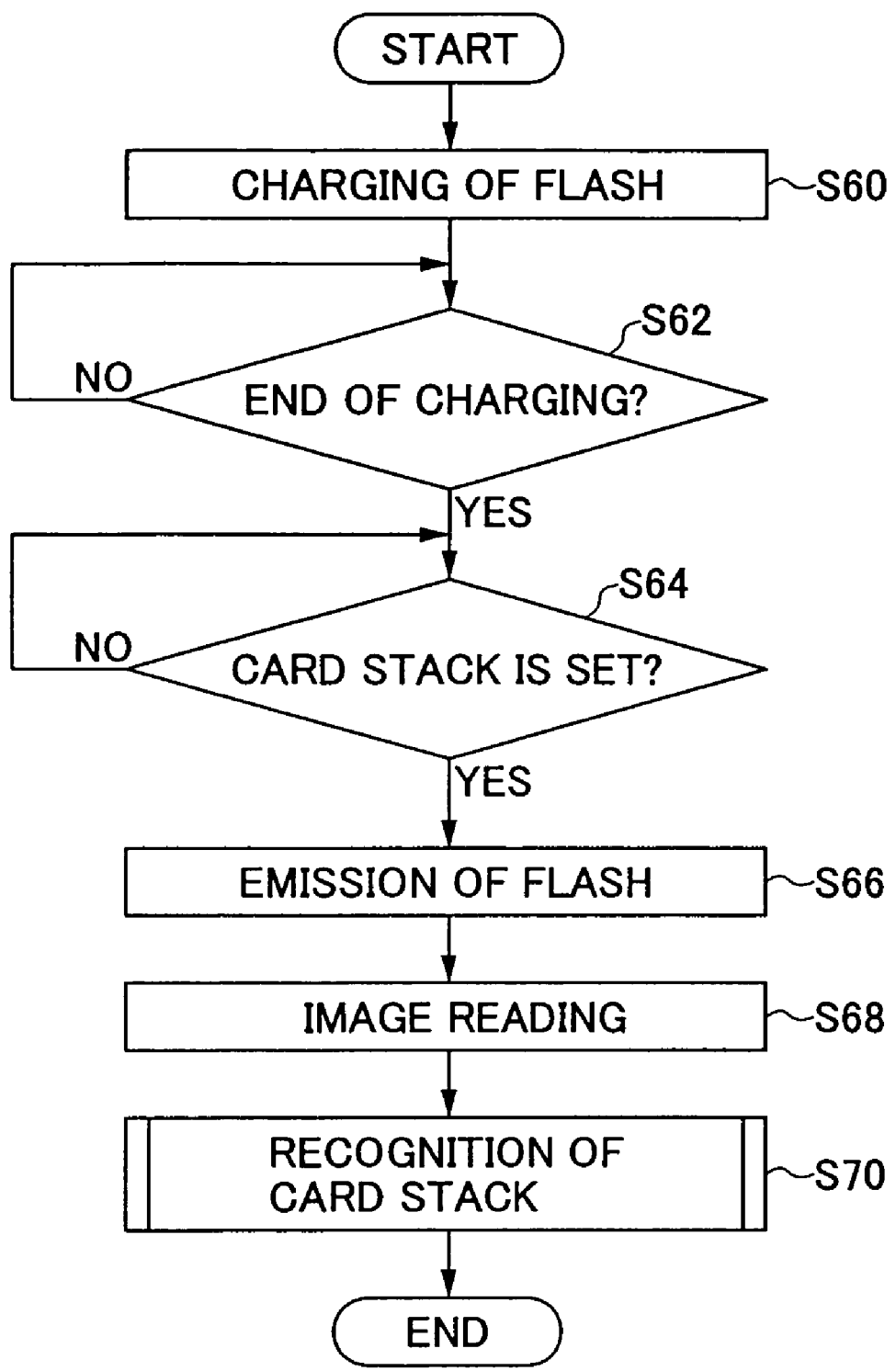
FIG. 38 is a flowchart for explaining a first embodiment of an image reading process performed by an image recognition device 256.

FIG. 38 shows a first embodiment of an image reading process performed by the image recognition device 256.

As shown in FIG. 38, when the image reading process starts, the image recognition device 256 at step S60 charges the flash lamp. Step S62 determines whether the charging of the flash lamp is complete. Step S64 determines whether the card stack 10 is set in the card insertion inlet of the card stack reader 250. Step S66 turns on the flash lamp 254 to emit the flash light to the card stack 10. Step S68 controls the image sensor 258 to receive the light ray generated by the read code of each card of the card stack 10. Step S70 performs the code recognition of the card stack 10 based on the image signal generated by the image sensor 258.

According to the above-described embodiment of the image reading process, the power consumption of the light source (the flash lamp) is reduced, and the use of a UV cut filter is not needed, and the manufacture is performed with a reduced cost.

Figure 39:
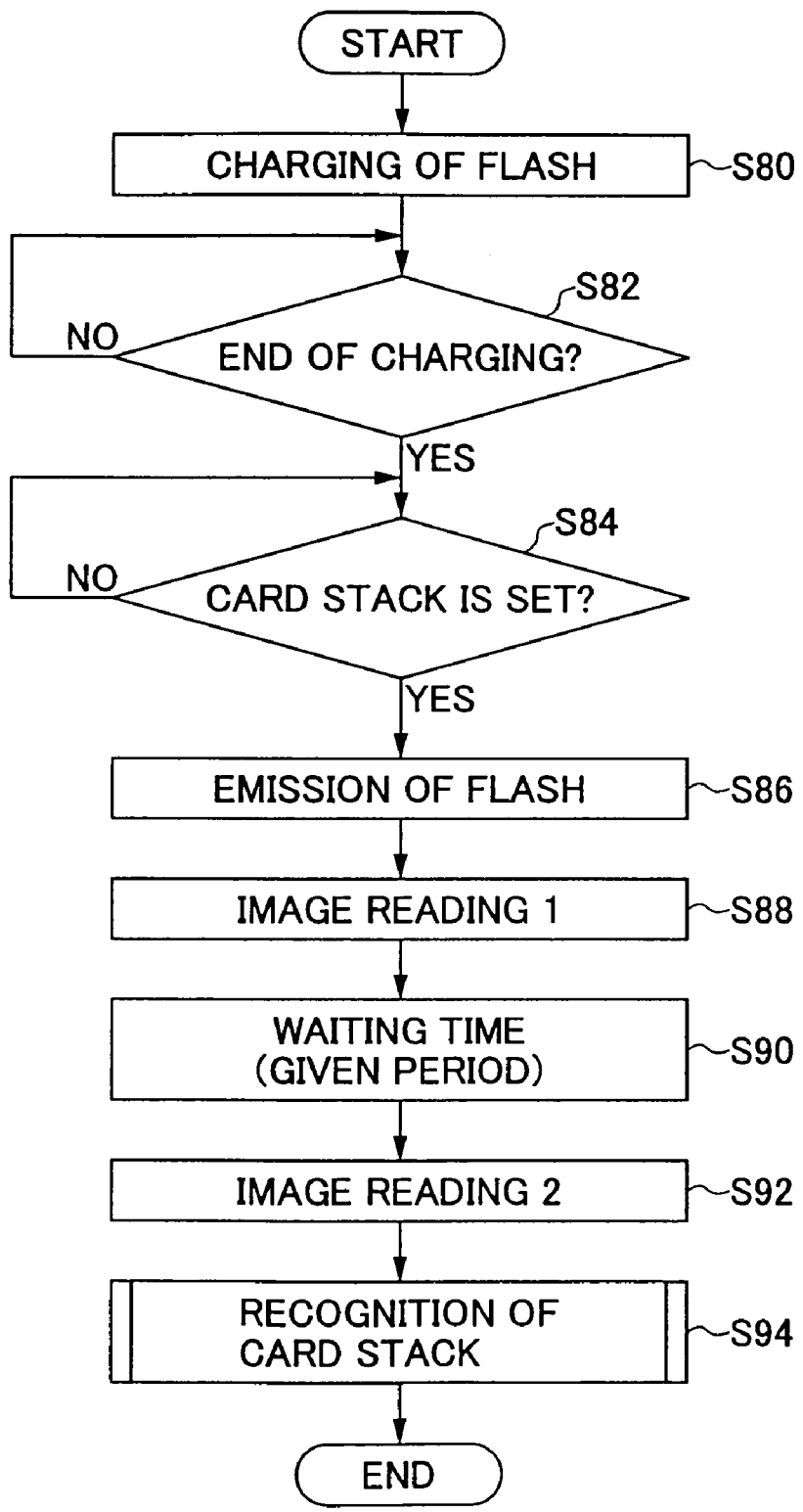
FIG. 39 is a flowchart for explaining a second embodiment of the image reading process performed by the image recognition device 256.

FIG. 39 shows a second embodiment of the image reading process performed by the image recognition device 256.

As shown in FIG. 39, when the image reading process starts, the image recognition device 256 at step S80 charges the flash lamp. Step S82 determines whether the charging of the flash lamp is complete. Step S84 determines whether the card stack 10 is set in the card insertion inlet of the card stack reader 250. Step S86 turns on the flash lamp 254 to emit the flash light to the card stack 10. Step S88 controls the image sensor 258 to receive the light ray generated by the read code of each card of the card stack 10. The step S88 is called the first image reading. Step S90 controls the image sensor 258 such that the image sensor 258 is set in a waiting condition for a given period. After the step S90 is performed, step S92 controls the image sensor 258 to receive the light ray generated by the read code of each card of the card stack 10. The step S92 is called the second image reading. Step S94 performs the code recognition of the card stack 10 based on the image signal generated by the image sensor 258.

According to the above-described embodiment of the image reading process, the authenticity of the read code can be detected based on the period of light storage in the light storage material.

Figure 40:
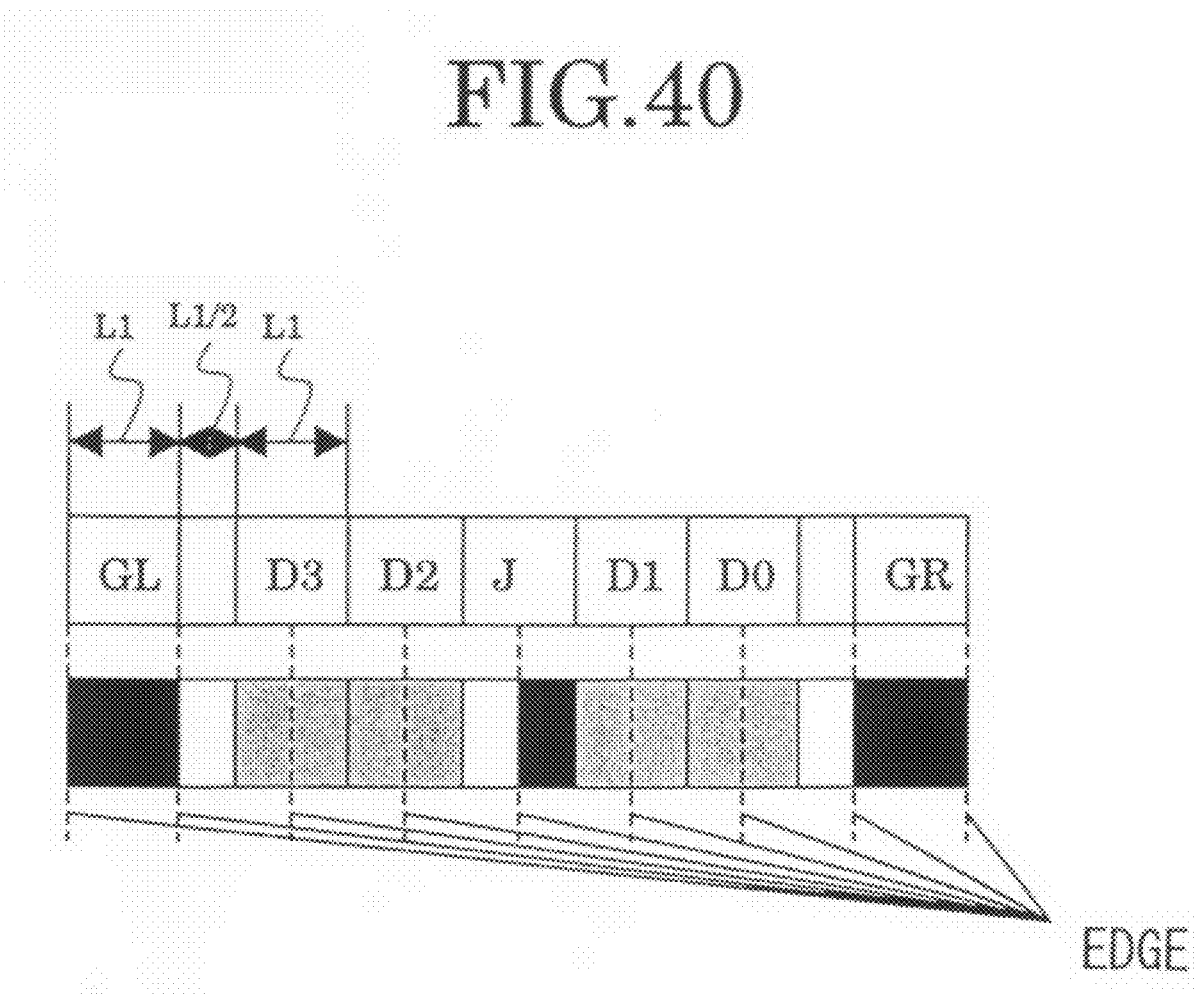
FIG. 40 is a diagram for explaining the format of a second embodiment of the read code 20.

FIG. 40 shows the format of a second embodiment of the read code 20. In this figure, the read code includes four data bits D0 to D3 each indicating a binary value of the read code, edge bits GL and GR, provided at ends of the read code, indicating respective positions of a start and an end of the read code, and a front/back indication bit J, provided at the center of the read code, indicating one of front and back surfaces of the card. Each of these bits has a predetermined width L1 along the peripheral side edge of the card. A gap, which has a width equal to L1/2, is provided between the edge bit GL and the data bit D3 and between the edge bit GR and the data bit D0. Each of the data bits D0 to D3 is divided into left and right regions. When the data bit of concern indicates the value 0, a reflection light from the right region of the data bit is generated. When the data bit of concern indicates the value 1, a reflection light from the left region of the data bit is generated. As for the edge bits GR and GL, a reflection light from both the right and left regions of each edge bit is generated. As for the front/back indication bit J, a reflection light from the right region of the bit J is generated.

When the read code of the card is read by the image sensor, an edge portion of the image signal appears at each of respective positions of the read code indicated by the dotted lines in FIG. 40. The minimum of the intervals of the occurrence of the edge in the image signal is equal to L1/2. The width of each bit is corrected such that the intervals of the edge occurrence are averaged. By this embodiment, the reading of the code on each card can be accurately performed. The binary value indicated by the front/back indication bit J, it is determined whether the front surface or the back surface of the card is indicated.

Figure 41:
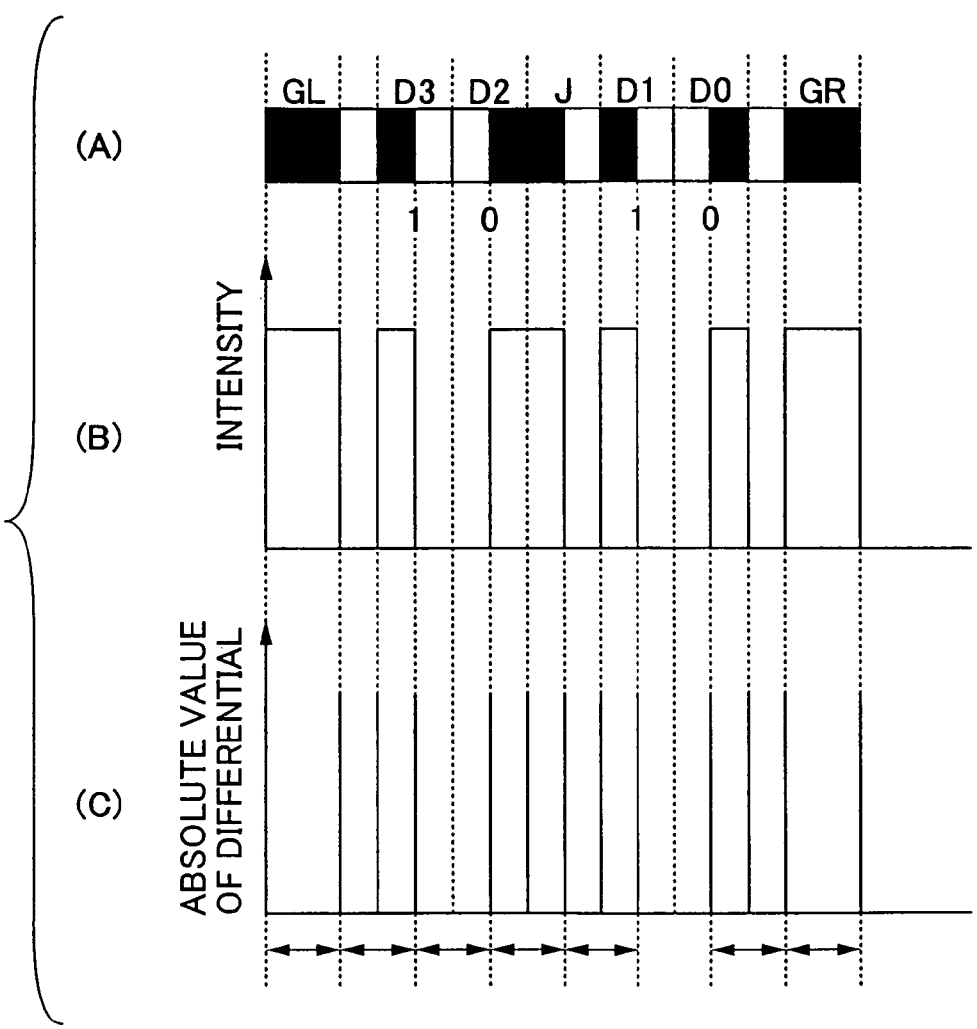
FIG. 41 is a diagram for explaining a pattern of the read code 20, the intensities and the absolute values of the differential.

FIG. 41 shows a pattern of the read code 20, the intensities and the absolute values of the differential. In FIG. 41, (A) indicates the pattern of the read code 20 including the data bits D3, D2, D1, D0 that are set to (1, 0, 1, 0), (B) indicates the intensities obtained when the code 20 is read, and (C) indicates the absolute values of the differential of the intensities. The positions of the edges of the read code can be found as indicated by the arrows in FIG. 41 (C). The width of each bit can be corrected.

The respective values of the data bits D0 to D3 are determined by the difference between the left-region intensity and the right-region intensity. Erroneous recognition of the read code is avoided, and the illegal reproduction of the read code is prevented.

Figure 42:
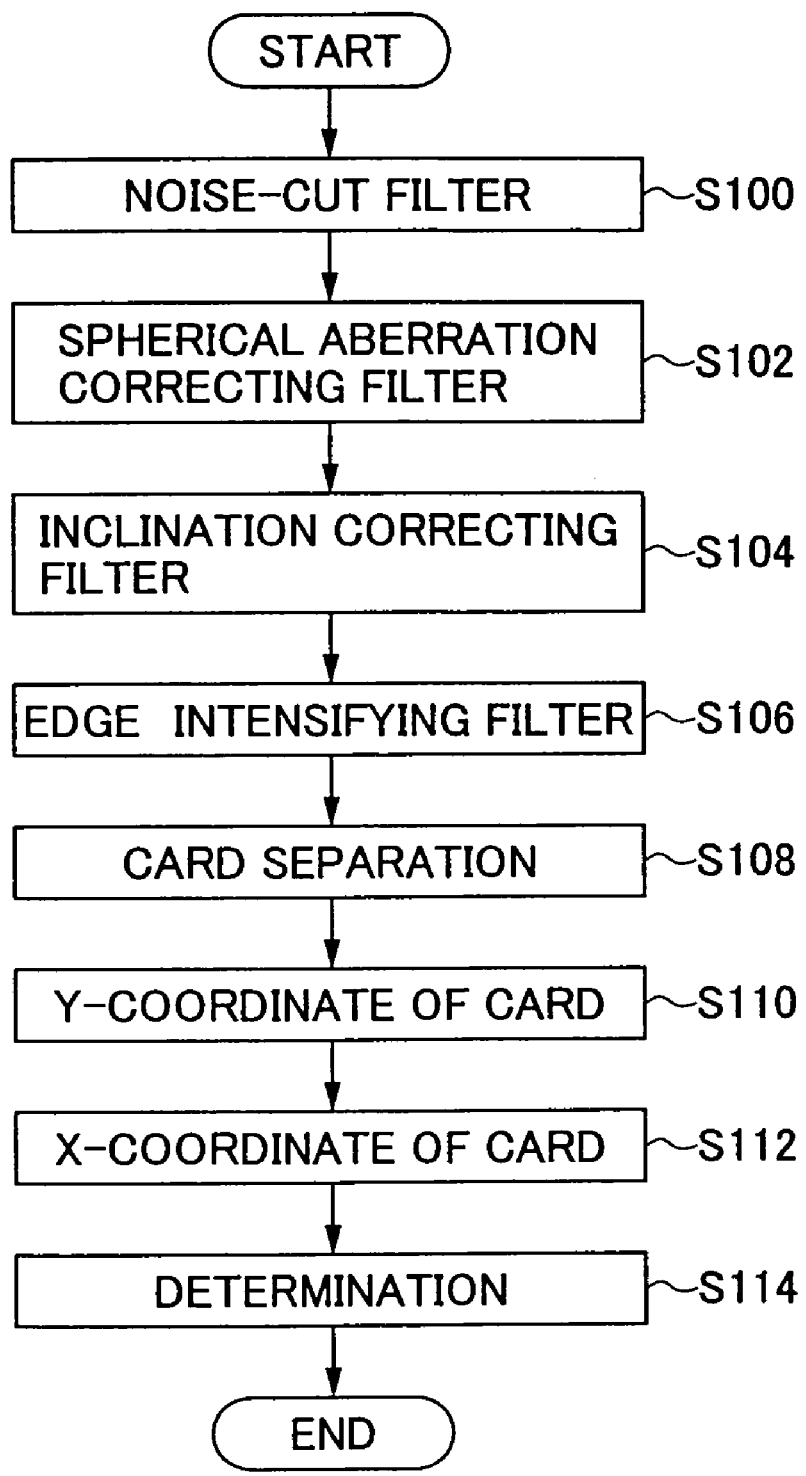
FIG. 42 is a flowchart for explaining a code recognition process performed by the card stack reader of the invention.

FIG. 42 shows a code recognition process performed by the card stack reader of the invention. In the present embodiment, the read code of FIG. 40 is read through the code recognition process shown in FIG. 42.

In the flowchart of FIG. 42, step S100 performs a noise-cut filter process. Suppose that y axis of the read code is the direction in which the bits of the read code are arrayed (the lateral direction of FIG. 40), and three dots, including the dot of concern and the left and the right dots adjacent to the dot of concern, are selected.

Figures 43, 44:
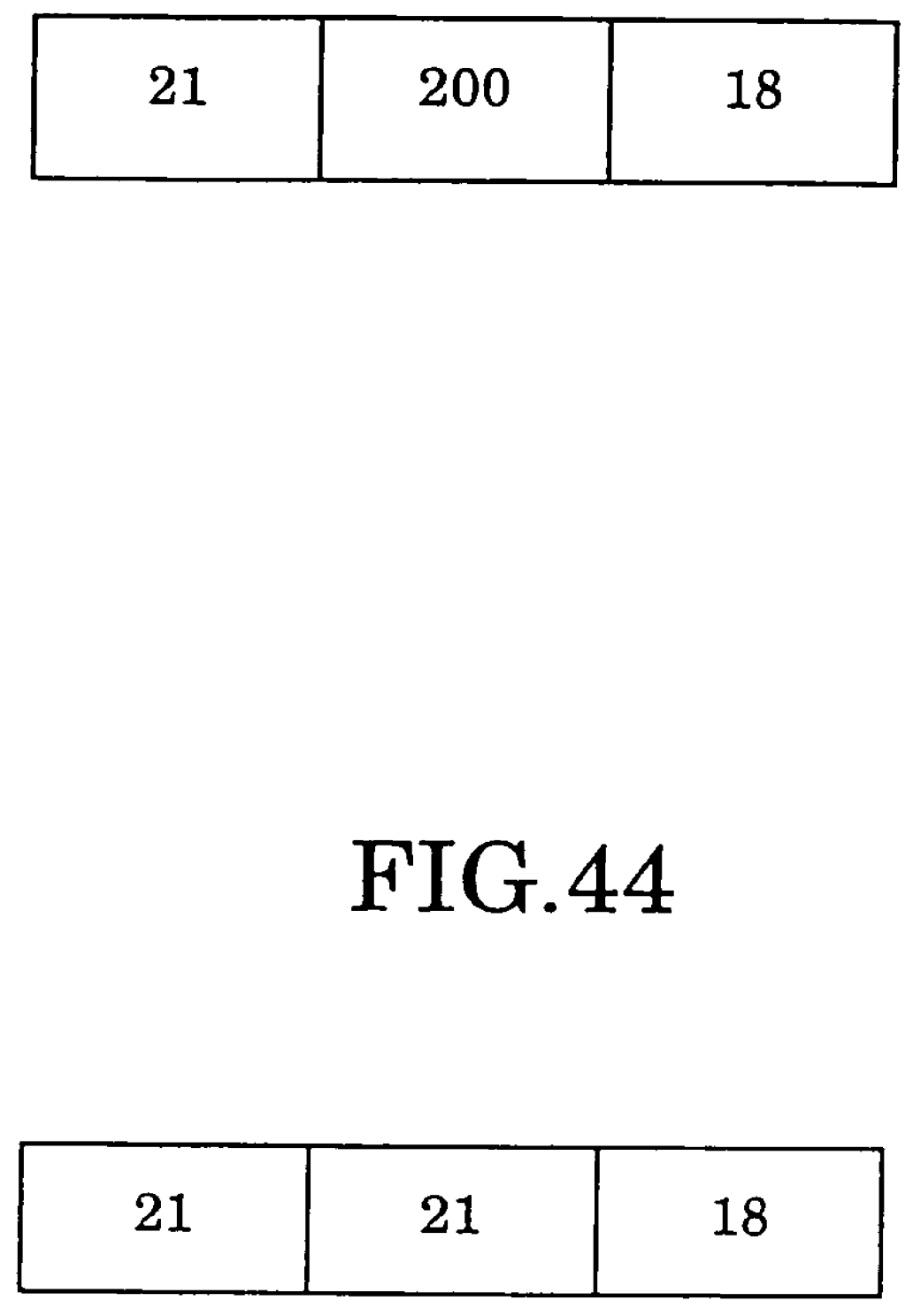

FIG. 43 shows an example of the three dots selected by the noise-cut filter in the card stack reader of the invention. The number within each of the rectangles in FIG. 43 indicates the intensity of the corresponding for the rectangle. The three dots are sorted according to the intensities thereof, and an intermediate-level dot having the second largest intensity among the intensities of the three dots is determined. In the example of FIG. 43, the left dot having the intensity 21 is determined as being the intermediate-level dot. The renewal of the intensities of the selected dots is performed based on the intensity of the intermediate-level dot as shown in FIG. 44. FIG. 44 shows an example of the three dots renewed by the noise-cut filter in the card stack reader of the invention.

Figure 45:
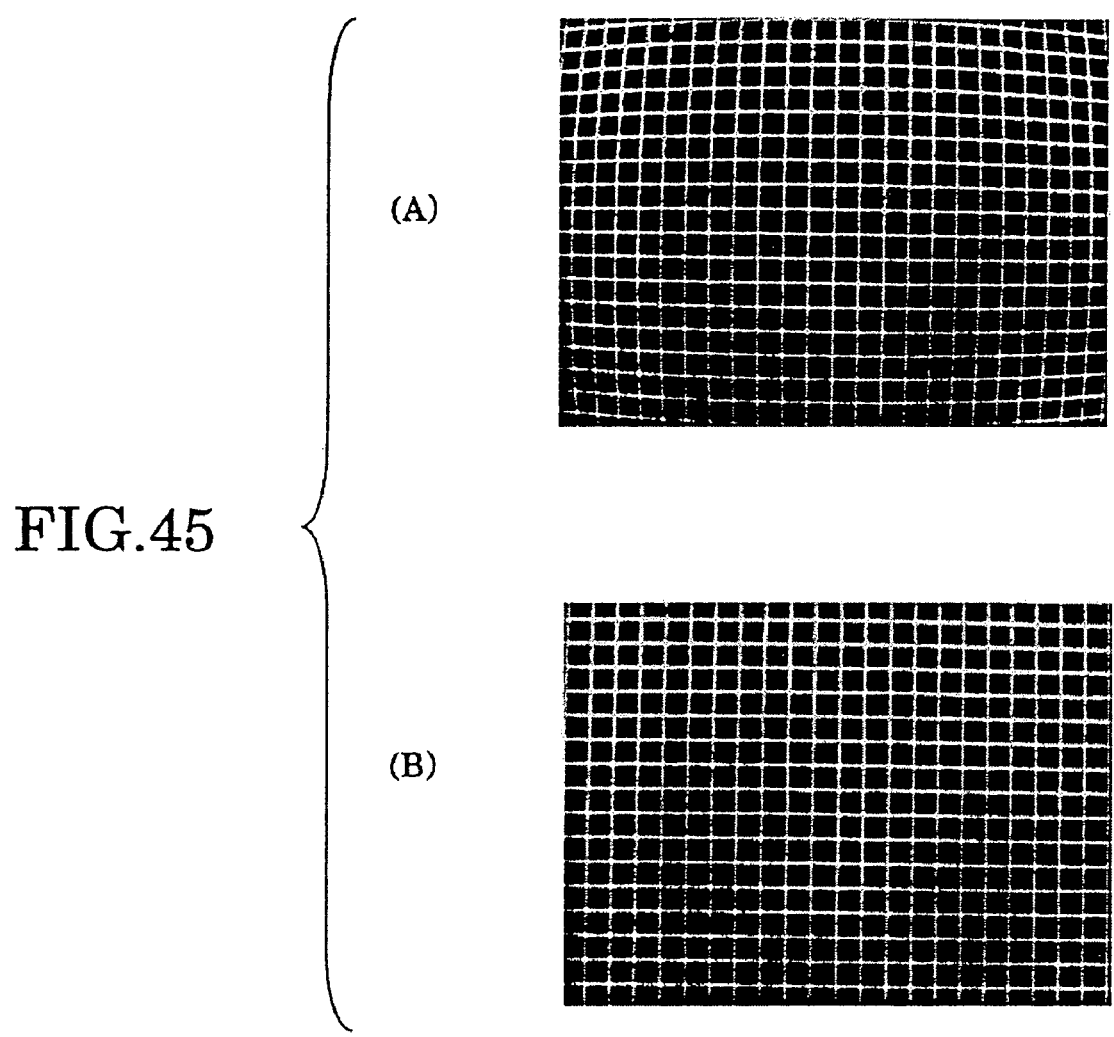
FIG. 45 is a diagram for explaining operation of a spherical aberration correcting filter in the card stack reader of the invention.

In the flowchart of FIG. 42, step S102 performs a spherical aberration correcting filter process. FIG. 45 shows operation of a spherical aberration correcting filter in the card stack reader of the invention. By this spherical aberration correcting filter process, the spherical aberration of a read image due to the lens system of the image sensor as shown in FIG. 45 (A) is corrected to that shown in FIG. 45 (B). Suppose that the read image consists of 640×480 dots.

FIG. 46 shows operation of the spherical aberration correcting filter in the card stack reader of the invention.

As indicated in FIG. 46 (A), in order to transform the coordinates (i, j) of the read image in the original coordinate system into coordinates (x, y) in a new coordinate system having the origin (0, 0) at the center of the 640×480 dot image, the following calculations are performed.

$$x=(i-320)+0.5$$

$$y=(j-240)+0.5$$

As indicated in FIG. 46 (B), in order to obtain the distance "d" of the corrected dot from the center of the image and the rotation angle "a" of the corrected dot, the following calculations are performed.

$$d=(x_2+y_2)^{1/2}$$

$$a=\arctan(y/x) \; x \geq 0$$

$$a=\arctan(y/x)+\pi \; x<0$$

Figure 47:
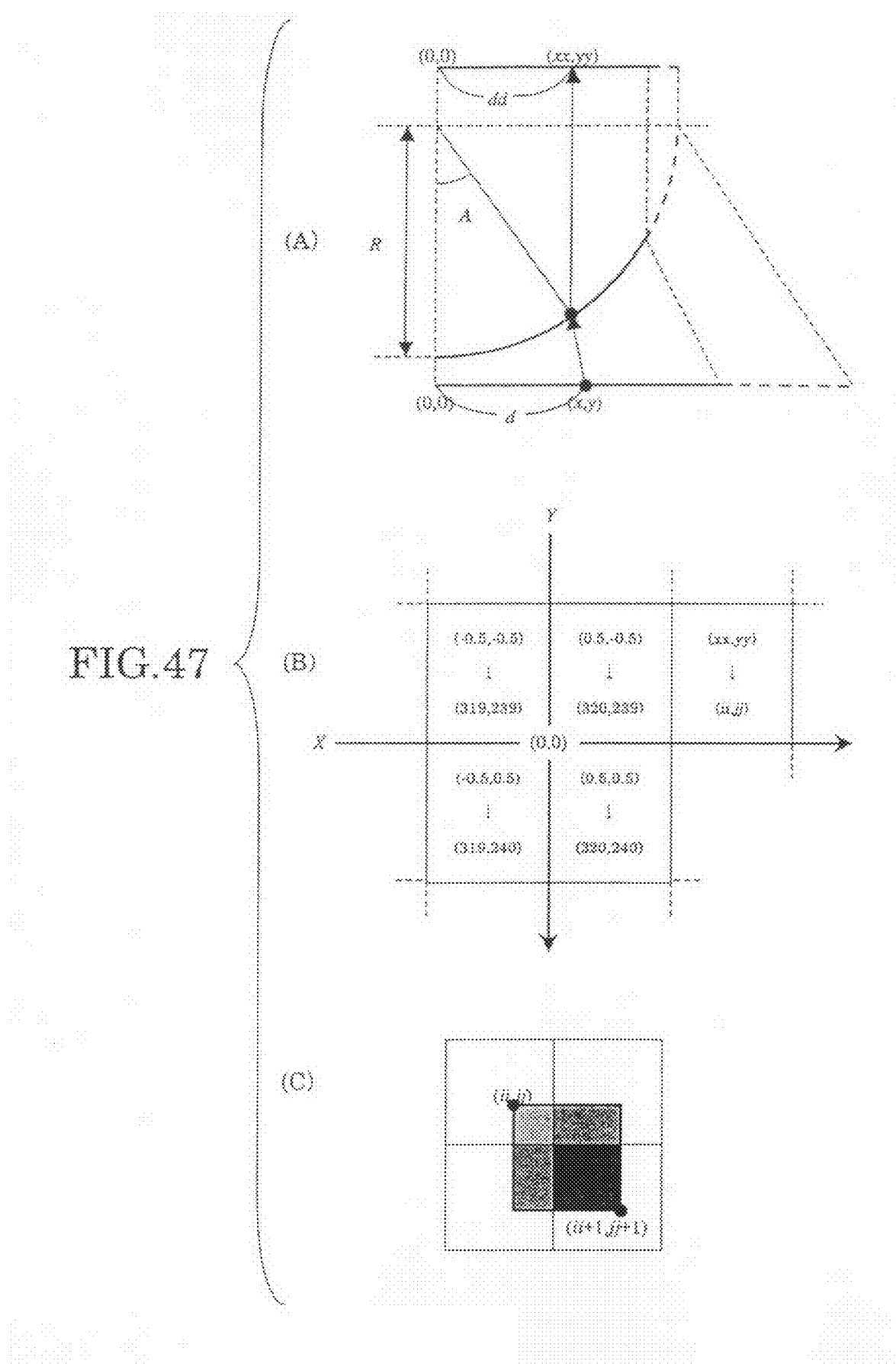
FIG. 47 is a diagram for explaining operation of a spherical aberration correcting filter in the card stack reader of the invention.

Further, FIG. 47 shows operation of the spherical aberration correcting filter in the card stack reader of the invention. As indicated in FIG. 47 (A), in order to obtain the source coordinates (xx, yy) corresponding to the coordinates (x, y), the following calculations are performed. First, the angle A is determined from the length "d" of the circular arc of the sphere having the radius "R".

$$A=(d/2\pi R)\cdot 2\pi = d/R$$

$$dd = R \times \cos(A)$$

$$xx = dd \times \cos(A)$$

$$yy = dd \times \sin(A)$$

As indicated in FIG. 47 (B), in order to transform the source coordinates (xx, yy) into new coordinates (ii, jj) in a new coordinate system having the origin (0, 0) at the upper left corner of the image, the following calculations are performed.

$$ii=(xx+320)-0.5$$

$$jj=(yy+240)-0.5$$

As indicated in FIG. 47 (C), the ratios of the values "VV" of the four dots (ii_i, jj_i), (ii_i+1, jj_i), (ii_i, jj_i+1) and (ii_i+1, jj_i+1) are determined from the integer portion (ii_i, jj_i) and the fractional portion (ii_e, jj_e) of the coordinates (ii, jj). Then, the coordinates V (i, j) of the corrected dot are determined as follows.

$$V(i, j) = VV(ii\_i, jj\_i) \times (1-ii\_e) \times (1-jj\_e) + \\ VV(ii\_i+1, jj\_i) \times ii\_e \times (1-jj\_e) + VV(ii\_i, jj\_i+1) \times \\ (1-ii\_e) \times jj\_e + VV(ii\_i+1, jj\_i+1) \times ii\_e \times jj\_e$$

As a result of the above calculations, the image as shown in FIG. 45 (B) is obtained with the image distortion being eliminated.

Figure 50:
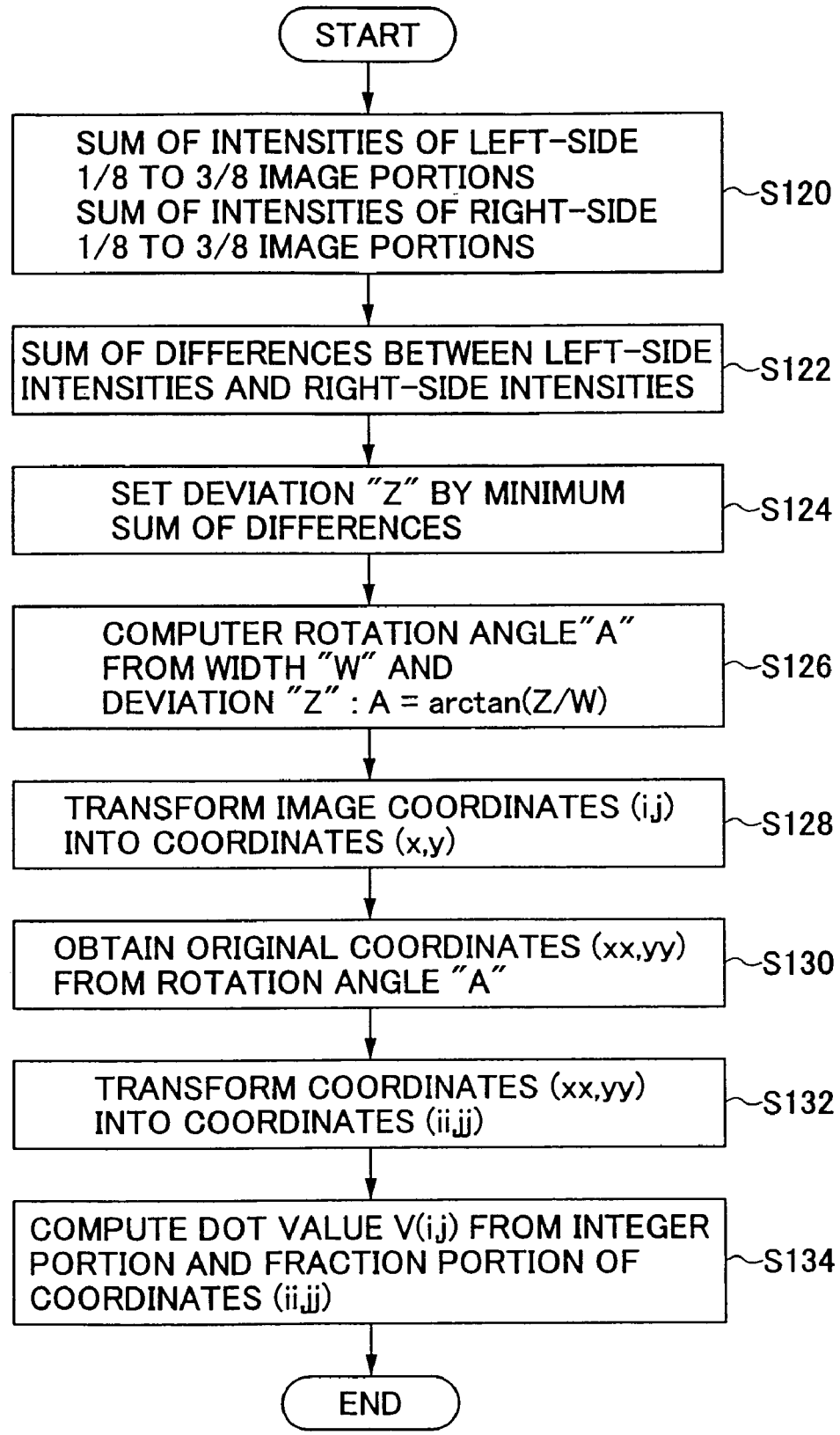
FIG. 50 is a flowchart for explaining an inclination correcting process performed by the card stack reader of the invention.

In the flowchart of FIG. 42, step S102 performs an inclination correcting filter process. FIG. 50 shows the inclination correcting filter process performed at the step S104 by the card stack reader of the invention.

Figure 48:
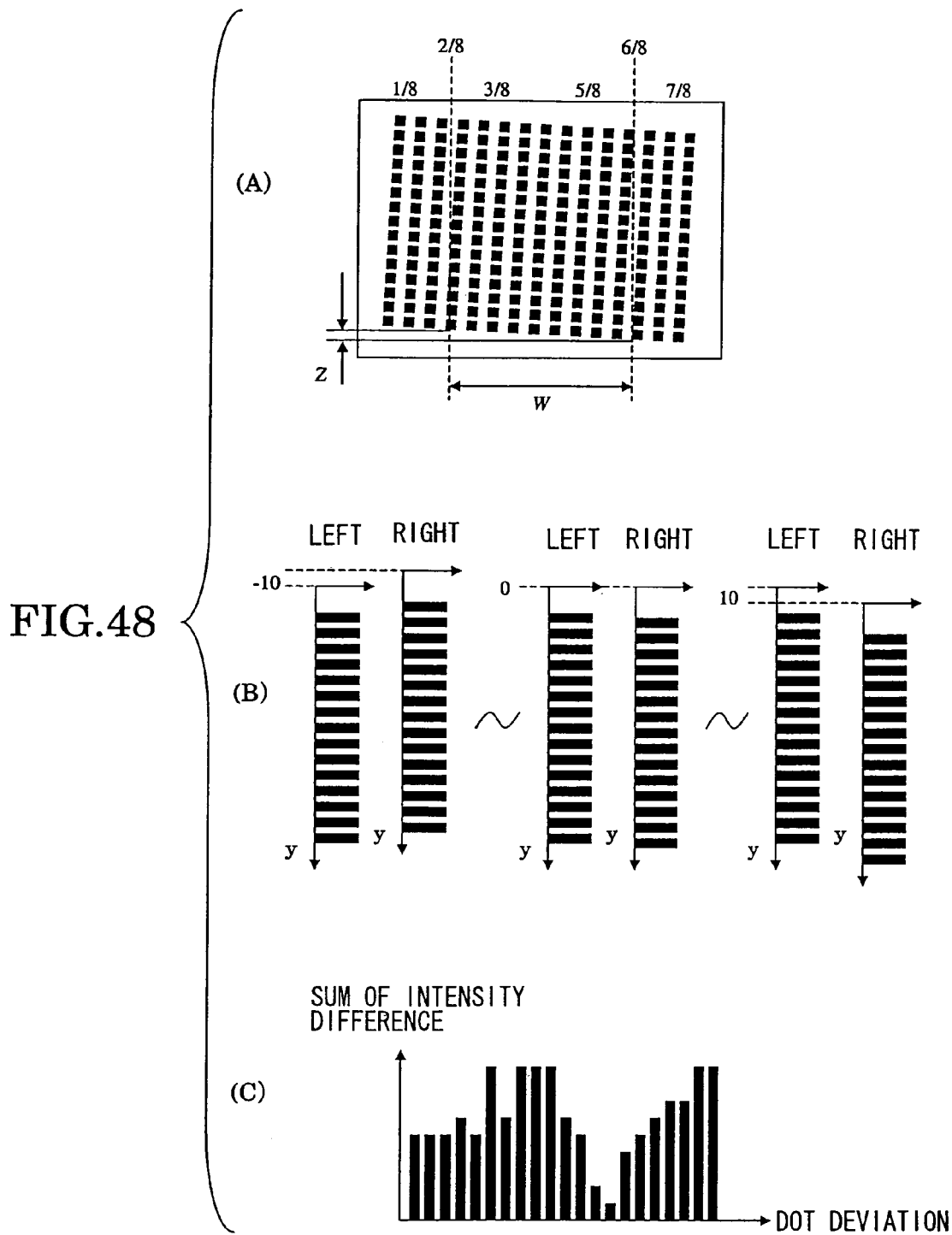
FIG. 48 is a diagram for explaining operation of an inclination correcting filter in the card stack reader of the invention.

In the flowchart of FIG. 50, step S120 calculates a sum of the intensities of left-side ⅛ to ⅜ image portions and a sum of the intensities of right-side ⅛ to ⅜ image portions as indicated in FIG. 48 (A).

After the step S120 is performed, step S122 calculates a sum of the differences between the left-side intensities and the right-side intensities as indicated in FIG. 48 (B). This calculation is repeated for a range between −10 dots and +10 dots by shifting the image by one dot. As a result of the above calculations, the histogram of the intensity differences as shown in FIG. 48 (C) is obtained.

After the step S122 is performed, step S124 sets a dot deviation value "Z" by the minimum sum of the intensity differences in the histogram. After the step S124 is performed, step S126 calculates a rotation angle "A" from the width "W" between the left region and the right region and the dot deviation value "Z" as follows.

$$A=\arctan(Z/W)$$

Figure 49:
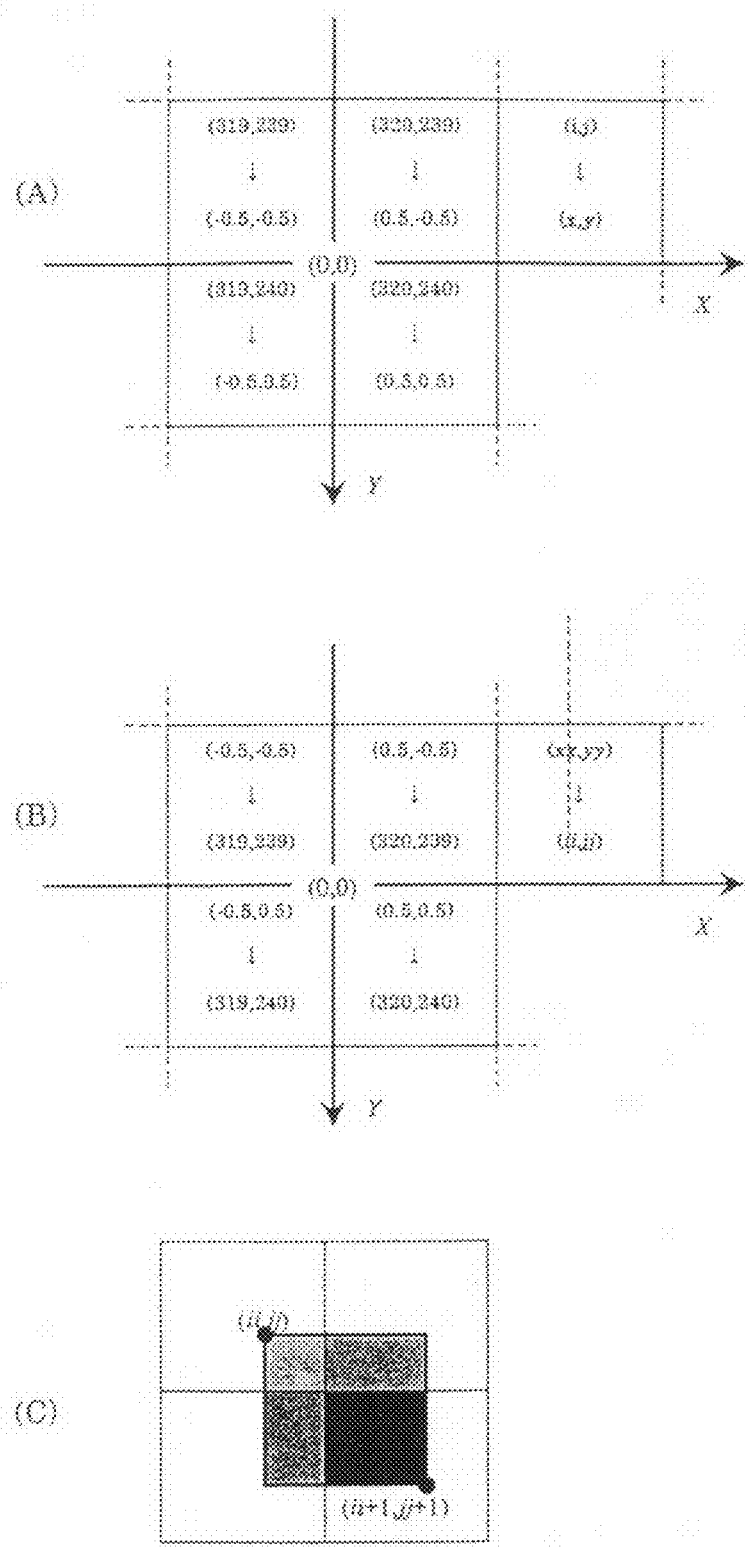
FIG. 49 is a diagram for explaining operation of an inclination correcting filter in the card stack reader of the invention.

After the step S126 is performed, in order to transform the coordinates (i, j) of the read image in the original coordinate system into coordinates (x, y) in the new coordinate system having the origin (0, 0) at the center of the 640×480 dot image as shown in FIG. 49 (A), step S128 performs the following calculations.

$$x=(i-320)+0.5$$

$$y=(j-240)+0.5$$

After the step S128 is performed, in order to obtain the source coordinates (xx, yy) corresponding to the coordinates (x, y) from the angle "A", step S130 performs the following calculations.

$$\begin{pmatrix} xx \\ yy \end{pmatrix} = \begin{pmatrix} \cos(A) & -\sin(A) \\ \sin(A) & \cos(A) \end{pmatrix} \begin{pmatrix} x \\ y \end{pmatrix}$$

After the step S130 is performed, in order to transform the source coordinates (xx, yy) into new coordinates (ii, jj) in a new coordinate system having the origin (0, 0) at the upper left corner of the image as shown in FIG. 49 (B), step S132 performs the following calculations.

$$ii=(xx+320)-0.5$$

$$jj=(yy+240)-0.5$$

After the step S132 is performed, the ratios of the values "VV" of the four dots (ii_i, jj_i), (ii_i+1, jj_i), (ii_i, jj_i+1)

and (ii_i+1, jj_i+1) are determined from the integer portion (ii_i, jj_i) and the fractional portion (ii_e, jj_e) of the coordinates (ii, jj) as shown in FIG. 49 (C). Step S134 determines the coordinates V (i, j) of the corrected dot as follows.

$$V(i, j) = VV(ii\_i, jj\_i) \times (1 - ii\_e) \times (1 - jj\_e) +$$
$$VV(ii\_i+1, jj\_i) \times ii\_e \times (1 - jj\_e) + VV(ii\_i, jj\_i+1) \times$$
$$(1 - ii\_e) \times jj\_e + VV(ii\_i+1, jj\_i+1) \times ii\_e \times jj\_e$$

As a result of the above calculations, the corrected image is obtained with the inclination being eliminated.

In the flowchart of FIG. 42, step S106 performs an edge intensifying filter process (the Laplacian filter). In this process, three dots, including the dot of concern, and the up dot and the down dot adjacent to the dot of concern (or the center dot), are selected from the image being processed. The difference in intensity between the center dot and the up dot and the difference in intensity between the center dot and the down dot are calculated, and the intensity of the center dot is renewed by subtracting the two differences from the intensity of the center dot. For example, when the intensities of the up dot, the center dot and the down dot are 131, 90 and 111, the intensity of the center dot is renewed to 28 (=90−41−21).

Figure 51:
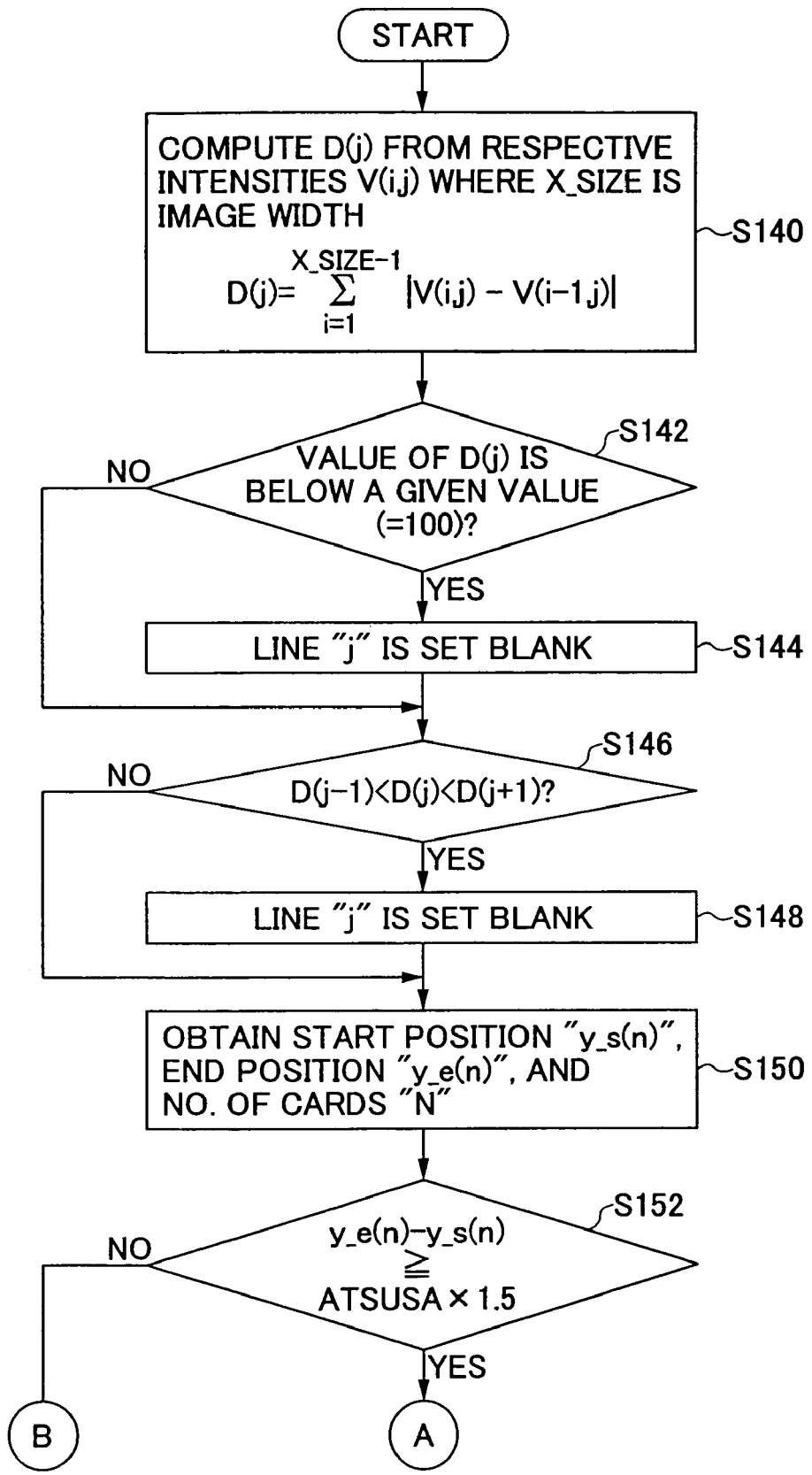
FIG. 51 is a flowchart for explaining a card separation process performed by the card stack reader of the invention.
Figure 52:
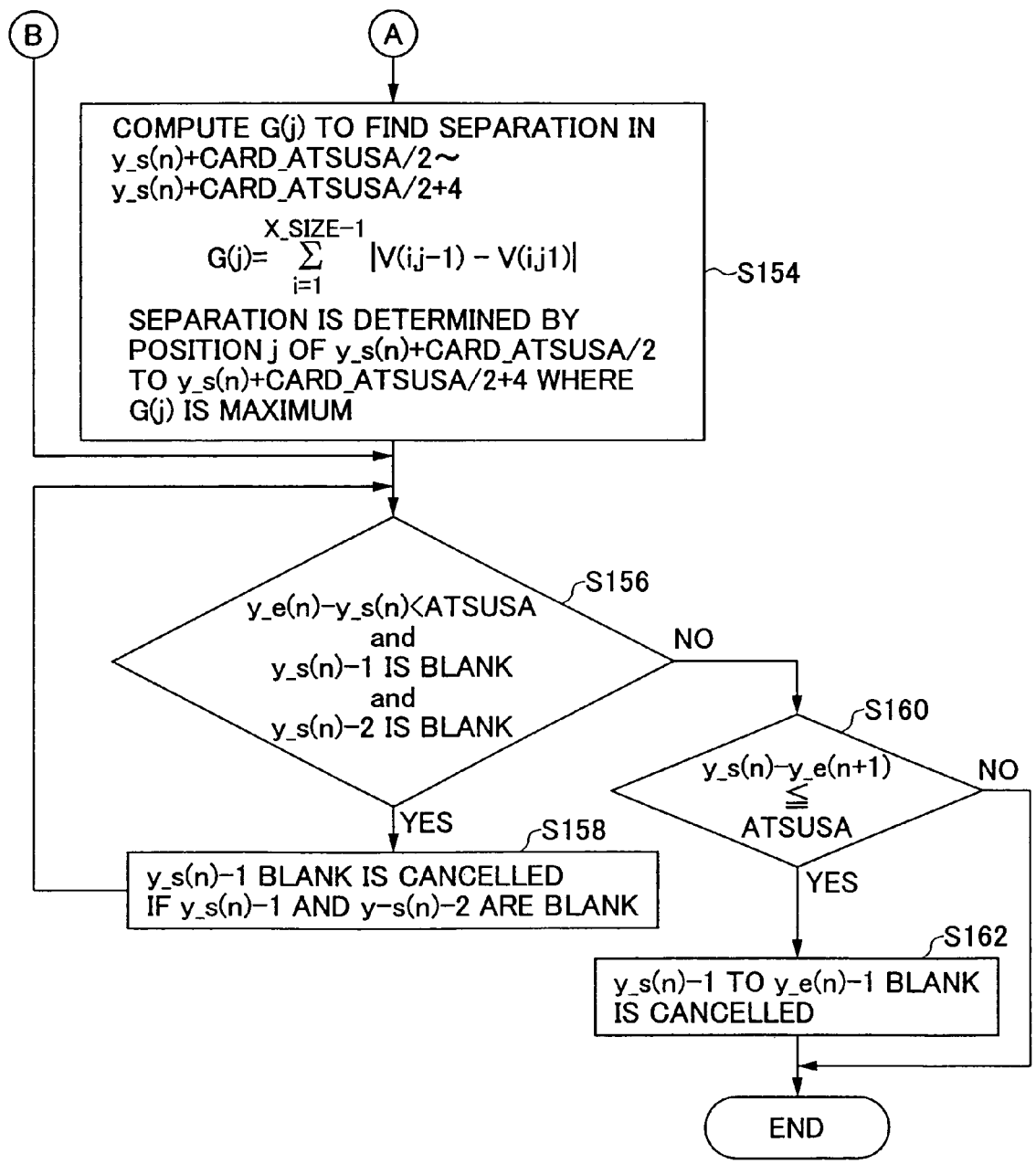
FIG. 52 is a flowchart for explaining the card separation process performed by the card stack reader of the invention.

In the flowchart of FIG. 42, step S108 performs a card separation process FIG. 51 and FIG. 52 show the card separation process performed at the step S142 by the card stack reader of the invention.

In the flowchart of FIG. 51, step S140 computes a total sum D (j) of intensity differences of respective two dots (which are adjacent in x axis direction) from the intensities V (i, j) of the respective coordinates as in the following formula. Suppose that "i" corresponds to the x axis direction and "j" corresponds to the y axis direction.

$$D(j) = \sum_{i=1}^{X\_SIZE-1} |V(i, j) - V(i-1, j)|$$

After the step S140 is performed, step S142 determines whether the value of D (j) is less than a given value (=100). When the result at the step S142 is affirmative, step S144 sets the line "j" blank.

When the result at step S142 is negative or after the step S144 is performed, step S146 determines whether the conditions D (j−1)<D(j)<D(j+1) are met. When the result at the step S146 is affirmative, step S148 sets the line "j" blank.

When the result at step S146 is negative or after the step S148 is performed, step S150 obtains, from the blank line, the start-point coordinate y_s(n), the end-point coordinate y_e(n) of each card, and the number "N" of the cards.

After the step S150 is performed, step S152 determines whether the difference between the coordinates y_s(n) and y_e(n) is larger than a predetermined card thickness "ATSUSA" multiplied by 1.5. When the result at the step S152 is affirmative, the control is transferred to step S154 in FIG. 52. Otherwise, the control is transferred to step S156 in FIG. 52.

Figure 53:
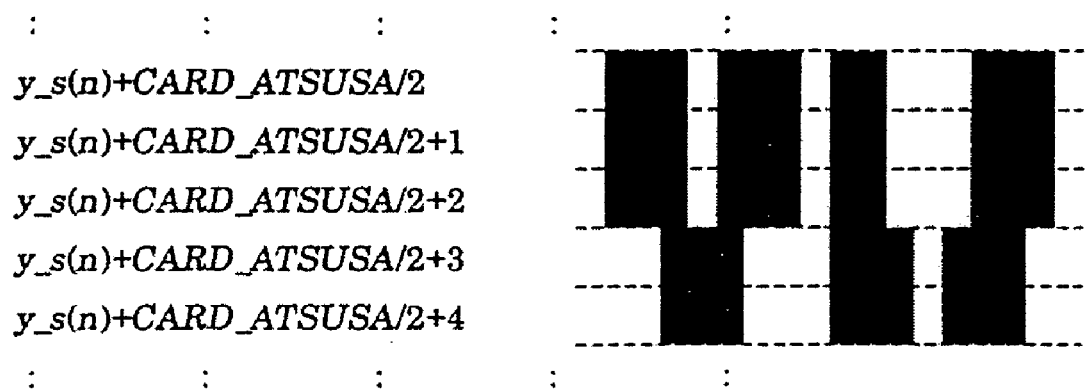
FIG. 53 is a diagram for explaining the card separation process performed by the card stack reader of the invention.

When the result at the step S152 is affirmative, no separation between the cards is found as shown in FIG. 53. At this time, step S154 computes a parameter G(j) as in the following formula in order to find a separation in the lines y_s(n)+ CARD_ATSUSA/2 to y_s( )+CARD_ATSUSA/2+4. The separation is determined by the line "j" of the lines y_s(n)+ CARD_ATSUSA/2 to y_s( )+CARD_ATSUSA/2+4 where the parameter G(j) is the maximum.

$$G(j) = \sum_{i=0}^{X\_SIZE-1} |V(i, j-1) - V(i, j+1)|$$

After the step S154 is performed, step S156 determines whether the conditions: y_e(n)−y_s(n)<ATSUSA; the line y_s(n)−1 is blank; and the line y_s(n)−2 is blank are met. When the result at the step S156 is affirmative, step S158 cancels the setting of the line y_s(n)−1 to blank in the previous step. This is because the thickness of the card stack with the previously set blank line is excessively small.

On the other hand, when the result at the step S156 is negative, step S160 determines whether the condition: y_s (n)−y_e(n+1)≦ATSUSA is met. Only when the condition of the step S160 is met, step S162 cancels the setting of the lines y_s(n)+1 to y_e(n)−1 to black in the previous step, and the process ends. When the condition of the step S160 is not met, the process immediately ends and the step S162 is not performed.

In the flowchart of FIG. 42, step S110 performs a y-coordinate computation process. By this calculation, the start-point and end-point y coordinates of the read code are determined based on the separation of the cards.

Figure 54:
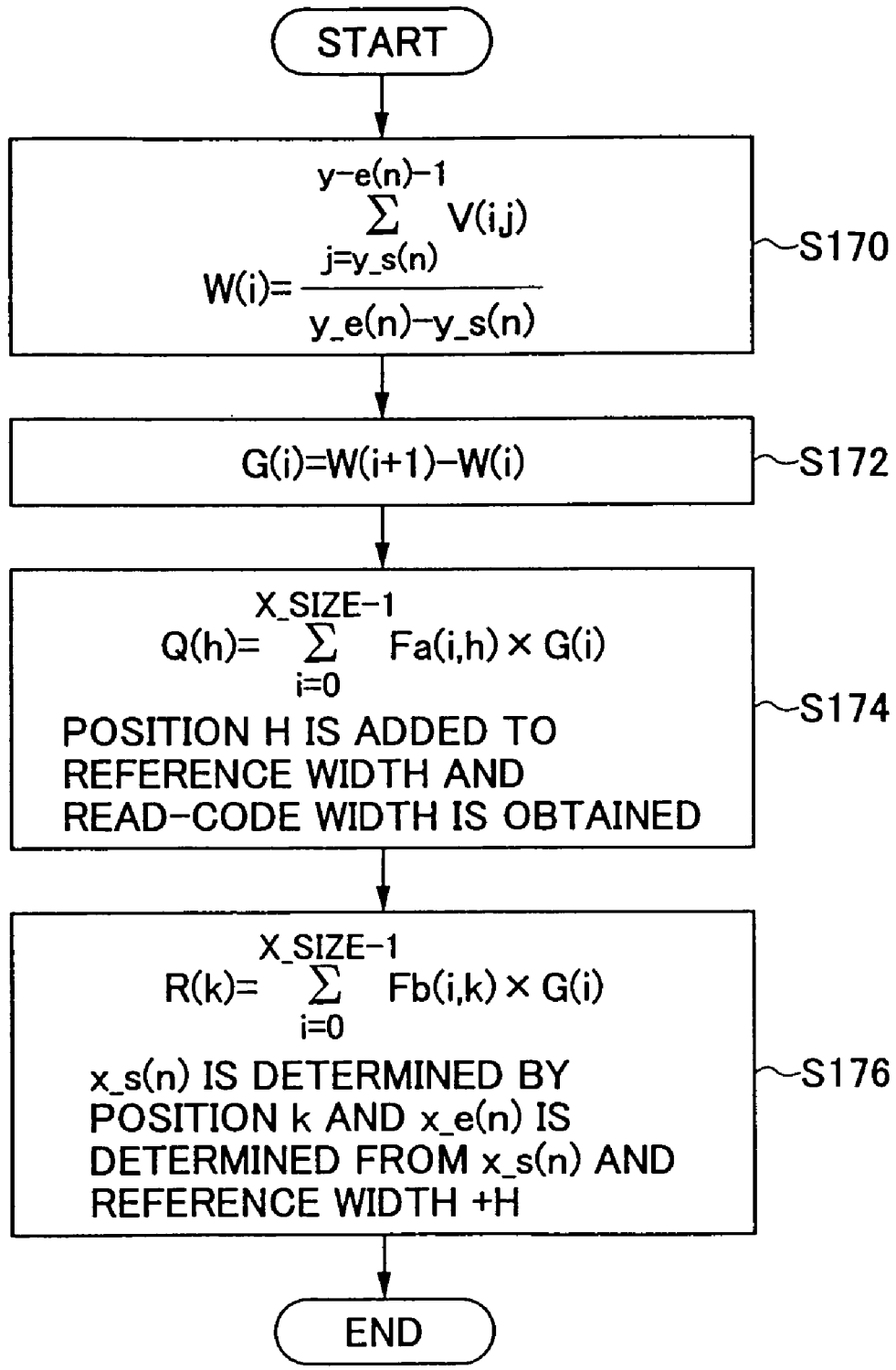
FIG. 54 is a flowchart for explaining an x-coordinate computation process performed by the card stack reader of the invention.

In the flowchart of FIG. 42, step S112 performs an x-coordinate computation process. FIG. 54 shows the x-coordinate computation process performed at the step S112 by the card stack reader of the invention. As shown in FIG. 54, step S170 calculates the average intensity W(i) of the intensities of the respective x coordinates of the read code for one card as follows.

$$W(j) = \frac{\sum_{j=y\_s(n)}^{y\_e(n)} V(i, j)}{y\_e(n) - y\_s(n)}$$

Step S172 calculates the difference G(i) between the average intensity of a certain x coordinate and the intensity of the next x coordinate as in the following formula. The changing point of the read code intensity is extracted.

$$G(i) = W(i+1) - W(i)$$

Figure 55:
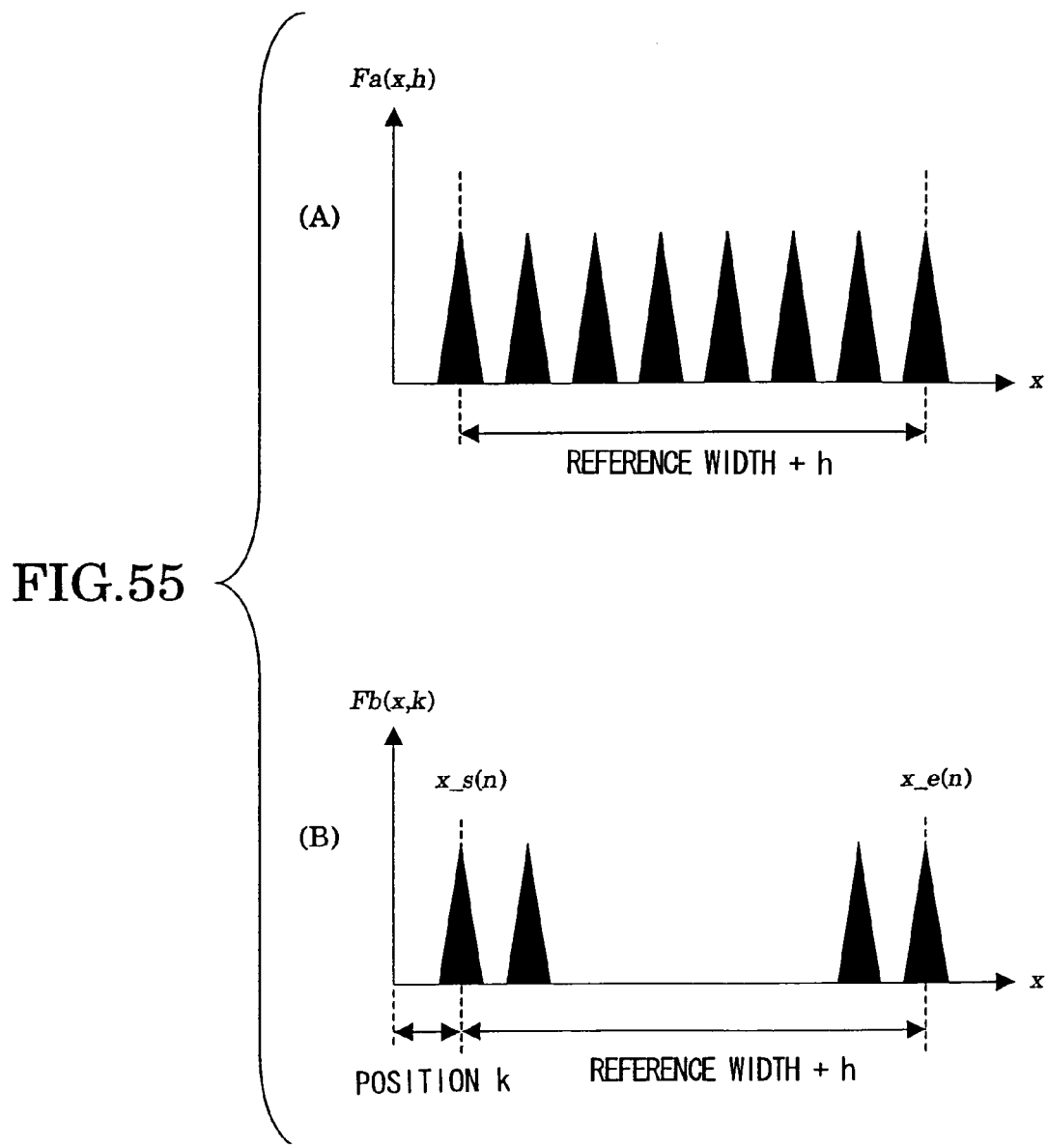
FIG. 55 is a diagram for explaining the x-coordinate computation process performed by the card stack reader of the invention.

As indicated in FIG. 55 (A), step S174 calculates the total sum of the products Fa(i, k)×G(i) as in the following formula. The position H where the value of the total sum Q(h) is the maximum is added to the reference width, and the width of the read code is determined by the reference width+H.

$$Q(h) = \sum_{i=0}^{X\_SIZE-1} Fa(i, h) \times G(i)$$

As indicated in FIG. 55 (B), step S176 calculates the total sum R(k) of the products Fb(i, k)×G(i) as in the following formula. The position "k" where the value of the total sum R(k) is the maximum is set to the start-point x coordinate x_s(n) of the read code. The end-point x coordinate x_e(n) of the read code is determined from the start-point x coordinate x_s(n) and the reference width+H.

$$R(k) = \sum_{i=0}^{x\_SIZE-1} Fb(i,k) \times G(i)$$

As a result of the above calculations, the x coordinate of the card is obtained.

Figure 56:
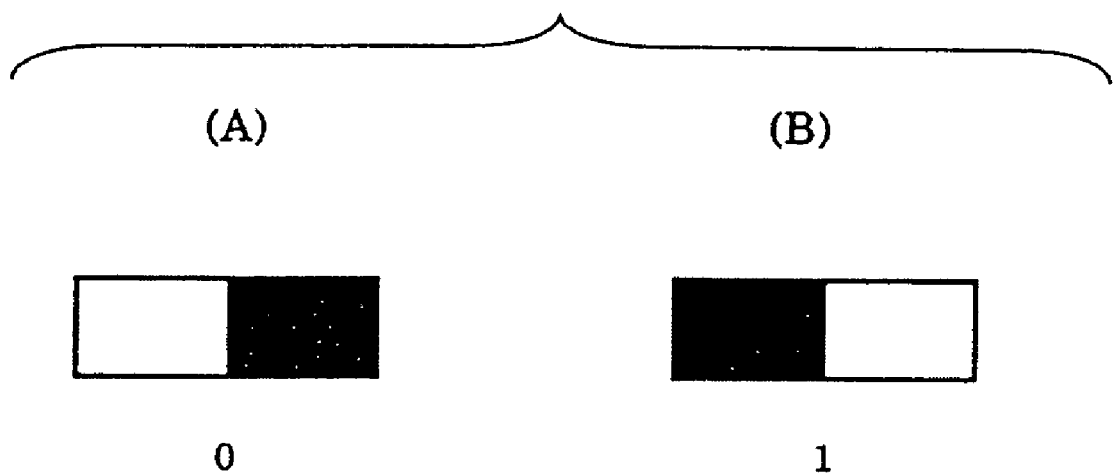
FIG. 56 is a diagram for explaining a determination process performed by the card stack reader of the invention.

After the step S112 is performed, step S114 performs the determination of the data bits D0 to D3 and the front/back indication bit J of the read code. At this step, it is first determined which of the front surface and the back surface of the card is indicated by the front/back indication bit J. When the front surface of the card is indicated by the front/back indication bit J and the right region of each of the data bits is set to the high-level intensity as shown in FIG. 56 (A), the value of that data bit is determined as being equal to 0. When the front surface of the card is indicated by the front/back indication bit J and the left region of each of the data bits is set to the high-level intensity as shown in FIG. 56 (B), the value of that data bit is determined as being equal to 0. In a case in which the back surface of the card is indicated by the front/back indication bit J, the determination that is reverse to the above is performed.

In the foregoing descriptions, the image sensor 38 corresponds to the imaging unit in the claims, the image recognition device 40 corresponds to the code recognition unit, the UV lamps 36 and 68 correspond to the light irradiation unit, the card holder in FIG. 11 corresponds to the first card holder, the switch 77 corresponds to the first switch unit, the switch 76 corresponds to the second switch unit, the switch 80 corresponds to the third switch unit, the secondary battery 79 corresponds to the charging/discharging unit, the card holder in FIG. 13 corresponds to the second card holder, the step S52 corresponds to the advertisement indication detecting means, the steps S54 and S56 correspond to the advertisement displaying means, the flash lamp 254 corresponds to the flash light irradiation unit, and the step S94 corresponds to the image comparison unit.

As described in the foregoing, according to the present invention, the imaging unit reads an image from the peripheral side portion of the stack of cards, each card having a read code along the peripheral side edge thereof, the read code identifying the card, and the code recognizing unit recognizes the read code of each card from the image read by the imaging unit. It is possible for the card stack reader of the present invention to read the code on the card stack as it is. The cards are free from damages and stain, and the reading time is short.

According to the present invention, the read code is printed on a surface of each card at the peripheral side edge thereof. The card stack reader reads the code from a side portion of the card.

According to the present invention, the read code is recorded to each card with the fluorescent material, and the card stack reader includes the light irradiation unit which emits an excited light to the peripheral side edge of each card, such that a fluorescent light is generated from the peripheral side edge of the card. The intensity of the reflection light is increased, and it is possible to easily read the code from the card. The read code on the card is not so perceptible under a visible light.

According to the present invention, the card stack reader includes the first filter which cuts off an excited light from the light irradiation unit. The entering of a reflected excited light into the imaging unit is prevented. The reduction of the intensity difference in the image signal is prevented.

According to the present invention, the card stack reader includes the second filter which cuts off a blue light from the light irradiation unit. When the material of the card includes a fluorescent substance, the entering of the blue light generated by the fluorescent substance into the imaging unit is prevented, and the reduction of the intensity difference in the image signal is prevented.

According to the present invention, the read code is recorded to the card with a fluorescent material that is colorless under a visible light. The read code on the card is not so perceptible under a visible light, and the illegal duplication of the read code is prevented.

According to the present invention, the read code is recorded to the card with a plurality of fluorescent materials that generate different color light rays by irradiation with an excited light. The multi-level digitization of the bits of the read code is allowed.

According to the present invention, the read code is recorded to the card with a fluorescent material that generates an infrared light ray by irradiation with an excited light. The read code on the card is not so perceptible under a visible light, and the illegal duplication of the read code is prevented.

According to the present invention, the read code is recorded to the card with a fluorescent material that generates a light ray, having a wavelength longer than a wavelength of a blue light, by irradiation with an excited light. By using the first and second filters, the undesired influences of the reflected excited light or the blue light are reduced.

According to the present invention, the read code recorded to the card includes guide bits. The position of the read code in the image signal for each card can be easily determined by using the guide bits.

According to the present invention, the card stack reader comprises a dichroic mirror which reflects the excited light emitted by the light irradiation unit such that an optical axis of the excited light and an optical axis of the imaging unit match with each other and are set to be perpendicular to the peripheral side edge of each card in the stack. The undesired influences due to irregularities of the position of the peripheral side portion of the card stack can be reduced, and the code on each card can be accurately read.

According to the present invention, the card stack reader comprises a first card holder which holds the stack of cards in an inclined condition such that the peripheral side edges of the cards are obliquely stacked, and the imaging unit is arranged to straightly confront the obliquely stacked peripheral side edges of the cards. The code on each card can be accurately read.

According to the present invention, the card stack reader comprises the first switch unit which switches on and off the supply of power of an external power source to one of the light irradiation unit and the imaging unit, the charging/discharging unit which performs charging and discharging of a supplied power, the second switch unit which switches on and off the supply of power of the external power source to the charging/discharging unit; and the third switch unit which switches on and off the supply of a current discharged by the charging/discharging unit to the other of the light irradiation unit and the imaging unit. The card stack reader can operate well even when the power consumption is higher than the power supplied from the external power source.

According to the present invention, the card stack reader comprises the second card holder which holds the stack of cards by arranging the peripheral side edges of the cards in an aligned condition and exerts pressure on the peripheral side edges of the cards. The code on each card can be accurately read even when the card has a curling surface.

According to the present invention, the second card holder cuts off an external light entering the imaging unit which is arranged to straightly confront the peripheral side edges of the cards in the stack. The entering of an external light into the imaging unit is prevented, and the undesired influences on the image reading are reduced.

According to the present invention, the card case includes a grooved portion that inhibits the peripheral side edges of the cards from touching the card case. The read code on each card is free from damages and stain.

According to the present invention, the card case includes a spring member which exerts pressure on the cards of the stack in the card stacking direction. The misalignment of the cards can be prevented.

According to the present invention, the card case includes an access window provided at the position corresponding to the peripheral side portion of the stack of cards contained in the card case. The code on each card can be easily read by the card stack reader if the card case containing the card stack is set to the reader.

According to the present invention, the card case comprises a main body in which a spring member, exerting pressure on the cards of the stack in a card stacking direction, is provided, and a lid member which is integrally connected to the main body, the lid member covering an exposed portion of the stack of cards that is not contained in the main body. The code on each card can be easily read by the card stack reader if the main body of the card case containing the card stack is set to the reader and the lid member is removed.

According to the present invention, the read code is printed to a portion of the card adjacent to a peripheral side edge of the card, and the card is cut along a straight line passing through the code-printed portion to form the peripheral side edge of the card where the read code is printed. The read code can be easily formed at the peripheral side edge of the card.

According to the present invention, the read code is printed to the card with a fluorescent ink which generates an infrared light or a visible light, and a card graphic pattern is printed over the read code on the card with an ink that is transparent under an infrared light or a visible light. The read code is not so perceptible in the presence of the card graphic pattern, and the illegal duplication of the read code is prevented.

According to the present invention, the read code is directly printed on the peripheral side edge of the card. The efficiency of the manufacture of the cards can be increased.

According to the present invention, the same read code is printed to the peripheral side edge of each of the cards in the stack. The efficiency of the manufacture of the cards can be increased.

According to the present invention, the read code is directly printed to the peripheral side edge of the card by spraying of an ink to the peripheral side edge of the card. The stability of the read code on each card can be increased.

According to the present invention, a graphic pattern is read from a surface of the card, and a read code corresponding to the read graphic pattern is printed to the card by spraying of an ink to the card. The read code can be accurately printed to the card in the presence of the graphic pattern.

According to according to the present invention, a printing surface is formed on a front surface and a back surface of the card by using an ink that cuts off or absorbs an infrared light or a visible light, and wherein the read code is printed to the center of the peripheral side edge of the card with a fluorescent ink that generates an infrared light or a visible light. The read codes on the cards can be separately and reliably detected by the card stack reader.

According to the present invention, the card is formed with a source material containing a fluorescent material that generates an infrared light or a visible light, and the read code is directly printed to the peripheral side edge of the card with an ink that cuts off or absorbs an infrared light or a visible light. The read code can be printed to the cards using the ink that cuts off or absorbs an infrared light or a visible light.

According to the present invention, a plurality of different read codes are printed to the peripheral side edge of the card. It is possible that the read code of a single card contains a plurality of different items of information.

According to the present invention, the read code at the peripheral side edge of the card recognized by the card stack reader from a front surface of the card is different from the read code recognized by the card stack reader from a back surface of the card. The illegal duplication of the read code is prevented.

According to the present invention, the read code at the peripheral side edge of the card has a data pitch for encoding that varies depending on a kind of the card. The illegal duplication of the read code is prevented.

According to the present invention, in the game machine, a character or a function corresponding to a read code of each card recognized by the card stack reader is allocated to a card game. The variety of the card game is increased.

According to the present invention, the game machine comprises a storage unit which stores a value of a parameter acquired in a progress of a card game by a character corresponding to the read code of the card recognized by the card stack reader and a player identification number. By using the same cards, different players can enjoy playing the card game with the increased variety of the card game.

According to the present invention, in the game machine, a character or a function corresponding to combinations of a plurality of read codes of the cards in the stack recognized by the card stack reader is allocated to a card game. The variety of the card game is increased.

According to the present invention, the game machine is connected to a server via a network, and other game machines are connected to the server. Players at remote locations can enjoy playing the card game at the same time.

According to the present invention, the read code is recorded to the peripheral side edge of each card with a light storage material. It is possible that the irradiation of the code and the imaging of the code occur at different times.

According to the present invention, the computer-readable storage medium comprises an advertisement indication detecting unit which detects whether the read code at the peripheral side edge of each card read by the card stack reader includes an advertisement indication, and an advertisement displaying unit which displays an advertisement in a game screen when the presence of the advertisement indication is detected. The advertisement effects of the card game can be increased.

According to the present invention, the same read code is printed to the peripheral side edge of each of the cards in the stack by using a roller. The read code can be printed to each card with good stability even when the peripheral side edge of the card has surface irregularities.

According to the present invention, the card case comprises a stopper which arranges the peripheral side edges of the cards in the stack in a flattened condition. The read code can be printed to each card with good stability even when the peripheral side edge of the card has surface irregularities.

According to the present invention, a read code including a plurality of bits is printed to the peripheral side edge of each of the cards in the stack by using a plurality of rollers. The efficiency of printing of the read code to the cards is increased.

According to the present invention, the card stack reader comprises a flash light irradiation unit which emits a flash light to the peripheral side edge of each card so that the emitted light is stored into the light storage material of the read code. The power consumption of the light source is reduced, and the use of a UV cut filter is not needed, and the manufacture is performed with a reduced cost.

According to the present invention, the imaging unit reads an image from the peripheral side portion of the stack of cards at a plurality of times at intervals of a given period after the flash light is emitted by the flash light irradiation unit, and the card stack reader comprises an image comparison unit which compares the images read by the imaging unit at the plurality of times. The authenticity of the read code can be detected based on the period of light storage in the light storage material.

According to the present invention, the read code includes: data bits each indicating a binary value of the read code; a front/back indication bit indicating one of front and back surfaces of the card; and edge bits indicating respective positions of a start and an end of the read code. Erroneous recognition of the read code is prevented, and the determination as to the front/back surface of the card can be performed.

According to the present invention, each of the data bits, the front/back indication bit and the edge bits has a predetermined width along the peripheral side edge of the card. The code on each card can be accurately read by the card stack reader.

The invention claimed is:

1. A game apparatus comprising:
a game program execution means which executes a game program;
an input means, operable by a player, and
a card data detection means which is arranged to mount a set of cards for a single scan, the set of cards being selected by the player from a variety of cards which include cards representing game characters as well as functions related to the game characters and provided with code patterns indicative of the game characters or the functions related to the game characters,
wherein said card data detection means detects, in a single scan, a set of data from said cards selectively mounted to the card data detection means, said detected data containing data indicative of a game character selected by the player and of a function related to the game character,
wherein said game program execution means executes the game program to perform a game with the game character selected by the player and the function related to the game character determined in response to said data detected from said set of cards mounted to the game apparatus and in response to signals from said input means.

2. A game apparatus comprising:
a game program execution means which executes a game program;
an input means, operable by a player, and
a card data detection means which is arranged to mount a set of cards for a single scan, the set of cards being selected by the player from a variety of cards related to game characters and provided with code patterns related to the game characters,
wherein said card data detection means detects, in a single scan, a set of data from said cards selectively mounted to the card data detection means, said detected data containing data related to the game characters selected by the player,
wherein said game program execution means executes the game program to perform a game with the game characters selected by the player in response to said data detected from the set of cards mounted to the game apparatus and in response to signals from said input means.

* * * * *

UNITED STATES PATENT AND TRADEMARK OFFICE
CERTIFICATE OF CORRECTION

PATENT NO.       : 7,556,197 B2
APPLICATION NO.  : 12/071789
DATED            : July 7, 2009
INVENTOR(S)      : Toshikazu Yoshida et al.

Page 1 of 1

It is certified that error appears in the above-identified patent and that said Letters Patent is hereby corrected as shown below:

On the title page please insert the "Foreign Application Priority Data:

--(30)      Foreign Application Priority Data

December 3, 1999    (JP) .................................. 11-345509
June 15, 2000       (JP) .................................. 2000-180126
November 30, 2000   (JP) .................................. 2000-365894--.

Signed and Sealed this

Twenty-fifth Day of August, 2009

David J. Kappos
*Director of the United States Patent and Trademark Office*